US008021230B2

(12) United States Patent
Baerlocher et al.

(10) Patent No.: US 8,021,230 B2
(45) Date of Patent: Sep. 20, 2011

(54) GAMING SYSTEM HAVING MULTIPLE GAMING MACHINES WHICH PROVIDE BONUS AWARDS

(75) Inventors: Anthony J. Baerlocher, Reno, NV (US); Yuliya Hungate, Reno, NV (US); Christina Evans, Highpoint, NC (US); James A. Vasquez, Carson City, NV (US); Tonja M. Peterson, Reno, NV (US); Erick T. Ching, Reno, NV (US)

(73) Assignee: IGT, Reno, NV (US)

( * ) Notice: Subject to any disclaimer, the term of this patent is extended or adjusted under 35 U.S.C. 154(b) by 781 days.

(21) Appl. No.: 11/830,635

(22) Filed: Jul. 30, 2007

(65) Prior Publication Data

US 2008/0153564 A1 Jun. 26, 2008

Related U.S. Application Data

(63) Continuation-in-part of application No. 11/548,579, filed on Oct. 11, 2006, now Pat. No. 7,892,093, which is a continuation-in-part of application No. 11/204,101, filed on Aug. 15, 2005, now Pat. No. 7,854,654.

(60) Provisional application No. 60/603,144, filed on Aug. 19, 2004.

(51) Int. Cl.
*A63F 13/00* (2006.01)

(52) U.S. Cl. ................ 463/25; 463/16; 463/17; 463/18; 463/19; 463/20; 463/26; 463/27

(58) Field of Classification Search ............. 463/16–20, 463/25–27

See application file for complete search history.

(56) References Cited

U.S. PATENT DOCUMENTS

| | | | |
|---|---|---|---|
| 2,068,379 | A | 1/1937 | Frantz et al. |
| 3,618,019 | A | 11/1971 | Nemirovsky |
| 3,998,309 | A | 12/1976 | Mandas et al. |
| 4,072,930 | A | 2/1978 | Lucero et al. |
| 4,236,717 | A | 12/1980 | Wichinsky |
| 4,238,127 | A | 12/1980 | Lucero et al. |
| 4,277,064 | A | 7/1981 | Newman |
| 4,283,709 | A | 8/1981 | Lucero et al. |
| 4,335,809 | A | 6/1982 | Wain |
| 4,375,015 | A | 2/1983 | Chambers, Jr. |
| 4,396,193 | A | 8/1983 | Reinhardt et al. |
| 4,409,656 | A | 10/1983 | Andersen et al. |
| 4,448,419 | A | 5/1984 | Telnaes |

(Continued)

FOREIGN PATENT DOCUMENTS

AU 78/39363 3/1980

(Continued)

OTHER PUBLICATIONS

Jul. 7, 2009 Office Action for U.S. Appl. No. 11/204,101.

(Continued)

*Primary Examiner* — Dmitry Suhol
*Assistant Examiner* — David Duffy
(74) *Attorney, Agent, or Firm* — K&L Gates LLP

(57) ABSTRACT

A gaming system including a central server linked to a plurality of gaming machines, gaming tables, hand held gaming devices and/or community gaming displays. The central server monitors wagers placed on any games played. Based at least in part on the wagers placed, the central server determines when one or more bonus events will occur and which players to provide any bonus awards.

21 Claims, 29 Drawing Sheets

U.S. PATENT DOCUMENTS

| | | | |
|---|---|---|---|
| 4,494,197 | A | 1/1985 | Troy et al. |
| 4,572,509 | A | 2/1986 | Sitrick |
| 4,573,681 | A | 3/1986 | Okada |
| 4,582,324 | A | 4/1986 | Koza et al. |
| 4,624,459 | A | 11/1986 | Kaufman |
| 4,636,951 | A | 1/1987 | Harlick |
| 4,652,998 | A | 3/1987 | Koza et al. |
| 4,657,256 | A | 4/1987 | Okada |
| 4,669,731 | A | 6/1987 | Clarke |
| 4,695,053 | A | 9/1987 | Vazquez, Jr. et al. |
| 4,721,307 | A | 1/1988 | Okada |
| 4,743,024 | A | 5/1988 | Helm et al. |
| 4,752,068 | A | 6/1988 | Endo |
| 4,760,527 | A | 7/1988 | Sidley |
| 4,764,666 | A | 8/1988 | Bergeron |
| 4,772,023 | A | 9/1988 | Okada |
| 4,775,155 | A | 10/1988 | Lees |
| 4,805,907 | A | 2/1989 | Hagiwara |
| 4,836,553 | A | 6/1989 | Suttle et al. |
| 4,837,728 | A | 6/1989 | Barrie et al. |
| 4,842,278 | A | 6/1989 | Markowicz |
| 4,856,787 | A | 8/1989 | Itkis |
| 4,861,041 | A | 8/1989 | Jones et al. |
| 4,866,515 | A | 9/1989 | Tagawa et al. |
| 4,871,171 | A | 10/1989 | Rivero |
| 4,880,237 | A | 11/1989 | Kishishita |
| 4,924,378 | A | 5/1990 | Hershey et al. |
| 4,926,327 | A | 5/1990 | Sidley |
| 4,964,638 | A | 10/1990 | Ishida |
| 4,991,848 | A | 2/1991 | Greenwood et al. |
| 5,016,880 | A | 5/1991 | Berge |
| 5,038,022 | A | 8/1991 | Lucero |
| 5,048,833 | A | 9/1991 | Lamle |
| 5,074,559 | A | 12/1991 | Okada |
| 5,078,405 | A | 1/1992 | Jones et al. |
| 5,085,435 | A | 2/1992 | Rossides |
| 5,116,055 | A | 5/1992 | Tracy |
| 5,123,649 | A | 6/1992 | Tiberio |
| 5,127,651 | A | 7/1992 | Okada |
| 5,138,712 | A | 8/1992 | Corbin |
| 5,142,622 | A | 8/1992 | Owens |
| 5,158,293 | A | 10/1992 | Mullins |
| 5,178,390 | A | 1/1993 | Okada |
| 5,179,517 | A | 1/1993 | Sarbin et al. |
| 5,209,479 | A | 5/1993 | Nagao |
| 5,217,224 | A | 6/1993 | Sincock |
| 5,249,800 | A | 10/1993 | Hilgendorf et al. |
| 5,259,616 | A | 11/1993 | Bergmann |
| 5,265,874 | A | 11/1993 | Dickinson et al. |
| 5,275,400 | A | 1/1994 | Weingardt |
| 5,276,312 | A | 1/1994 | McCarthy |
| 5,277,424 | A | 1/1994 | Wilms |
| 5,280,909 | A | 1/1994 | Tracy |
| 5,282,620 | A | 2/1994 | Keesee |
| 5,286,023 | A | 2/1994 | Wood |
| 5,288,077 | A | 2/1994 | Jones |
| 5,288,978 | A | 2/1994 | Iijima |
| 5,290,033 | A | 3/1994 | Bittner et al. |
| 5,292,127 | A | 3/1994 | Kelly et al. |
| 5,305,195 | A | 4/1994 | Murphy |
| 5,321,241 | A | 6/1994 | Craine |
| 5,324,035 | A | 6/1994 | Morris et al. |
| 5,326,104 | A | 7/1994 | Pease et al. |
| 5,332,219 | A | 7/1994 | Marnell, II et al. |
| 5,342,047 | A | 8/1994 | Heidel et al. |
| 5,342,049 | A | 8/1994 | Wichinsky et al. |
| 5,344,144 | A | 9/1994 | Canon |
| 5,349,642 | A | 9/1994 | Kingdon |
| 5,351,970 | A | 10/1994 | Fioretti |
| 5,362,053 | A | 11/1994 | Miller |
| 5,364,104 | A | 11/1994 | Jones et al. |
| 5,375,206 | A | 12/1994 | Hunter et al. |
| 5,377,993 | A | 1/1995 | Josephs |
| 5,380,008 | A | 1/1995 | Mathis et al. |
| 5,393,057 | A | 2/1995 | Marnell, II |
| 5,398,932 | A | 3/1995 | Eberhardt et al. |
| 5,401,024 | A | 3/1995 | Simunek |
| 5,403,015 | A | 4/1995 | Forte et al. |
| 5,404,567 | A | 4/1995 | DePietro et al. |
| 5,417,430 | A | 5/1995 | Breeding |
| 5,423,539 | A | 6/1995 | Nagao |
| 5,429,361 | A | 7/1995 | Raven et al. |
| 5,430,791 | A | 7/1995 | Feit et al. |
| 5,438,508 | A | 8/1995 | Wyman |
| 5,449,173 | A | 9/1995 | Thomas et al. |
| 5,456,465 | A | 10/1995 | Durham |
| 5,465,082 | A | 11/1995 | Chaco |
| 5,470,079 | A | 11/1995 | LeStrange et al. |
| 5,472,194 | A | 12/1995 | Breeding et al. |
| 5,472,196 | A | 12/1995 | Rusnak |
| 5,476,259 | A | 12/1995 | Weingardt |
| 5,489,101 | A | 2/1996 | Moody |
| 5,494,287 | A | 2/1996 | Manz |
| 5,499,340 | A | 3/1996 | Barritz |
| 5,507,489 | A | 4/1996 | Reibel et al. |
| 5,507,491 | A | 4/1996 | Gatto et al. |
| 5,511,781 | A | 4/1996 | Wood |
| 5,524,888 | A | 6/1996 | Heidel |
| 5,530,232 | A | 6/1996 | Taylor |
| 5,536,016 | A | 7/1996 | Thompson |
| 5,542,669 | A | 8/1996 | Charron et al. |
| 5,544,893 | A | 8/1996 | Jones et al. |
| 5,547,192 | A | 8/1996 | Ishibashi |
| 5,559,313 | A | 9/1996 | Claus et al. |
| 5,560,603 | A | 10/1996 | Seeling et al. |
| 5,564,700 | A | 10/1996 | Celona |
| 5,564,701 | A | 10/1996 | Dettor |
| 5,566,337 | A | 10/1996 | Szymanski |
| 5,570,885 | A | 11/1996 | Ornstein |
| 5,575,474 | A | 11/1996 | Rossides |
| 5,578,808 | A | 11/1996 | Taylor |
| 5,580,053 | A | 12/1996 | Crouch |
| 5,580,309 | A | 12/1996 | Piechowiak et al. |
| 5,580,311 | A | 12/1996 | Haste, III |
| 5,584,483 | A | 12/1996 | Sines et al. |
| 5,584,485 | A | 12/1996 | Jones et al. |
| 5,584,763 | A | 12/1996 | Kelly et al. |
| 5,586,257 | A | 12/1996 | Perlman |
| 5,586,766 | A | 12/1996 | Forte et al. |
| 5,586,936 | A | 12/1996 | Bennett et al. |
| 5,586,937 | A | 12/1996 | Menashe |
| 5,601,487 | A | 2/1997 | Oshima |
| 5,605,506 | A | 2/1997 | Hoorn et al. |
| 5,609,525 | A | 3/1997 | Ohno et al. |
| 5,611,535 | A | 3/1997 | Tiberio |
| 5,611,730 | A | 3/1997 | Weiss |
| 5,613,912 | A | 3/1997 | Slater |
| 5,617,331 | A | 4/1997 | Wakai et al. |
| 5,620,182 | A | 4/1997 | Rossides |
| 5,626,341 | A | 5/1997 | Jones |
| 5,630,757 | A | 5/1997 | Gagin et al. |
| 5,639,088 | A | 6/1997 | Schneider et al. |
| 5,640,192 | A | 6/1997 | Garfinkle |
| 5,641,050 | A | 6/1997 | Smith et al. |
| 5,643,086 | A | 7/1997 | Alcorn et al. |
| 5,645,486 | A | 7/1997 | Nagao et al. |
| 5,649,118 | A | 7/1997 | Carlisle et al. |
| 5,651,548 | A | 7/1997 | French et al. |
| 5,655,961 | A | 8/1997 | Acres et al. |
| 5,664,998 | A | 9/1997 | Seelig et al. |
| 5,671,412 | A | 9/1997 | Christiano |
| 5,674,128 | A | 10/1997 | Holch et al. |
| 5,676,372 | A | 10/1997 | Sines et al. |
| 5,702,304 | A | 12/1997 | Acres et al. |
| 5,707,285 | A | 1/1998 | Place et al. |
| 5,707,286 | A | 1/1998 | Carlson |
| 5,708,709 | A | 1/1998 | Rose |
| 5,717,604 | A | 2/1998 | Wiggins |
| 5,722,891 | A | 3/1998 | Inoue |
| 5,732,948 | A | 3/1998 | Yoseloff |
| 5,735,742 | A | 4/1998 | French |
| 5,741,183 | A | 4/1998 | Acres et al. |
| 5,743,798 | A | 4/1998 | Adams et al. |
| 5,743,800 | A | 4/1998 | Huard et al. |
| 5,745,879 | A | 4/1998 | Wyman |
| 5,749,784 | A | 5/1998 | Clapper, Jr. |
| 5,752,882 | A | 5/1998 | Acres et al. |

| | | | |
|---|---|---|---|
| 5,755,621 | A | 5/1998 | Marks et al. |
| 5,758,069 | A | 5/1998 | Olsen |
| 5,759,102 | A | 6/1998 | Pease et al. |
| 5,761,647 | A | 6/1998 | Boushy |
| 5,762,552 | A | 6/1998 | Vuong |
| 5,766,076 | A | 6/1998 | Pease et al. |
| 5,768,382 | A | 6/1998 | Schneier et al. |
| 5,769,716 | A | 6/1998 | Saffari et al. |
| 5,770,533 | A | 6/1998 | Franchi |
| 5,772,509 | A | 6/1998 | Weiss |
| 5,772,511 | A | 6/1998 | Smeltzer |
| RE35,864 | E | 7/1998 | Weingardt |
| 5,775,692 | A | 7/1998 | Watts et al. |
| 5,775,993 | A | 7/1998 | Fentz et al. |
| 5,779,545 | A | 7/1998 | Berg et al. |
| 5,779,547 | A | 7/1998 | SoRelle et al. |
| 5,779,549 | A | 7/1998 | Walker et al. |
| 5,781,647 | A | 7/1998 | Fishbine et al. |
| 5,788,573 | A | 8/1998 | Baerlocher et al. |
| 5,800,268 | A | 9/1998 | Molnick |
| 5,800,269 | A | 9/1998 | Holch et al. |
| 5,806,855 | A | 9/1998 | Cherry |
| 5,807,172 | A | 9/1998 | Piechowiak |
| 5,809,482 | A | 9/1998 | Strisower |
| 5,816,918 | A | 10/1998 | Kelly et al. |
| 5,820,459 | A | 10/1998 | Acres et al. |
| 5,823,874 | A | 10/1998 | Adams |
| 5,827,119 | A | 10/1998 | Bromley |
| 5,828,840 | A | 10/1998 | Cowan et al. |
| 5,830,063 | A | 11/1998 | Brune |
| 5,833,537 | A | 11/1998 | Barrie |
| 5,833,538 | A | 11/1998 | Weiss |
| 5,833,540 | A | 11/1998 | Miodunski et al. |
| 5,836,817 | A | 11/1998 | Acres et al. |
| 5,845,283 | A | 12/1998 | Williams et al. |
| 5,848,932 | A | 12/1998 | Adams |
| 5,851,011 | A | 12/1998 | Lott |
| 5,851,148 | A | 12/1998 | Brune et al. |
| 5,851,149 | A | 12/1998 | Xidos et al. |
| 5,855,514 | A | 1/1999 | Kamille |
| 5,855,515 | A | 1/1999 | Pease et al. |
| 5,871,398 | A | 2/1999 | Schneier et al. |
| 5,876,283 | A | 3/1999 | Parra et al. |
| 5,876,284 | A | 3/1999 | Acres et al. |
| 5,882,261 | A | 3/1999 | Adams |
| 5,885,158 | A | 3/1999 | Torango et al. |
| 5,890,963 | A | 4/1999 | Yen |
| 5,902,184 | A | 5/1999 | Bennett |
| 5,902,983 | A | 5/1999 | Crevelt et al. |
| 5,903,732 | A | 5/1999 | Reed et al. |
| 5,905,248 | A | 5/1999 | Russell et al. |
| 5,910,048 | A | 6/1999 | Feinberg |
| 5,913,164 | A | 6/1999 | Pawa et al. |
| 5,917,725 | A | 6/1999 | Thacher et al. |
| 5,918,039 | A | 6/1999 | Buswell et al. |
| 5,919,088 | A | 7/1999 | Weiss |
| 5,925,127 | A | 7/1999 | Ahmad |
| 5,934,998 | A | 8/1999 | Forte et al. |
| 5,934,999 | A | 8/1999 | Valdez |
| 5,941,773 | A | 8/1999 | Harlick |
| 5,944,606 | A | 8/1999 | Gerow |
| 5,947,820 | A | 9/1999 | Morro et al. |
| 5,947,822 | A | 9/1999 | Weiss |
| 5,951,011 | A | 9/1999 | Potter et al. |
| 5,951,611 | A | 9/1999 | La Pierre |
| 5,957,775 | A | 9/1999 | Cherry |
| 5,957,776 | A | 9/1999 | Hoehne |
| 5,970,143 | A | 10/1999 | Schneier et al. |
| 5,971,271 | A | 10/1999 | Wynn et al. |
| 5,971,849 | A | 10/1999 | Falciglia |
| 5,974,409 | A | 10/1999 | Sanu et al. |
| 5,980,384 | A | 11/1999 | Barrie |
| 5,983,190 | A | 11/1999 | Trower, II et al. |
| 5,984,779 | A | 11/1999 | Bridgeman et al. |
| 5,989,121 | A | 11/1999 | Sakamoto |
| 5,991,760 | A | 11/1999 | Gauvin et al. |
| 5,991,790 | A | 11/1999 | Shah et al. |
| 5,993,316 | A | 11/1999 | Coyle et al. |
| 5,996,068 | A | 11/1999 | Dwyer, III et al. |
| 5,997,002 | A | 12/1999 | Goldman |
| 5,997,400 | A | 12/1999 | Seelig et al. |
| 5,997,401 | A | 12/1999 | Crawford |
| 5,999,808 | A | 12/1999 | La Due |
| 6,001,016 | A | 12/1999 | Walker et al. |
| 6,003,066 | A | 12/1999 | Ryan et al. |
| 6,003,094 | A | 12/1999 | Dean |
| 6,003,123 | A | 12/1999 | Carter et al. |
| 6,004,207 | A | 12/1999 | Wilson, Jr. et al. |
| 6,004,211 | A | 12/1999 | Brenner et al. |
| 6,007,427 | A | 12/1999 | Wiener |
| 6,011,850 | A | 1/2000 | Bertrand et al. |
| 6,012,045 | A | 1/2000 | Barzilai |
| 6,012,832 | A | 1/2000 | Saunders et al. |
| 6,012,982 | A | 1/2000 | Piechowiak et al. |
| 6,012,983 | A | 1/2000 | Walker et al. |
| 6,015,344 | A | 1/2000 | Kelly et al. |
| 6,015,346 | A | 1/2000 | Bennett |
| 6,019,368 | A | 2/2000 | Sines et al. |
| 6,024,640 | A | 2/2000 | Walker et al. |
| 6,030,288 | A | 2/2000 | Davis et al. |
| 6,039,648 | A | 3/2000 | Guinn et al. |
| 6,039,649 | A | 3/2000 | Schulze |
| 6,039,650 | A | 3/2000 | Hill |
| 6,048,269 | A | 4/2000 | Burns et al. |
| 6,050,895 | A | 4/2000 | Luciano et al. |
| 6,056,289 | A | 5/2000 | Clapper, Jr. |
| 6,056,642 | A | 5/2000 | Bennett |
| 6,059,289 | A | 5/2000 | Vancura |
| 6,059,659 | A | 5/2000 | Busch et al. |
| 6,065,752 | A | 5/2000 | Beltran |
| 6,068,552 | A | 5/2000 | Walker et al. |
| 6,068,553 | A | 5/2000 | Parker |
| 6,071,190 | A | 6/2000 | Weiss et al. |
| 6,077,162 | A | 6/2000 | Weiss |
| 6,077,163 | A | 6/2000 | Walker et al. |
| 6,080,062 | A | 6/2000 | Olson |
| 6,082,887 | A | 7/2000 | Feuer et al. |
| 6,085,247 | A | 7/2000 | Parsons, Jr. et al. |
| 6,089,975 | A | 7/2000 | Dunn |
| 6,089,976 | A | 7/2000 | Schneider et al. |
| 6,089,977 | A | 7/2000 | Bennett |
| 6,089,978 | A | 7/2000 | Adams |
| 6,089,980 | A | 7/2000 | Gauselmann |
| 6,089,982 | A | 7/2000 | Holch et al. |
| 6,099,408 | A | 8/2000 | Schneier et al. |
| 6,106,396 | A | 8/2000 | Alcorn et al. |
| 6,108,420 | A | 8/2000 | Larose et al. |
| 6,110,041 | A | 8/2000 | Walker et al. |
| 6,110,043 | A | 8/2000 | Olsen |
| 6,113,098 | A | 9/2000 | Adams |
| 6,113,495 | A | 9/2000 | Walker et al. |
| 6,117,011 | A | 9/2000 | Lvov |
| 6,117,013 | A | 9/2000 | Eiba |
| 6,126,542 | A | 10/2000 | Fier |
| 6,135,884 | A | 10/2000 | Hedrick et al. |
| 6,135,887 | A | 10/2000 | Pease et al. |
| 6,141,737 | A | 10/2000 | Krantz et al. |
| 6,142,872 | A | 11/2000 | Walker et al. |
| 6,146,270 | A | 11/2000 | Huard et al. |
| 6,146,273 | A | 11/2000 | Olsen |
| 6,149,521 | A | 11/2000 | Sanduski |
| 6,149,522 | A | 11/2000 | Alcorn et al. |
| 6,151,707 | A | 11/2000 | Hecksel et al. |
| 6,152,823 | A | 11/2000 | Lacoste et al. |
| 6,155,925 | A | 12/2000 | Giobbi et al. |
| 6,158,741 | A | 12/2000 | Koelling |
| 6,159,097 | A | 12/2000 | Gura |
| 6,159,098 | A | 12/2000 | Slomiany et al. |
| 6,162,121 | A | 12/2000 | Morro et al. |
| 6,162,122 | A | 12/2000 | Acres et al. |
| 6,165,069 | A | 12/2000 | Sines et al. |
| 6,165,071 | A | 12/2000 | Weiss |
| 6,167,523 | A | 12/2000 | Strong |
| 6,168,520 | B1 | 1/2001 | Baerlocher et al. |
| 6,179,710 | B1 | 1/2001 | Sawyer et al. |
| 6,179,711 | B1 | 1/2001 | Yoseloff |
| 6,183,362 | B1 | 2/2001 | Boushy |
| 6,183,366 | B1 | 2/2001 | Goldberg et al. |

| | | | |
|---|---|---|---|
| 6,186,894 | B1 | 2/2001 | Mayeroff |
| 6,190,255 | B1 | 2/2001 | Thomas et al. |
| 6,203,010 | B1 | 3/2001 | Jorasch et al. |
| 6,203,430 | B1 | 3/2001 | Walker et al. |
| 6,206,374 | B1 | 3/2001 | Jones |
| 6,206,782 | B1 | 3/2001 | Walker et al. |
| 6,210,275 | B1 | 4/2001 | Olsen |
| 6,210,277 | B1 | 4/2001 | Stefan |
| 6,217,448 | B1 | 4/2001 | Olsen |
| 6,219,836 | B1 | 4/2001 | Wells et al. |
| 6,220,961 | B1 | 4/2001 | Keane et al. |
| 6,224,482 | B1 | 5/2001 | Bennett |
| 6,224,483 | B1 | 5/2001 | Mayeroff |
| 6,224,484 | B1 | 5/2001 | Okuda et al. |
| 6,224,486 | B1 | 5/2001 | Walker et al. |
| 6,227,972 | B1 | 5/2001 | Walker et al. |
| 6,231,442 | B1 | 5/2001 | Mayeroff |
| 6,231,445 | B1 | 5/2001 | Acres |
| 6,234,896 | B1 | 5/2001 | Walker et al. |
| 6,234,897 | B1 | 5/2001 | Frohm et al. |
| 6,234,900 | B1 | 5/2001 | Cumbers |
| 6,238,288 | B1 | 5/2001 | Walker et al. |
| 6,241,608 | B1 | 6/2001 | Torango |
| 6,244,958 | B1 | 6/2001 | Acres |
| 6,251,014 | B1 | 6/2001 | Stockdale et al. |
| 6,254,481 | B1 | 7/2001 | Jaffe |
| 6,254,483 | B1 | 7/2001 | Acres |
| 6,257,981 | B1 | 7/2001 | Acres et al. |
| 6,264,557 | B1 | 7/2001 | Schneier et al. |
| 6,264,561 | B1 | 7/2001 | Saffari et al. |
| 6,267,671 | B1 | 7/2001 | Hogan |
| 6,270,404 | B2 | 8/2001 | Sines et al. |
| 6,270,409 | B1 | 8/2001 | Shuster |
| 6,270,412 | B1 | 8/2001 | Crawford et al. |
| 6,273,820 | B1 | 8/2001 | Haste, III |
| 6,287,194 | B1 | 9/2001 | Okada et al. |
| 6,287,200 | B1 | 9/2001 | Sharma |
| 6,287,202 | B1 | 9/2001 | Pascal et al. |
| 6,293,546 | B1 | 9/2001 | Hessing et al. |
| 6,293,866 | B1 | 9/2001 | Walker et al. |
| RE37,414 | E | 10/2001 | Harlick |
| 6,296,569 | B1 | 10/2001 | Congello, Jr. |
| 6,299,167 | B1 | 10/2001 | Sines et al. |
| 6,299,536 | B1 | 10/2001 | Hill |
| 6,302,790 | B1 | 10/2001 | Brossard |
| 6,302,793 | B1 | 10/2001 | Fertitta, III et al. |
| 6,302,794 | B1 | 10/2001 | Ogawa |
| 6,304,905 | B1 | 10/2001 | Clark |
| 6,308,271 | B2 | 10/2001 | Tanaka |
| 6,309,298 | B1 | 10/2001 | Gerow |
| 6,309,300 | B1 | 10/2001 | Glavich |
| 6,311,976 | B1 | 11/2001 | Yoseloff et al. |
| 6,312,330 | B1 | 11/2001 | Jones et al. |
| 6,312,332 | B1 | 11/2001 | Walker et al. |
| 6,312,333 | B1 | 11/2001 | Acres |
| 6,313,871 | B1 | 11/2001 | Schubert |
| 6,315,662 | B1 | 11/2001 | Jorasch et al. |
| 6,319,122 | B1 | 11/2001 | Packes, Jr. et al. |
| 6,319,125 | B1 | 11/2001 | Acres |
| 6,319,127 | B1 | 11/2001 | Walker et al. |
| 6,322,309 | B1 | 11/2001 | Thomas et al. |
| 6,328,649 | B1 | 12/2001 | Randall et al. |
| 6,334,814 | B1 | 1/2002 | Adams |
| 6,336,857 | B1 | 1/2002 | McBride |
| 6,336,862 | B1 | 1/2002 | Brune |
| 6,340,158 | B2 | 1/2002 | Preice et al. |
| 6,345,386 | B1 | 2/2002 | Delo et al. |
| 6,346,043 | B1 | 2/2002 | Colin et al. |
| 6,347,738 | B1 | 2/2002 | Crevelt et al. |
| 6,347,996 | B1 | 2/2002 | Gilmore et al. |
| 6,352,260 | B1 | 3/2002 | Santiago |
| 6,353,928 | B1 | 3/2002 | Altberg et al. |
| 6,354,946 | B1 | 3/2002 | Finn |
| 6,358,147 | B1 | 3/2002 | Jaffe et al. |
| 6,358,149 | B1 | 3/2002 | Schneider et al. |
| 6,358,150 | B1 | 3/2002 | Mir et al. |
| 6,361,437 | B1 | 3/2002 | Walker et al. |
| 6,361,441 | B1 | 3/2002 | Walker et al. |
| 6,364,314 | B1 | 4/2002 | Canterbury |
| 6,364,765 | B1 | 4/2002 | Walker et al. |
| 6,364,766 | B1 | 4/2002 | Anderson et al. |
| 6,364,768 | B1 | 4/2002 | Acres et al. |
| 6,364,769 | B1 | 4/2002 | Weiss et al. |
| 6,365,765 | B1 | 4/2002 | Baldwin et al. |
| 6,368,216 | B1 | 4/2002 | Hedrick et al. |
| 6,371,852 | B1 | 4/2002 | Acres |
| 6,375,567 | B1 | 4/2002 | Acres |
| 6,375,568 | B1 | 4/2002 | Roffman et al. |
| 6,375,569 | B1 | 4/2002 | Acres |
| 6,379,248 | B1 | 4/2002 | Jorasch et al. |
| 6,383,074 | B1 | 5/2002 | Boggs |
| 6,389,538 | B1 | 5/2002 | Gruse et al. |
| 6,389,589 | B1 | 5/2002 | Mishra et al. |
| 6,394,907 | B1 | 5/2002 | Rowe |
| 6,397,381 | B1 | 5/2002 | Delo et al. |
| 6,398,218 | B1 | 6/2002 | Vancura |
| 6,398,643 | B1 | 6/2002 | Knowles et al. |
| 6,402,614 | B1 | 6/2002 | Schneier et al. |
| 6,406,369 | B1 | 6/2002 | Baerlocher et al. |
| 6,409,602 | B1 | 6/2002 | Wiltshire et al. |
| 6,416,408 | B2 | 7/2002 | Tracy et al. |
| 6,416,409 | B1 | 7/2002 | Jordan |
| 6,418,554 | B1 | 7/2002 | Delo et al. |
| 6,419,579 | B1 | 7/2002 | Bennett |
| 6,419,583 | B1 | 7/2002 | Crumby et al. |
| 6,422,940 | B1 | 7/2002 | Walker et al. |
| 6,425,828 | B2 | 7/2002 | Walker et al. |
| 6,427,227 | B1 | 7/2002 | Chamberlain |
| 6,428,412 | B1 | 8/2002 | Anderson et al. |
| 6,431,983 | B2 | 8/2002 | Acres |
| 6,435,511 | B1 | 8/2002 | Vancura et al. |
| 6,435,968 | B1 | 8/2002 | Torango |
| 6,439,996 | B2 | 8/2002 | LeMay et al. |
| 6,442,529 | B1 | 8/2002 | Krishan et al. |
| 6,443,452 | B1 | 9/2002 | Brune |
| 6,443,839 | B2 | 9/2002 | Stockdale et al. |
| 6,450,887 | B1 | 9/2002 | Mir et al. |
| 6,454,651 | B1 | 9/2002 | Yoseloff |
| 6,457,175 | B1 | 9/2002 | Lerche |
| RE37,885 | E | 10/2002 | Acres et al. |
| 6,460,848 | B1 | 10/2002 | Soltys et al. |
| 6,461,241 | B1 | 10/2002 | Webb et al. |
| 6,464,581 | B1 | 10/2002 | Yoseloff et al. |
| 6,471,208 | B2 | 10/2002 | Yoseloff et al. |
| 6,481,713 | B2 | 11/2002 | Perrie et al. |
| 6,481,718 | B2 | 11/2002 | Koelling |
| 6,485,367 | B1 | 11/2002 | Joshi |
| 6,488,585 | B1 | 12/2002 | Wells et al. |
| 6,503,146 | B2 | 1/2003 | Walker et al. |
| 6,503,147 | B1 | 1/2003 | Stockdale et al. |
| 6,506,117 | B2 | 1/2003 | DeMar |
| 6,506,118 | B1 | 1/2003 | Baerlocher et al. |
| 6,508,710 | B1 | 1/2003 | Paravia et al. |
| 6,511,376 | B2 | 1/2003 | Walker et al. |
| 6,514,140 | B1 | 2/2003 | Storch |
| 6,517,435 | B2 | 2/2003 | Soltys et al. |
| 6,520,854 | B1 | 2/2003 | McNally |
| 6,523,166 | B1 | 2/2003 | Mishra et al. |
| 6,527,638 | B1 | 3/2003 | Walker et al. |
| 6,530,837 | B2 | 3/2003 | Soltys et al. |
| 6,532,297 | B1 | 3/2003 | Lindquist |
| 6,532,543 | B1 | 3/2003 | Smith et al. |
| 6,533,273 | B2 | 3/2003 | Cole et al. |
| 6,533,276 | B2 | 3/2003 | Soltys et al. |
| 6,533,662 | B2 | 3/2003 | Soltys et al. |
| 6,533,664 | B1 | 3/2003 | Crumby |
| 6,537,150 | B1 | 3/2003 | Luciano et al. |
| 6,546,134 | B1 | 4/2003 | Shrairman et al. |
| 6,546,374 | B1 | 4/2003 | Esposito et al. |
| 6,547,131 | B1 | 4/2003 | Foodman et al. |
| 6,554,705 | B1 | 4/2003 | Cumbers |
| 6,558,253 | B1 | 5/2003 | DeSimone et al. |
| 6,558,255 | B2 | 5/2003 | Walker et al. |
| 6,561,904 | B2 | 5/2003 | Locke et al. |
| 6,565,434 | B1 | 5/2003 | Acres |
| 6,569,015 | B1 | 5/2003 | Baerlocher et al. |
| 6,572,471 | B1 | 6/2003 | Bennett |
| 6,575,832 | B1 | 6/2003 | Manfredi et al. |

6,578,199 B1 6/2003 Tsou et al.
6,579,180 B2 6/2003 Soltys et al.
6,589,115 B2 7/2003 Walker et al.
6,592,457 B1 7/2003 Frohm et al.
6,592,458 B1 7/2003 Ho
6,592,459 B2 7/2003 Parra et al.
6,592,460 B2 7/2003 Torango
6,595,853 B1 7/2003 Osawa
6,595,856 B1 7/2003 Ginsburg et al.
6,599,185 B1 7/2003 Kaminkow et al.
6,599,190 B2 7/2003 Osawa
6,599,193 B2 7/2003 Baerlocher et al.
6,607,438 B2 8/2003 Baerlocher et al.
6,607,439 B2 8/2003 Schneier et al.
6,607,441 B1 8/2003 Acres
6,609,973 B1 8/2003 Weiss
6,609,978 B1 8/2003 Paulsen
6,612,574 B1 9/2003 Cole et al.
6,612,575 B1 9/2003 Cole et al.
6,620,046 B2 9/2003 Rowe
6,620,047 B1 9/2003 Alcorn et al.
6,626,758 B1 9/2003 Parham et al.
6,628,939 B2 9/2003 Paulsen
6,632,141 B2 10/2003 Webb et al.
6,634,944 B2 10/2003 Osawa
6,637,747 B1 10/2003 Garrod
6,638,164 B2 10/2003 Randall et al.
6,638,167 B1 10/2003 Sawyer et al.
6,638,170 B1 10/2003 Crumby
6,645,074 B2 11/2003 Thomas et al.
6,645,077 B2 11/2003 Rowe
6,648,753 B1 11/2003 Tracy et al.
6,648,759 B2 11/2003 Vancura
6,648,762 B2 11/2003 Walker et al.
6,652,378 B2 11/2003 Cannon et al.
6,656,046 B1 12/2003 Yoseloff et al.
6,656,047 B1 12/2003 Tarantino et al.
6,656,048 B2 12/2003 Olsen
6,656,052 B2 12/2003 Abramopoulos et al.
6,659,866 B2 12/2003 Frost et al.
6,663,488 B1 12/2003 Adams
6,663,489 B2 12/2003 Baerlocher
6,672,589 B1 1/2004 Lemke et al.
6,672,959 B2 1/2004 Moody et al.
6,675,152 B1 1/2004 Prasad et al.
6,676,512 B2 1/2004 Fong et al.
6,682,419 B2 1/2004 Webb et al.
6,682,420 B2 1/2004 Webb et al.
6,682,421 B1 1/2004 Rowe et al.
6,682,423 B2 1/2004 Brosnan et al.
6,685,567 B2 2/2004 Cockerille et al.
6,692,354 B2 2/2004 Tracy et al.
6,692,355 B2 2/2004 Baerlocher et al.
6,699,124 B2 3/2004 Suchocki
6,702,674 B1 3/2004 De Bruin et al.
6,709,330 B1 3/2004 Klein et al.
6,712,695 B2 3/2004 Mothwurf et al.
6,712,697 B2 3/2004 Acres
6,712,699 B2 3/2004 Walker et al.
6,712,702 B2 3/2004 Goldberg et al.
6,719,288 B2 4/2004 Hessing et al.
6,719,630 B1 4/2004 Seelig et al.
6,722,974 B2 4/2004 Sines et al.
6,722,981 B2 4/2004 Kaminkow
6,722,985 B2 4/2004 Criss-Puszkiewicz et al.
6,722,986 B1 4/2004 Lyons et al.
6,726,563 B1 4/2004 Baerlocher et al.
6,729,957 B2 5/2004 Burns et al.
6,729,958 B2 5/2004 Burns et al.
6,733,389 B2 5/2004 Webb et al.
6,733,390 B2 5/2004 Walker et al.
6,736,725 B2 5/2004 Burns et al.
6,739,973 B1 5/2004 Lucchesi et al.
6,745,236 B1 6/2004 Hawkins et al.
6,746,327 B2 6/2004 Frohm et al.
6,746,328 B2 6/2004 Cannon et al.
6,749,510 B2 6/2004 Giobbi
6,754,346 B2 6/2004 Eiserling et al.
6,755,742 B1 6/2004 Hartman et al.
6,758,748 B2 7/2004 Byrne
6,758,751 B2 7/2004 Soltys et al.
6,758,757 B2 7/2004 Luciano, Jr. et al.
6,761,632 B2 7/2004 Bansemer et al.
6,776,711 B1 8/2004 Baerlocher
6,776,713 B2 8/2004 Gauselmann
6,776,714 B2 8/2004 Ungaro et al.
6,776,715 B2 8/2004 Price
6,780,111 B2 8/2004 Cannon et al.
6,782,477 B2 8/2004 McCarroll
6,786,824 B2 9/2004 Cannon
6,790,141 B2 9/2004 Muir
6,790,142 B2 9/2004 Okada et al.
6,790,143 B2 9/2004 Crumby
6,793,578 B2 9/2004 Luccesi et al.
6,800,026 B2 10/2004 Cannon
6,800,027 B2 10/2004 Giobbi et al.
6,800,030 B2 10/2004 Acres
6,802,774 B1 10/2004 Carlson et al.
6,802,778 B1 10/2004 LeMay et al.
6,804,763 B1 10/2004 Stockdale et al.
6,805,349 B2 10/2004 Baerlocher et al.
6,805,352 B2 10/2004 Hunter
6,805,634 B1 10/2004 Wells et al.
6,811,483 B1 11/2004 Webb et al.
6,811,486 B1 11/2004 Luciano, Jr.
6,811,488 B2 11/2004 Paravia et al.
6,813,765 B1 11/2004 Flores
6,814,664 B2 11/2004 Baerlocher et al.
6,816,882 B1 11/2004 Conner et al.
6,823,456 B1 11/2004 Dan et al.
6,824,465 B2 11/2004 Luciano, Jr.
6,830,515 B2 12/2004 Rowe
6,832,956 B1 12/2004 Boyd et al.
6,832,958 B2 12/2004 Acres et al.
6,834,245 B2 12/2004 Ota et al.
6,835,132 B2 12/2004 Bennett
6,836,794 B1 12/2004 Lucovsky et al.
6,837,788 B2 1/2005 Cannon
6,843,723 B2 1/2005 Joshi
6,843,725 B2 1/2005 Nelson
6,846,238 B2 1/2005 Wells
6,848,994 B1 2/2005 Knust et al.
6,848,995 B1 2/2005 Walker et al.
6,852,031 B1 2/2005 Rowe
6,855,054 B2 2/2005 White et al.
6,855,057 B2 2/2005 Namba et al.
6,857,958 B2 2/2005 Osawa
6,857,959 B1 2/2005 Nguyen
6,863,608 B1 3/2005 LeMay et al.
6,866,581 B2 3/2005 Martinek et al.
6,866,584 B2 3/2005 Michaelson
6,866,586 B2 3/2005 Oberberger et al.
6,869,076 B1 3/2005 Moore et al.
6,869,360 B2 3/2005 Marks et al.
6,869,361 B2 3/2005 Sharpless et al.
6,875,106 B2 4/2005 Weiss et al.
6,875,109 B2 4/2005 Stockdale
6,875,110 B1 4/2005 Crumby
6,878,063 B2 4/2005 Manfredi et al.
6,884,162 B2 4/2005 Raverdy et al.
6,884,166 B2 4/2005 Leen et al.
6,884,168 B2 4/2005 Wood et al.
6,884,170 B2 4/2005 Rowe
6,884,171 B2 4/2005 Eck et al.
6,884,173 B2 4/2005 Gauselmann
6,884,174 B2 4/2005 Lundy et al.
6,887,151 B2 5/2005 Leen et al.
6,887,154 B1 5/2005 Luciano, Jr. et al.
6,887,156 B2 5/2005 DeWeese et al.
6,889,159 B2 5/2005 Klotz et al.
6,889,849 B2 5/2005 Heidel et al.
6,890,256 B2 5/2005 Walker et al.
6,892,182 B1 5/2005 Rowe et al.
6,896,616 B2 5/2005 Weiss
6,896,618 B2 5/2005 Benoy et al.
6,899,620 B2 5/2005 Kaminkow et al.
6,899,625 B2 5/2005 Luciano, Jr. et al.
6,899,627 B2 5/2005 Lam et al.

| | | | |
|---|---|---|---|
| 6,899,628 | B2 | 5/2005 | Leen et al. |
| 6,901,375 | B2 | 5/2005 | Fernandez |
| 6,902,478 | B2 | 6/2005 | McClintic |
| 6,902,481 | B2 | 6/2005 | Breckner et al. |
| 6,905,406 | B2 | 6/2005 | Kaminkow et al. |
| 6,905,411 | B2 | 6/2005 | Nguyen et al. |
| 6,908,387 | B2 | 6/2005 | Hedrick et al. |
| 6,908,391 | B2 | 6/2005 | Gatto et al. |
| 6,910,964 | B2 | 6/2005 | Acres |
| 6,910,965 | B2 | 6/2005 | Downes |
| 6,916,245 | B1 * | 7/2005 | Vancura et al. ................ 463/26 |
| 6,918,832 | B2 | 7/2005 | Baerlocher et al. |
| 6,918,834 | B2 | 7/2005 | Vancura |
| 6,923,721 | B2 | 8/2005 | Luciano et al. |
| 6,932,707 | B2 | 8/2005 | Duhamel |
| 6,935,951 | B2 | 8/2005 | Paulsen et al. |
| 6,935,958 | B2 | 8/2005 | Nelson |
| 6,939,234 | B2 | 9/2005 | Beatty |
| 6,942,571 | B1 | 9/2005 | McAllister et al. |
| 6,942,574 | B1 | 9/2005 | Lemay et al. |
| 6,945,870 | B2 | 9/2005 | Gatto et al. |
| RE38,812 | E | 10/2005 | Acres et al. |
| 6,955,600 | B2 | 10/2005 | Glavich et al. |
| 6,966,834 | B1 | 11/2005 | Johnson |
| 6,969,319 | B2 | 11/2005 | Rowe et al. |
| 6,971,954 | B2 | 12/2005 | Randall et al. |
| 6,981,917 | B2 | 1/2006 | Webb et al. |
| 6,984,173 | B1 | 1/2006 | Piechowiak et al. |
| 6,984,174 | B2 | 1/2006 | Cannon et al. |
| 6,991,544 | B2 | 1/2006 | Soltys et al. |
| 6,997,807 | B2 | 2/2006 | Weiss |
| 7,008,321 | B2 | 3/2006 | Rowe et al. |
| 7,011,309 | B2 | 3/2006 | Soltys et al. |
| 7,011,581 | B2 | 3/2006 | Cole et al. |
| 7,017,805 | B2 | 3/2006 | Meehan |
| 7,018,291 | B1 | 3/2006 | Lemke et al. |
| 7,018,292 | B2 | 3/2006 | Tracy et al. |
| 7,025,674 | B2 | 4/2006 | Adams et al. |
| 7,029,395 | B1 | 4/2006 | Baerlocher |
| 7,037,191 | B2 | 5/2006 | Rodgers et al. |
| 7,040,982 | B1 | 5/2006 | Jarvis et al. |
| 7,040,985 | B2 | 5/2006 | Vancura |
| 7,048,629 | B2 | 5/2006 | Sines et al. |
| 7,051,004 | B2 | 5/2006 | Nuttal et al. |
| 7,052,395 | B2 | 5/2006 | Glavich et al. |
| 7,056,215 | B1 | 6/2006 | Olive |
| 7,063,617 | B2 | 6/2006 | Brosnan et al. |
| 7,066,814 | B2 | 6/2006 | Glavich et al. |
| 7,070,501 | B2 | 7/2006 | Cormack et al. |
| 7,070,503 | B2 | 7/2006 | Rudolph |
| 7,074,127 | B2 | 7/2006 | Cuddy et al. |
| 7,077,746 | B2 | 7/2006 | Torango |
| 7,081,050 | B2 | 7/2006 | Tarantino |
| 7,094,149 | B2 | 8/2006 | Walker et al. |
| 7,094,150 | B2 | 8/2006 | Ungaro et al. |
| 7,108,603 | B2 | 9/2006 | Olive |
| 7,114,718 | B2 | 10/2006 | Grauzer et al. |
| 7,121,942 | B2 | 10/2006 | Baerlocher et al. |
| 7,160,188 | B2 | 1/2007 | Kaminkow et al. |
| 7,165,769 | B2 | 1/2007 | Crenshaw et al. |
| 7,169,041 | B2 | 1/2007 | Tessmer et al. |
| 7,182,690 | B2 | 2/2007 | Giobbi et al. |
| 7,223,172 | B2 | 5/2007 | Baerlocher et al. |
| 7,226,358 | B2 | 6/2007 | Miller et al. |
| 7,331,868 | B2 | 2/2008 | Beaulieu et al. |
| 7,416,484 | B1 | 8/2008 | Nelson et al. |
| 2001/0003709 | A1 | 6/2001 | Adams |
| 2001/0024971 | A1 | 9/2001 | Brossard |
| 2001/0036857 | A1 | 11/2001 | Mothwurf et al. |
| 2001/0044337 | A1 | 11/2001 | Rowe et al. |
| 2001/0046893 | A1 | 11/2001 | Giobbi et al. |
| 2001/0049303 | A1 | 12/2001 | Found |
| 2001/0055990 | A1 | 12/2001 | Acres |
| 2002/0002674 | A1 | 1/2002 | Grimes et al. |
| 2002/0010018 | A1 | 1/2002 | Lemay et al. |
| 2002/0032049 | A1 | 3/2002 | Walker et al. |
| 2002/0034977 | A1 | 3/2002 | Burns et al. |
| 2002/0039919 | A1 | 4/2002 | Joshi et al. |
| 2002/0042298 | A1 | 4/2002 | Soltys et al. |
| 2002/0042299 | A1 | 4/2002 | Soltys et al. |
| 2002/0045484 | A1 | 4/2002 | Eck et al. |
| 2002/0049909 | A1 | 4/2002 | Jackson et al. |
| 2002/0057800 | A1 | 5/2002 | Gordon et al. |
| 2002/0058546 | A2 | 5/2002 | Acres |
| 2002/0068625 | A1 | 6/2002 | Soltys et al. |
| 2002/0068629 | A1 | 6/2002 | Allen et al. |
| 2002/0068631 | A1 | 6/2002 | Raverdy et al. |
| 2002/0071557 | A1 | 6/2002 | Nguyen |
| 2002/0071560 | A1 | 6/2002 | Kurn et al. |
| 2002/0072405 | A1 | 6/2002 | Soltys et al. |
| 2002/0072407 | A1 | 6/2002 | Soltys et al. |
| 2002/0077173 | A1 | 6/2002 | Luciano, Jr. et al. |
| 2002/0077174 | A1 | 6/2002 | Luciano et al. |
| 2002/0080969 | A1 | 6/2002 | Giobbi |
| 2002/0093136 | A1 | 7/2002 | Moody |
| 2002/0094871 | A1 | 7/2002 | Luciano, Jr. et al. |
| 2002/0107065 | A1 | 8/2002 | Rowe |
| 2002/0116615 | A1 | 8/2002 | Nguyen et al. |
| 2002/0137217 | A1 | 9/2002 | Rowe |
| 2002/0138594 | A1 | 9/2002 | Rowe |
| 2002/0142846 | A1 | 10/2002 | Paulsen |
| 2002/0144116 | A1 | 10/2002 | Giobbi |
| 2002/0151349 | A1 | 10/2002 | Joshi |
| 2002/0151356 | A1 | 10/2002 | Burns et al. |
| 2002/0151360 | A1 | 10/2002 | Durham et al. |
| 2002/0152120 | A1 | 10/2002 | Howington |
| 2002/0160826 | A1 | 10/2002 | Gomez et al. |
| 2002/0165023 | A1 | 11/2002 | Brosnan et al. |
| 2002/0169022 | A1 | 11/2002 | Canterbury |
| 2002/0173355 | A1 | 11/2002 | Walker et al. |
| 2002/0174160 | A1 | 11/2002 | Gatto et al. |
| 2002/0174444 | A1 | 11/2002 | Gatto et al. |
| 2002/0177480 | A1 | 11/2002 | Rowe |
| 2002/0177483 | A1 | 11/2002 | Cannon |
| 2002/0183105 | A1 | 12/2002 | Cannon et al. |
| 2002/0187834 | A1 | 12/2002 | Rowe et al. |
| 2002/0188940 | A1 | 12/2002 | Breckner et al. |
| 2002/0196342 | A1 | 12/2002 | Walker et al. |
| 2003/0013515 | A1 | 1/2003 | Rowe et al. |
| 2003/0013531 | A1 | 1/2003 | Rowe et al. |
| 2003/0027625 | A1 | 2/2003 | Rowe |
| 2003/0027630 | A1 | 2/2003 | Kelly et al. |
| 2003/0027638 | A1 | 2/2003 | Schneider et al. |
| 2003/0032474 | A1 | 2/2003 | Kaminkow |
| 2003/0032485 | A1 | 2/2003 | Cockerille et al. |
| 2003/0036422 | A1 | 2/2003 | Baerlocher et al. |
| 2003/0036427 | A1 | 2/2003 | Brandstetter et al. |
| 2003/0045350 | A1 | 3/2003 | Baerlocher et al. |
| 2003/0045351 | A1 | 3/2003 | Gauselmann |
| 2003/0045353 | A1 | 3/2003 | Paulsen et al. |
| 2003/0045354 | A1 | 3/2003 | Giobbi |
| 2003/0050111 | A1 | 3/2003 | Saffari |
| 2003/0054878 | A1 | 3/2003 | Benoy et al. |
| 2003/0054879 | A1 | 3/2003 | Schneier et al. |
| 2003/0060259 | A1 | 3/2003 | Mierau et al. |
| 2003/0060266 | A1 | 3/2003 | Baerlocher |
| 2003/0060269 | A1 | 3/2003 | Paulsen et al. |
| 2003/0060279 | A1 | 3/2003 | Torango |
| 2003/0060286 | A1 | 3/2003 | Walker et al. |
| 2003/0064771 | A1 | 4/2003 | Morrow et al. |
| 2003/0064794 | A1 | 4/2003 | Mead et al. |
| 2003/0064807 | A1 | 4/2003 | Walker et al. |
| 2003/0069058 | A1 | 4/2003 | Byrne et al. |
| 2003/0073497 | A1 | 4/2003 | Nelson |
| 2003/0078094 | A1 | 4/2003 | Gatto et al. |
| 2003/0078101 | A1 | 4/2003 | Schneider et al. |
| 2003/0083943 | A1 | 5/2003 | Adams et al. |
| 2003/0087696 | A1 | 5/2003 | Soltys et al. |
| 2003/0090063 | A1 | 5/2003 | Jarvis et al. |
| 2003/0092477 | A1 | 5/2003 | Luciano, Jr. et al. |
| 2003/0092484 | A1 | 5/2003 | Schneider et al. |
| 2003/0092489 | A1 | 5/2003 | Veradej |
| 2003/0093669 | A1 | 5/2003 | Morais et al. |
| 2003/0100359 | A1 | 5/2003 | Loose et al. |
| 2003/0100361 | A1 | 5/2003 | Sharpless et al. |
| 2003/0100362 | A1 | 5/2003 | Horniak et al. |
| 2003/0100369 | A1 | 5/2003 | Gatto et al. |
| 2003/0100370 | A1 | 5/2003 | Gatto et al. |

2003/0100371 A1 5/2003 Gatto et al.
2003/0100372 A1 5/2003 Gatto et al.
2003/0106769 A1 6/2003 Weiss
2003/0114219 A1 6/2003 McClintic
2003/0115351 A1 6/2003 Giobbi
2003/0119576 A1 6/2003 McClintic et al.
2003/0119579 A1 6/2003 Walker et al.
2003/0125109 A1 7/2003 Green
2003/0140134 A1 7/2003 Swanson et al.
2003/0144965 A1 7/2003 Prasad et al.
2003/0151194 A1 8/2003 Hessing et al.
2003/0157979 A1 8/2003 Cannon et al.
2003/0162589 A1 8/2003 Nguyen et al.
2003/0171142 A1 9/2003 Kaji et al.
2003/0171145 A1 9/2003 Rowe
2003/0171149 A1 9/2003 Rothschild
2003/0174864 A1 9/2003 Lindquist
2003/0176219 A1 9/2003 Manfredi et al.
2003/0181231 A1 9/2003 Vancura et al.
2003/0182574 A1 9/2003 Whitten et al.
2003/0186733 A1 10/2003 Wolf et al.
2003/0188306 A1 10/2003 Harris et al.
2003/0190941 A1 10/2003 Byrne
2003/0195024 A1 10/2003 Slattery
2003/0195033 A1 10/2003 Gazdic et al.
2003/0199321 A1 10/2003 Williams
2003/0211879 A1 11/2003 Englman
2003/0211880 A1 11/2003 Locke
2003/0211881 A1 11/2003 Walker et al.
2003/0212597 A1 11/2003 Ollins
2003/0216182 A1 11/2003 Gauselmann
2003/0222402 A1 12/2003 Olive
2003/0223803 A1 12/2003 De Schrijver
2003/0224852 A1 12/2003 Walker et al.
2003/0228904 A1 12/2003 Acres et al.
2003/0228907 A1 12/2003 Gatto et al.
2003/0228912 A1 12/2003 Wells et al.
2003/0232647 A1 12/2003 Moser
2003/0232650 A1 12/2003 Beatty
2003/0236116 A1 12/2003 Marks et al.
2004/0002379 A1 1/2004 Parrott et al.
2004/0002381 A1 1/2004 Alcorn et al.
2004/0002385 A1 1/2004 Nguyen
2004/0003271 A1 1/2004 Bourne et al.
2004/0003389 A1 1/2004 Reynar et al.
2004/0005919 A1 1/2004 Walker et al.
2004/0009807 A1 1/2004 Miller et al.
2004/0009811 A1 1/2004 Torango
2004/0010700 A1 1/2004 Mont
2004/0015423 A1 1/2004 Walker et al.
2004/0023721 A1 2/2004 Giobbi
2004/0024666 A1 2/2004 Walker et al.
2004/0029631 A1 2/2004 Duhamel
2004/0029635 A1 2/2004 Giobbi
2004/0033831 A1 2/2004 Tarantino
2004/0038723 A1 2/2004 Schneier et al.
2004/0043813 A1 3/2004 Chamberlain et al.
2004/0048650 A1 3/2004 Mierau et al.
2004/0048660 A1 3/2004 Gentles et al.
2004/0048667 A1 3/2004 Rowe
2004/0053664 A1 3/2004 Byrne
2004/0053680 A1 3/2004 Schulz
2004/0054952 A1 3/2004 Morrow et al.
2004/0063489 A1 4/2004 Crumby
2004/0072604 A1 4/2004 Toyoda
2004/0072608 A1 4/2004 Toyoda
2004/0072615 A1 4/2004 Maya et al.
2004/0082373 A1 4/2004 Cole et al.
2004/0082385 A1 4/2004 Silva et al.
2004/0087360 A1 5/2004 Chamberlain et al.
2004/0087368 A1 5/2004 Gauselmann
2004/0092300 A1 5/2004 Gauselmann
2004/0092310 A1 5/2004 Brosnan et al.
2004/0097280 A1 5/2004 Gauselmann
2004/0098597 A1 5/2004 Giobbi
2004/0106448 A1 6/2004 Gauselmann
2004/0106452 A1 6/2004 Nguyen et al.
2004/0110555 A1 6/2004 Devaull et al.
2004/0110557 A1 6/2004 Rowe
2004/0124243 A1 7/2004 Gatto et al.
2004/0127279 A1 7/2004 Gatto et al.
2004/0132532 A1 7/2004 Brosnan et al.
2004/0133485 A1 7/2004 Schoonmaker et al.
2004/0142739 A1 7/2004 Loose et al.
2004/0142742 A1 7/2004 Schneider et al.
2004/0147309 A1 7/2004 Chamberlain et al.
2004/0152509 A1 8/2004 Hornik et al.
2004/0162144 A1 8/2004 Loose et al.
2004/0166923 A1 8/2004 Michaelson et al.
2004/0166931 A1 8/2004 Criss-Puszkiewicz et al.
2004/0166940 A1 8/2004 Rothschild
2004/0166942 A1 8/2004 Muir
2004/0176162 A1 9/2004 Rothschild
2004/0176167 A1 9/2004 Michaelson et al.
2004/0179701 A1 9/2004 Boyd
2004/0180721 A1 9/2004 Rowe
2004/0180722 A1 9/2004 Giobbi
2004/0185936 A1 9/2004 Block et al.
2004/0193726 A1 9/2004 Gatto et al.
2004/0198494 A1 10/2004 Nguyen et al.
2004/0198496 A1 10/2004 Gatto et al.
2004/0204244 A1 10/2004 Rathsack et al.
2004/0209662 A1 10/2004 Wadleigh
2004/0213408 A1 10/2004 Kim et al.
2004/0214622 A1 10/2004 Atkinson
2004/0214627 A1 10/2004 Jordan et al.
2004/0214640 A1 10/2004 Giobbi
2004/0214641 A1 10/2004 Giobbi
2004/0215756 A1 10/2004 VanAntwerp et al.
2004/0219962 A1 11/2004 Vancura
2004/0219967 A1 11/2004 Giobbi et al.
2004/0219983 A1 11/2004 Giobbi
2004/0224770 A1 11/2004 Wolf et al.
2004/0224777 A1 11/2004 Smith et al.
2004/0229684 A1 11/2004 Blackburn et al.
2004/0229698 A1 11/2004 Lind et al.
2004/0229699 A1 11/2004 Gentles et al.
2004/0235552 A1 11/2004 Gauselmann
2004/0235559 A1 11/2004 Brosnan et al.
2004/0235563 A1 11/2004 Blackburn et al.
2004/0242297 A1 12/2004 Walker
2004/0242298 A1 12/2004 Inamura et al.
2004/0242328 A1 12/2004 Blackburn et al.
2004/0242329 A1 12/2004 Blackburn et al.
2004/0242330 A1 12/2004 Blackburn et al.
2004/0242331 A1 12/2004 Blackburn et al.
2004/0243848 A1 12/2004 Blackburn et al.
2004/0243849 A1 12/2004 Blackburn et al.
2004/0248642 A1 12/2004 Rothschild
2004/0248645 A1 12/2004 Blackburn et al.
2004/0248646 A1 12/2004 Canterbury
2004/0248651 A1 12/2004 Gagner
2004/0251630 A1 12/2004 Sines et al.
2004/0254006 A1 12/2004 Lam et al.
2004/0254013 A1 12/2004 Quraishi et al.
2004/0254014 A1 12/2004 Quraishi et al.
2004/0254954 A1 12/2004 Gatto et al.
2004/0255139 A1 12/2004 Giobbi
2004/0259629 A1 12/2004 Michaelson et al.
2004/0259633 A1 12/2004 Gentles et al.
2004/0259640 A1 12/2004 Gentles et al.
2004/0259643 A1 12/2004 Gentles
2004/0266532 A1 12/2004 Blackburn et al.
2004/0266533 A1 12/2004 Gentles et al.
2005/0003886 A1 1/2005 Englman et al.
2005/0003887 A1 1/2005 Seelig
2005/0009599 A1 1/2005 Ryan
2005/0009601 A1 1/2005 Manfredi et al.
2005/0009607 A1 1/2005 Russell et al.
2005/0010738 A1 1/2005 Stockdale et al.
2005/0012818 A1 1/2005 Kiely et al.
2005/0014554 A1 1/2005 Walker et al.
2005/0014557 A1 1/2005 Duhamel
2005/0014559 A1 1/2005 Mattice et al.
2005/0020342 A1 1/2005 Palmer et al.
2005/0020354 A1 1/2005 Nguyen et al.
2005/0026679 A1 2/2005 Lucchesi et al.
2005/0026680 A1 2/2005 Gururajan

| | | | |
|---|---|---|---|
| 2005/0026683 | A1 | 2/2005 | Fujimoto |
| 2005/0026694 | A1 | 2/2005 | Kelly et al. |
| 2005/0032563 | A1 | 2/2005 | Sines |
| 2005/0032564 | A1 | 2/2005 | Sines |
| 2005/0032573 | A1 | 2/2005 | Acres et al. |
| 2005/0032577 | A1 | 2/2005 | Blackburn et al. |
| 2005/0037708 | A1 | 2/2005 | Torvinen |
| 2005/0037838 | A1 | 2/2005 | Dunuevsky et al. |
| 2005/0043072 | A1 | 2/2005 | Nelson |
| 2005/0043088 | A1 | 2/2005 | Nguyen et al. |
| 2005/0043090 | A1 | 2/2005 | Pryzby et al. |
| 2005/0043094 | A1 | 2/2005 | Nguyen et al. |
| 2005/0044535 | A1 | 2/2005 | Coppert |
| 2005/0049037 | A1 | 3/2005 | Anderson et al. |
| 2005/0051963 | A1 | 3/2005 | Snow |
| 2005/0054408 | A1 | 3/2005 | Steil et al. |
| 2005/0054431 | A1 | 3/2005 | Walker et al. |
| 2005/0054435 | A1 | 3/2005 | Rodgers et al. |
| 2005/0054438 | A1 | 3/2005 | Rothschild et al. |
| 2005/0054439 | A1 | 3/2005 | Rowe et al. |
| 2005/0054445 | A1 | 3/2005 | Gatto et al. |
| 2005/0054447 | A1 | 3/2005 | Hiroyama et al. |
| 2005/0054448 | A1 | 3/2005 | Frerking et al. |
| 2005/0059457 | A1 | 3/2005 | Rothschild et al. |
| 2005/0059467 | A1 | 3/2005 | Saffari et al. |
| 2005/0059493 | A1 | 3/2005 | Tyson et al. |
| 2005/0059494 | A1 | 3/2005 | Kammler |
| 2005/0064939 | A1 | 3/2005 | McSheffrey et al. |
| 2005/0070353 | A1 | 3/2005 | Webb et al. |
| 2005/0070356 | A1 | 3/2005 | Mothwurf |
| 2005/0075889 | A1 | 4/2005 | Gomes et al. |
| 2005/0075983 | A1 | 4/2005 | St. Denis |
| 2005/0079908 | A1 | 4/2005 | Pacey |
| 2005/0079911 | A1 | 4/2005 | Nakatsu |
| 2005/0085287 | A1 | 4/2005 | Sines |
| 2005/0086286 | A1 | 4/2005 | Gatto et al. |
| 2005/0086478 | A1 | 4/2005 | Peinado et al. |
| 2005/0090313 | A1 | 4/2005 | Rowe |
| 2005/0096114 | A1 | 5/2005 | Cannon et al. |
| 2005/0096125 | A1 | 5/2005 | LeMay et al. |
| 2005/0096126 | A1 | 5/2005 | Prasad et al. |
| 2005/0096133 | A1 | 5/2005 | Hoefelmeyer et al. |
| 2005/0097342 | A1 | 5/2005 | Gatto et al. |
| 2005/0101370 | A1 | 5/2005 | Lind et al. |
| 2005/0101374 | A1 | 5/2005 | Acres |
| 2005/0101375 | A1 | 5/2005 | Webb et al. |
| 2005/0101384 | A1 | 5/2005 | Parham |
| 2005/0113172 | A1 | 5/2005 | Gong |
| 2005/0114272 | A1 | 5/2005 | Herrmann et al. |
| 2005/0119045 | A1 | 6/2005 | Fujimoto |
| 2005/0119046 | A1 | 6/2005 | Fujimoto |
| 2005/0119047 | A1 | 6/2005 | Olive |
| 2005/0119048 | A1 | 6/2005 | Soltys et al. |
| 2005/0130731 | A1 | 6/2005 | Englmann et al. |
| 2005/0130737 | A1 | 6/2005 | Englmann et al. |
| 2005/0137012 | A1 | 6/2005 | Michaealson |
| 2005/0143168 | A1 | 6/2005 | Torango |
| 2005/0143169 | A1 | 6/2005 | Nguyen et al. |
| 2005/0148385 | A1 | 7/2005 | Michaealson |
| 2005/0153767 | A1 | 7/2005 | Gauselmann |
| 2005/0153768 | A1 | 7/2005 | Paulsen |
| 2005/0153773 | A1 | 7/2005 | Nguyen et al. |
| 2005/0159207 | A1 | 7/2005 | Thomas |
| 2005/0159211 | A1 | 7/2005 | Englman |
| 2005/0163377 | A1 | 7/2005 | Walch |
| 2005/0164781 | A1 | 7/2005 | Lindquist |
| 2005/0176488 | A1 | 8/2005 | Olive |
| 2005/0181860 | A1 | 8/2005 | Nguyen et al. |
| 2005/0192083 | A1 | 9/2005 | Iwamoto |
| 2005/0192099 | A1 | 9/2005 | Nguyen et al. |
| 2005/0209004 | A1 | 9/2005 | Torango |
| 2005/0221881 | A1 | 10/2005 | Lannert |
| 2005/0239542 | A1 | 10/2005 | Olsen |
| 2005/0239546 | A1 | 10/2005 | Hedrick et al. |
| 2005/0261059 | A1 | 11/2005 | Nguyen et al. |
| 2005/0261060 | A1 | 11/2005 | Nguyen et al. |
| 2005/0261061 | A1 | 11/2005 | Nguyen et al. |
| 2005/0266919 | A1 | 12/2005 | Rowe et al. |
| 2005/0267610 | A1 | 12/2005 | Shinoda |
| 2005/0278716 | A1 | 12/2005 | Koppen et al. |
| 2005/0282622 | A1 | 12/2005 | Lindquist |
| 2005/0282626 | A1 | 12/2005 | Manfredi et al. |
| 2005/0282629 | A1 | 12/2005 | Gagner |
| 2005/0282638 | A1 | 12/2005 | Rowe |
| 2006/0001211 | A1 | 1/2006 | Lewis et al. |
| 2006/0003829 | A1 | 1/2006 | Thomas |
| 2006/0009273 | A2 | 1/2006 | Moshal |
| 2006/0009285 | A1 | 1/2006 | Pryzby et al. |
| 2006/0019739 | A1 | 1/2006 | Soltys et al. |
| 2006/0019747 | A1 | 1/2006 | Loose et al. |
| 2006/0019750 | A1 | 1/2006 | Beatty |
| 2006/0025210 | A1 | 2/2006 | Johnson |
| 2006/0026604 | A1 | 2/2006 | Tan et al. |
| 2006/0030397 | A1 | 2/2006 | Chan |
| 2006/0030403 | A1 | 2/2006 | Lafky et al. |
| 2006/0030409 | A1 | 2/2006 | Lechner et al. |
| 2006/0031829 | A1 | 2/2006 | Harris et al. |
| 2006/0035694 | A1 | 2/2006 | Fuller |
| 2006/0035705 | A1 | 2/2006 | Jordan et al. |
| 2006/0035706 | A1 | 2/2006 | Thomas et al. |
| 2006/0036552 | A1 | 2/2006 | Gunyakti et al. |
| 2006/0036573 | A1 | 2/2006 | Watanabe et al. |
| 2006/0039132 | A1 | 2/2006 | Chen |
| 2006/0040723 | A1 | 2/2006 | Baerlocher et al. |
| 2006/0040732 | A1 | 2/2006 | Baerlocher et al. |
| 2006/0040733 | A1 | 2/2006 | Baerlocher et al. |
| 2006/0040734 | A1 | 2/2006 | Baerlocher et al. |
| 2006/0040736 | A1 | 2/2006 | Baerlocher et al. |
| 2006/0046830 | A1 | 3/2006 | Webb |
| 2006/0046839 | A1 | 3/2006 | Nguyen |
| 2006/0052159 | A1 | 3/2006 | Cahill et al. |
| 2006/0052161 | A1 | 3/2006 | Soukup et al. |
| 2006/0052162 | A1 | 3/2006 | Soukup et al. |
| 2006/0058082 | A1 | 3/2006 | Crawford, III et al. |
| 2006/0058083 | A1 | 3/2006 | Crawford, III et al. |
| 2006/0058084 | A1 | 3/2006 | Crawford, III et al. |
| 2006/0058085 | A1 | 3/2006 | White et al. |
| 2006/0058086 | A1 | 3/2006 | White et al. |
| 2006/0058087 | A1 | 3/2006 | White et al. |
| 2006/0058088 | A1 | 3/2006 | Crawford, III et al. |
| 2006/0058089 | A1 | 3/2006 | White et al. |
| 2006/0058090 | A1 | 3/2006 | Crawford, III et al. |
| 2006/0058091 | A1 | 3/2006 | Crawford, III et al. |
| 2006/0058092 | A1 | 3/2006 | Crawford, III et al. |
| 2006/0058093 | A1 | 3/2006 | White et al. |
| 2006/0066052 | A1 | 3/2006 | White et al. |
| 2006/0068498 | A1 | 3/2006 | White et al. |
| 2006/0068864 | A1 | 3/2006 | White et al. |
| 2006/0068865 | A1 | 3/2006 | White et al. |
| 2006/0068866 | A1 | 3/2006 | White et al. |
| 2006/0068868 | A1 | 3/2006 | Crawford, III et al. |
| 2006/0068869 | A1 | 3/2006 | White et al. |
| 2006/0068870 | A1 | 3/2006 | Crawford, III et al. |
| 2006/0068871 | A1 | 3/2006 | Crawford, III et al. |
| 2006/0068879 | A1 | 3/2006 | Crawford, III et al. |
| 2006/0068892 | A1 | 3/2006 | Gomez et al. |
| 2006/0068893 | A1 | 3/2006 | Jaffe et al. |
| 2006/0068897 | A1 | 3/2006 | Sanford et al. |
| 2006/0068899 | A1 | 3/2006 | White et al. |
| 2006/0073885 | A1 | 4/2006 | Rowe et al. |
| 2006/0073887 | A1 | 4/2006 | Nguyen et al. |
| 2006/0073889 | A1 | 4/2006 | Edidin et al. |
| 2006/0073897 | A1 | 4/2006 | Englman et al. |
| 2006/0079316 | A1 | 4/2006 | Flemming et al. |
| 2006/0079317 | A1 | 4/2006 | Flemming et al. |
| 2006/0084495 | A1 | 4/2006 | Jaffe et al. |
| 2006/0084496 | A1 | 4/2006 | Jaffe et al. |
| 2006/0084502 | A1 | 4/2006 | Downs et al. |
| 2006/0089194 | A1 | 4/2006 | Joshi et al. |
| 2006/0094508 | A1 | 5/2006 | D'Amico et al. |
| 2006/0116201 | A1 | 6/2006 | Gauselmann |
| 2006/0143085 | A1 | 6/2006 | Adams et al. |
| 2006/0148561 | A1 | 7/2006 | Moser |
| 2006/0154718 | A1 | 7/2006 | Willyard et al. |
| 2006/0160600 | A1 | 7/2006 | Hill et al. |
| 2006/0160608 | A1 | 7/2006 | Hill et al. |
| 2006/0160611 | A1 | 7/2006 | Okada |
| 2006/0165254 | A1 | 7/2006 | Fujimoto et al. |

| | | | |
|---|---|---|---|
| 2006/0177109 A1 | 8/2006 | Storch | |
| 2006/0183537 A1 | 8/2006 | Dickerson | |
| 2006/0183538 A1 | 8/2006 | Michaelson et al. | |
| 2006/0194633 A1 | 8/2006 | Paulsen | |
| 2006/0199629 A1 | 9/2006 | Sines et al. | |
| 2006/0202422 A1 | 9/2006 | Bahar | |
| 2006/0205472 A1 | 9/2006 | Sines et al. | |
| 2006/0211486 A1 | 9/2006 | Walker et al. | |
| 2006/0211487 A1 | 9/2006 | Walker et al. | |
| 2006/0211488 A1 | 9/2006 | Walker et al. | |
| 2006/0217183 A1 | 9/2006 | Mierau et al. | |
| 2006/0223638 A1 | 10/2006 | Koyama et al. | |
| 2006/0252521 A1 | 11/2006 | Gururajan et al. | |
| 2006/0252554 A1 | 11/2006 | Gururajan et al. | |
| 2006/0258427 A1 | 11/2006 | Rowe et al. | |
| 2006/0258442 A1 | 11/2006 | Ryan | |
| 2006/0264252 A1 | 11/2006 | White et al. | |
| 2006/0287036 A1 | 12/2006 | Daly et al. | |
| 2006/0287066 A1 | 12/2006 | Crawford, III et al. | |
| 2006/0287067 A1 | 12/2006 | White et al. | |
| 2006/0287077 A1 | 12/2006 | Grav et al. | |
| 2006/0287101 A1 | 12/2006 | Crawford, III et al. | |
| 2006/0287102 A1 | 12/2006 | White et al. | |
| 2006/0287103 A1 | 12/2006 | Crawford, III et al. | |
| 2006/0287104 A1 | 12/2006 | White et al. | |
| 2006/0287107 A1 | 12/2006 | Okada | |
| 2006/0293099 A1 | 12/2006 | Cooper | |
| 2007/0004519 A1 | 1/2007 | Swart et al. | |
| 2007/0015585 A1 | 1/2007 | Sartini et al. | |
| 2007/0021182 A1 | 1/2007 | Gauselmann | |
| 2007/0060237 A1 | 3/2007 | Rowe et al. | |
| 2007/0060316 A1 | 3/2007 | O'Halloran | |
| 2007/0060319 A1 | 3/2007 | Block et al. | |
| 2007/0077988 A1 | 4/2007 | Friedman | |
| 2007/0077993 A1 | 4/2007 | Midgley et al. | |
| 2007/0105613 A1 | 5/2007 | Adams et al. | |
| 2007/0111787 A1 | 5/2007 | Adams et al. | |
| 2007/0117616 A1 | 5/2007 | Bartholomew | |
| 2007/0129131 A1 | 6/2007 | Kaminkow et al. | |
| 2007/0155482 A1 | 7/2007 | Walker et al. | |
| 2007/0155483 A1 | 7/2007 | Walker et al. | |
| 2007/0155484 A1 | 7/2007 | Walker et al. | |
| 2007/0202943 A1 | 8/2007 | Thomas | |
| 2007/0254734 A1 | 11/2007 | Gilmore et al. | |
| 2007/0259706 A1 | 11/2007 | Anderson et al. | |
| 2007/0259713 A1 | 11/2007 | Fiden et al. | |
| 2007/0265060 A1 | 11/2007 | Hornik et al. | |
| 2007/0298856 A1 | 12/2007 | Gilmore et al. | |
| 2008/0020842 A1 | 1/2008 | Kaminkow et al. | |
| 2008/0214263 A1 | 9/2008 | Walker et al. | |

FOREIGN PATENT DOCUMENTS

| | | | |
|---|---|---|---|
| AU | 81/66683 | | 8/1981 |
| AU | 524709 | | 9/1982 |
| AU | 84/25946 | | 2/1985 |
| AU | 555905 | | 10/1986 |
| AU | 567001 | | 11/1987 |
| AU | 585160 | | 6/1989 |
| AU | 589158 | | 10/1989 |
| AU | 593059 | | 2/1990 |
| AU | 630112 | | 3/1990 |
| AU | 628330 | | 9/1992 |
| AU | 633469 | | 1/1993 |
| AU | 667210 | | 2/1993 |
| AU | 680920 | | 2/1994 |
| AU | 649009 | | 5/1994 |
| AU | 94/71515 | | 8/1994 |
| AU | 655801 | | 1/1995 |
| AU | 709724 | | 2/1997 |
| AU | 96/69806 | | 6/1997 |
| AU | 96/69807 | | 6/1997 |
| AU | PO 7780 | | 7/1997 |
| AU | PO 9090 | | 9/1997 |
| AU | PO 9102 | | 9/1997 |
| AU | 733599 | | 10/1997 |
| AU | 97/45197 | | 1/1998 |
| AU | 96/62115 | | 2/1998 |
| AU | 1997/45403 | | 6/1998 |
| AU | 97/43615 | | 7/1998 |
| AU | 1997/24645 | | 7/1998 |
| AU | 755826 | | 8/1998 |
| AU | 1998/74161 | | 9/1998 |
| AU | 98/63553 | A | 10/1998 |
| AU | 1998/63716 | | 11/1998 |
| AU | 98/84162 | | 3/1999 |
| AU | 1998/87937 | | 3/1999 |
| AU | 1999/10969 | | 5/1999 |
| AU | 707687 | | 7/1999 |
| AU | 714299 | | 8/1999 |
| AU | 99/17318 | | 9/1999 |
| AU | 768285 | | 9/1999 |
| AU | 711501 | | 10/1999 |
| AU | 746082 | | 10/1999 |
| AU | 756180 | | 10/1999 |
| AU | 753102 | | 11/1999 |
| AU | 765084 | | 11/1999 |
| AU | 760617 | | 1/2000 |
| AU | 716299 | | 2/2000 |
| AU | 721968 | | 7/2000 |
| AU | 722107 | | 7/2000 |
| AU | 728788 | | 1/2001 |
| AU | 744569 | | 3/2001 |
| AU | 771847 | | 3/2001 |
| AU | 2001 100032 | | 11/2001 |
| AU | 2001 100033 | | 11/2001 |
| AU | 748263 | | 5/2002 |
| AU | 749222 | | 6/2002 |
| AU | 754689 | | 11/2002 |
| AU | 758306 | | 3/2003 |
| BR | 9300123 | | 8/1994 |
| DE | 3415114 | | 11/1985 |
| DE | 3917683 | | 12/1990 |
| DE | 4200254 | | 8/1993 |
| EP | 0 342 797 | | 11/1989 |
| EP | 0 444 932 | | 2/1991 |
| EP | 0 420 586 | | 4/1991 |
| EP | 0 770 415 | | 2/1997 |
| EP | 0 798 676 | | 10/1997 |
| EP | 0 813 132 | | 12/1997 |
| EP | 0 843 272 | | 5/1998 |
| EP | 0 874 337 | | 10/1998 |
| EP | 0 952 563 | | 2/1999 |
| EP | 0 945 837 | | 3/1999 |
| EP | 0 926 645 | | 6/1999 |
| EP | 0 944 030 | | 9/1999 |
| EP | 0 984 409 | | 3/2000 |
| EP | 1 004 970 | | 5/2000 |
| EP | 1 175 928 | | 1/2002 |
| EP | 1 298 609 | | 4/2003 |
| EP | 1 199 690 | | 2/2004 |
| EP | 1 238 688 | | 5/2004 |
| EP | 1 637 196 | | 9/2004 |
| EP | 1 467 329 | | 10/2004 |
| EP | 1 498 860 | | 1/2005 |
| EP | 1 378 873 | | 3/2005 |
| EP | 1 513 114 | | 3/2005 |
| EP | 1 378 874 | | 5/2005 |
| EP | 1 471 710 | | 5/2005 |
| EP | 1 528 516 | | 5/2005 |
| EP | 1 528 517 | | 5/2005 |
| EP | 1 291 048 | | 6/2005 |
| GB | 2 072 395 | | 9/1981 |
| GB | 2 083 936 | | 3/1982 |
| GB | 2 117 952 | | 10/1983 |
| GB | 2 151 054 | | 10/1983 |
| GB | 2118445 | | 11/1983 |
| GB | 2 142 457 | | 6/1984 |
| GB | 2 137 392 | | 10/1984 |
| GB | 2 139 390 | | 11/1984 |
| GB | 2 144 644 | | 3/1985 |
| GB | 2 148 135 | | 3/1985 |
| GB | 2 147 773 | | 5/1985 |
| GB | 2 153 572 | | 8/1985 |
| GB | 2 170 636 | | 8/1986 |
| GB | 2 180 087 | | 3/1987 |
| GB | 2 191 030 | | 12/1987 |
| GB | 2 201 821 | | 9/1988 |
| GB | 2 211 975 | | 12/1989 |

| | | |
|---|---|---|
| GB | 2 222 712 | 3/1990 |
| GB | 2 230 373 | 10/1990 |
| GB | 2231189 | 11/1990 |
| GB | 2 262 642 | 6/1993 |
| GB | 2 282 690 | 4/1995 |
| GB | 2 328 311 | 2/1999 |
| GB | 2 333 880 | 8/1999 |
| GB | 2 353 128 | 2/2001 |
| GB | 2 387 703 | 10/2003 |
| JP | 05-184709 | 7/1993 |
| JP | 06-335560 | 12/1994 |
| JP | 7148307 | 6/1995 |
| JP | 09-192289 | 7/1997 |
| JP | 09-248384 | 9/1997 |
| JP | 10-033829 | 2/1998 |
| WO | WO 80/02512 | 11/1980 |
| WO | WO 94 12256 | 6/1994 |
| WO | WO 95 22811 | 8/1995 |
| WO | WO 95 30944 | 11/1995 |
| WO | WO 96 12262 | 4/1996 |
| WO | WO 96 24421 | 8/1996 |
| WO | WO 97/12315 | 4/1997 |
| WO | WO 97 12338 | 4/1997 |
| WO | WO 97 27568 | 7/1997 |
| WO | WO 98/07484 | 2/1998 |
| WO | WO 98/18532 | 5/1998 |
| WO | WO 98 35309 | 8/1998 |
| WO | WO 98 47115 | 10/1998 |
| WO | WO 98 51384 | 11/1998 |
| WO | WO 98/52665 | 11/1998 |
| WO | WO 99 03078 | 1/1999 |
| WO | WO 99 10849 | 3/1999 |
| WO | WO 99/29381 | 6/1999 |
| WO | WO 99 41718 | 8/1999 |
| WO | WO 99 60498 | 11/1999 |
| WO | WO 99/60498 | 11/1999 |
| WO | WO 99 65579 | 12/1999 |
| WO | WO 00/03775 | 1/2000 |
| WO | WO 00 12186 | 3/2000 |
| WO | WO 00 25281 | 5/2000 |
| WO | WO 00 32286 | 6/2000 |
| WO | WO 01 10523 | 2/2001 |
| WO | WO 01 15055 | 3/2001 |
| WO | WO 01 15790 | 3/2001 |
| WO | WO 01 61437 | 8/2001 |
| WO | WO 01/83062 | 11/2001 |
| WO | WO 01/83063 | 11/2001 |
| WO | WO 02/052515 | 7/2002 |
| WO | WO 03/013678 | 2/2003 |
| WO | WO 03/025867 | 3/2003 |
| WO | WO 03/026756 | 4/2003 |
| WO | WO03/030066 | 4/2003 |
| WO | WO 03 045515 | 6/2003 |
| WO | WO 03 045516 | 6/2003 |
| WO | WO 03 049054 | 6/2003 |
| WO | WO 03 063019 | 7/2003 |
| WO | WO 03 075235 | 9/2003 |
| WO | WO 2004 35161 | 4/2004 |
| WO | WO 2004 066061 | 8/2004 |
| WO | WO 2004 078297 | 9/2004 |
| WO | WO 2004 004855 | 11/2004 |
| WO | WO 2004 103495 | 12/2004 |
| WO | WO 2005 015826 | 2/2005 |
| WO | WO 2005 027058 | 3/2005 |
| WO | WO 2005/027063 | 3/2005 |
| WO | WO 2005 028056 | 3/2005 |
| WO | WO 2005 029220 | 3/2005 |
| WO | WO 2005/029287 | 3/2005 |
| WO | WO 2005 033825 | 4/2005 |
| WO | WO 2005 033826 | 4/2005 |
| WO | WO 2005 076193 | 8/2005 |
| WO | WO 2005 081623 | 9/2005 |
| WO | WO 2005/082480 | 9/2005 |
| WO | WO 2005 083599 | 9/2005 |
| WO | WO 2005/097280 | 10/2005 |
| WO | WO 2005 099425 | 10/2005 |
| WO | WO 2005 099845 | 10/2005 |
| WO | WO 2005 106702 | 11/2005 |
| WO | WO 2005 113093 | 12/2005 |
| WO | WO 2005 120672 | 12/2005 |
| WO | WO 2006/002241 | 1/2006 |
| WO | WO 2006/004831 | 1/2006 |
| WO | WO 2006/004832 | 1/2006 |
| WO | WO 2006/005073 | 1/2006 |
| WO | WO 2006 014770 | 2/2006 |
| WO | WO 2006 014833 | 2/2006 |
| WO | WO 2006/017036 | 2/2006 |
| WO | WO 2006/017067 | 2/2006 |
| WO | WO 2006/017068 | 2/2006 |
| WO | WO 2006/020413 | 2/2006 |
| WO | WO 2006/020811 | 2/2006 |
| WO | WO 2006/026250 | 3/2006 |
| WO | WO 2006 027677 | 3/2006 |
| WO | WO 2006 039067 | 4/2006 |
| WO | WO 2006 039366 | 4/2006 |
| WO | WO 2006/044252 | 4/2006 |
| WO | WO 2007 035388 | 3/2007 |
| WO | WO 2007/103054 | 9/2007 |
| WO | WO 2008/048634 | 4/2008 |

OTHER PUBLICATIONS

Acres Bonusing System User Manual, Version 4.3, 351 pp. (Feb. 15, 2000).
Action Jackpot's Advertisement, written by Atronic Casino Technology, published in Casino Journal, (Oct. 1996).
Action Jackpot's Brochure, written by Atronic Casino Technology, available prior to Aug. 2005.
Advantage Casino System Bonusing Brochure, written by IGT, available prior to Dec. 17, 2004.
Advantage Casino System Brochure, Mobile Data Access, written by IGT, available prior to Jul. 2007.
Advantage Casino System Brochure, NexGen Interactive Touch Screen Display, written by IGT, available prior to Jul. 2007.
Advantage Casino System Marketing Brochure, written by IGT, available prior to Jul. 2007.
Advantage Casino System Table Touch Brochure, written by IGT, 2004.
Aristocrat Buyer's Guide with ACES Ad, 2pp. (Mar.-May 1989).
Aristocrat Leisure Industries, written by Legato, published in Casino Journal, vol. 10, No. 1, pp. 87-89 (Jan. 1997).
*Aristocrat Technologies Australia Pty. Ltd.* v. *IGT* (Australia) [2007] FCA 37, dated Feb. 7, 2007.
Atronic Casino Technology, written by Legato, published in Casino Journal, vol. 10, No. 9, 3 pp. (Sep. 1997).
Atronic Systems Progressive Products at G2E, published by Atronic in 2004, printed from ForRelease.com.
Auction Fever Advertisement, written by Sierre Design Group, available prior to 2004.
Australia/New Zealand Gaming Machine National Standards, Revision 1.0, 127 pp. (Dec. 1997).
Bally Live-Server Based Gaming brochure, written by Bally Gaming Systems, published in 2006.
Bally Slot Machines Electro-Mechanicals 1964-1980 Book [in Part], Revised 3rd Edition written by Marshall Fey.
Believe it or Not Article, written by Strictly Slots, published in 2001.
Bingo Advertisement and Jackpot Bingo Advertisements, written by Casino Data Systems, published in 1998 and 2001.
Bonus Spin Diamond Fives Advertisement, written by IGT, published in 1999.
Bonus Times Article, written by Strictly Slots, published in Jul. 2000.
Bonusing Solutions without Limits brochure, written by Bally Gaming Systems, published in 2005.
Boom Advertisement, written by WMS Gaming, Inc., published in 1998.
Cartoon Jackpots description, printed from www.ballygaming.com/home.asp, on Feb. 4, 2005.
Cash Box Advertisement, written by Anchor Games, published in 2000.
Cash Express Advertisements, written by Aristocrat, published in 2002.
Catalogue of Champions Advertisement, written by Aristocrat, published in 1990.

Computa Game Equipment Manual written and compiled by Russell Campbell, Sep. 1990.
Computa Game, "The Software Manual", Revision 3 for Computa Game Software Version 2.41 written by Clive Davis et al., published by Computa Game Pty Ltd., Jul. 1991.
Derby Day Advertisement, written by Atronic Casino Technology (1996).
Double Spin Five Times Pay Advertisement, written by IGT, published prior to 2000.
Excerpt from Local Area Electronic Gaming Machine Communications Protocol, QCOM Version 1.5, by Queensland Treasury Office of Gaming Regulation printed Feb. 26, 1998.
Fast Buck Systems Manual, written by International Game Technology, available to Mirage shift supervisors at least as early as May 30, 1990.
Federal Court of Australia, *Jupiter's Ltd* v. *Neurizon Pty Ltd* [2005] FCAFC 90 (including description of Activadata gaming system), dated May 26, 2005.
Federal Court of Australia, *Neurizon Pty Ltd* v. *Jupiter's Ltd* [2004] FCA 1012 (including description of Activdata gaming system), dated Oct. 21, 2004.
Federal Court of Australia, *Neurizon Pty Ltd.* v. *LTH Consulting and Marketing Services Pty. Ltd.* [2002] FCA 1547 (including description of Mega Gold System), dated Dec. 13, 2002.
Full House Advertisement, written by Anchor Games, published in 2000.
Gaming Laboratories International, "GLI-11: Gaming Devices in Casinos, Version 1.4," 93 pp. (2006).
Gaming Laboratories International, "GLI-12: Progressive Gaming Devices in Casinos, Version 1.2," 35 pp. (2006).
Gold Exchange Advertisement, written by Bally, available prior to Nov. 2006.
Gold Fever Advertisement and Game Description written Casino Data System, published in 1997.
Good Times Vision Series Advertisement, written by IGT, published in 1999.
Integrated Real Time On-Line Slot System—SDI, written by GRIPS Electronic GmbH, printed from website reported as archived on Feb. 20, 1997 (available at http://web.archive.org/web/19970220165559/www.grips.com/sdi.htm).
Jackpot Carnival Hyperlink Advertisement, written by Aristocrat, published prior to 2002.
Jewel in the Crown Advertisement, written by IGT, published in 2000.
Lemons, Cherries and Bell-Fruit-Gum, 346 pp., written by Bueschel, published by Royal Bell Books, Nov. 1995.
Lemons, Cherries and Bell-Fruit-Gum, pp. 1 to 4 and 304 to 314, written by Bueschel, published in Royal Bell Books in Nov. 1995.
Mega Multiplier®, printed from www.wmsgaming.com, on May 22, 2001.
Mikohn Press Release, "New York—New York Hotel & Casino Unveils New Moneytime Slot Jackpot Spectacular From Mikohn," 2 pp. (Jul. 16, 1997).
Mikohn Product Catalog, Chapters 1, 2, 6, 7 and 8, written by Mikohn, published in Jan. 1993.
Mikohn Supper Controller Manual, Chapters 1 to 3 and 6 to 7, written by Mikohn, published in 1989.
Millioni$er articles, written by Strictly Slots, published in Sep. 2003 and Mar. 2004.
Money Time advertisement, written by Mikohn Gaming, published in 1999.
M-Slot Series Primary Reel Product description from Lemons, Cherries and Bell-Fruit-Gum, written by Richard M. Bueschel, published in 1995.
New South Wales, "Approved Poker Machines—Policy, Game Characteristics, Statistical Characteristics," vol. 1, Sec. 1, 88 pp. (Mar. 1995).
New South Wales, "Linked Progressive Jackpot Systems—Guidelines," vol. 3, Sec. 1, 61 pp. (Mar. 1995).
PEM—Precision Electronic Meter, written by GRIPS Electronic GmbH, printed from website reported as archived on Feb. 20, 1997 (available at http://web.archive.org/web/19970220165753/www.grips.com/pem.htm).
Penguin Pucks article, written by Note in Gaming Marketplace, published prior to 2004.
Player Tracking on Slots, written by GRIPS Electronic GmbH, printed from website reported as archived on Feb. 20, 1997 (available at http://web.archive.org/web/19970220165921/www.grips.com/playtrac.htm).
Progressive Jackpot System article, printed from casinomagazine.com.managearticle.asp@c_290&a=518, on Jun. 21, 2004.
ProLINK Progressive Controller User/Reference Manual, written by Casino Data Systems, published in Apr. 1997.
Queensland Office of Gaming Regulation, "Jackpot Systems Minimum Technical Requirements, Version 1.3," 32 pp. (Sep. 6, 2001).
Queensland Treasury Office of Gaming Regulation, "Local Area Electronic Gaming Machine Communication Protocol, Version 1.2," 64 pp. (Mar. 26, 1997).
Queensland Treasury Office of Gaming Regulation, "Local Area Electronic Gaming Machine Communications Protocol, QCOM Version 1.5," 77 p. (Feb. 26,1998).
Queensland Treasury Office of Gaming Regulation, "Local Area Electronic Gaming Machine Communications Protocol, QCOM Version 1.5.5," 99 pp. (Dec. 19, 2001).
SB Products—The Next Big Innovation, printed from www.igt.com in Aug. 2006.
Server Based: Other Possibilities Article; published by www.casinocenter.com in May 2006.
Slot Line Progressive Advertisement, written by IGT, published in 1993.
Slot Line Progressive Advertisement, written by IGT, published in 1994.
Slot Line Progressive Advertisement, written by IGT, published in 1995.
Slot Line Progressive Mega Jackpots Advertisement, written by IGT, published in 1997.
Slot Line Temperature Rising Game Description, written by IGT, published in 1998.
Slot Machines a Pictorial History of the First 100 Years (pp. 216, 242 to 243), $5^{th}$ edition, written by Marshall Fey, published in 1983-1997.
Slot Machines: A Pictorial History of the First 100 Years, Fourth Edition, 261 pp. (1994), written by Fey.
Super Cherry Advertisement, written by IGT, published in 2001.
Surprize Software Specification for MV2030—var 01, written by Aristocrat Leisure Industries, Australia, published prior to 2004.
Table iD™ System, written by TableID™, available prior to 2007.
Take Your Pick Article, written by Strictly Slots, published in Mar. 2001.
Tasmanian Gaming Commission, "Internet Gaming Technical Requirements, Version 3.0," 62 pp. (Jun. 2001).
Technical Aspects of Wide Area Gaming and Jackpots, written by Nicoll, published in AIC Casinos and Gaming Conference, 7 pp. (Feb. 24-26, 1999).
The Ever-Evolving Slot Floor, written by Quinn, published in Gaming Products & Services, pp. 15-17 (Nov. 1996).
The Future of Slots, written by Faust, published in Gaming Products & Services, 8 pp. (Oct. 1995).
The Power of the Progressive, written by Rutherford, published in Casino Journal, 6 pp. (Apr. 1998).
Transforming Gaming brochure, written by Cyberview Technology, published in 2006.
Victorian Casino and Gaming Authority, "Review of VCGA SRD for Gaming Equipment (Version 4.0) with Regard to Gaming Machine National Standards (Revision 1.0)," 72 pp. (Dec. 1997).
Victorian Casino and Gaming Authority, "Technical Requirements for Gaming Machines and Electronic Monitoring Systems in the Melbourne Casino," Version 3.0, 84 pp. (Jul. 10, 1996).
Wide Area Progressive Link System, written by GRIPS Electronic GmbH, printed from website reported as archived on Feb. 20, 1997 (available at http://web.archive.org/web/19970220165457/www.grips.com/wap.htm).
World of Slots, written by Legato, published in Casino Journal, vol. 9, No. 10, pp. 70-98, 145-146 (Oct. 1996).
World of Slots, written by Legato, published in Casino Journal, vol. 10, No. 10, 36 pp. (Oct. 1997).

World of Slots, written by Legato, published in Casino Journal, vol. 11, No. 9, 7 pp. (Sep. 1998).
Zorro Advertisement, written by Aristocrat, published in 2004.
Office Action for U.S. Appl. No. 11/204,214 dated May 28, 2009.
Aristocrat Brochure, written by Aristocrat Gaming, published in 2004.
Information Disclosure Statement and Form 1449 submitted by Aristocrat Leisure Industries Pty Ltd. on Apr. 16, 2007, in U.S. Appl. No. 11/365,007.
Information Disclosure Statement and Form 1449 submitted by Aristocrat Leisure Industries Pty Ltd. on Apr. 16, 2007, in U.S. Appl. No. 11/365,177.
Information Disclosure Statement and Form 1449 submitted by Aristocrat Leisure Industries Pty Ltd. on Apr. 16, 2007, in U.S. Appl. No. 11/445,969.
Documents related to the Surprize game, available prior to Aug. 2005 and submitted in Information Disclosure Statements dated Apr. 16, 2007 for U.S. Appl. Nos. 11/365,007, 11/365,177 and 11/445,969.
Documents related to the Surprize(MV2030) game, available prior to Aug. 2005 and submitted in Information Disclosure Statements dated Apr. 16, 2007 for U.S. Appl. Nos. 11/365,007, 11/365,177 and 11/445,969.
Documents related to the Fast Buck game, available prior to Aug. 2005 and submitted in Information Disclosure Statements dated Apr. 16, 2007 for U.S. Appl. Nos. 11/365,007, 11/365,177 and 11/445,969.
Documents related to Down-loaded System Awards Regulations, available prior to Aug. 2005 and submitted in Information Disclosure Statements dated Apr. 16, 2007 for U.S. Appl. Nos. 11/365,007, 11/365,177 and 11/445,969.
Documents related to the ACES game, available prior to Aug. 2005 and submitted in Information Disclosure Statements dated Apr. 16, 2007 for U.S. Appl. Nos. 11/365,007, 11/365,177 and 11/445,969.
Documents related to the Best-and-Fairest game, available prior to Aug. 2005 and submitted in Information Disclosure Statements dated Apr. 16, 2007 for U.S. Appl. Nos. 11/365,007, 11/365,177 and 11/445,969.
Documents related to the Cricketer game, available prior to Aug. 2005 and submitted in Information Disclosure Statements dated Apr. 16, 2007 for U.S. Appl. Nos. 11/365,007, 11/365,177 and 11/445,969.
Documents related to the Thrillions game, available prior to Aug. 2005 and submitted in Information Disclosure Statements dated Apr. 16, 2007 for U.S. Appl. Nos. 11/365,007, 11/365,177 and 11/445,969.
U.S. Appl. No. 60/083,299, filed by ACrres on Apr. 28, 1998.

* cited by examiner

FIG. 7

| GAMING MACHINE | WAGERED MONETARY UNITS | ACTIVE | APPLICABLE ACCUMULATION WAGER POOL MONETARY UNITS | PROBABILITY OF BEING SELECTED |
|---|---|---|---|---|
| 14a | 110 | YES | 220 | 50% |
| 14b | 77 | YES | 220 | 35% |
| 14z | 33 | YES | 220 | 15% |

FIG. 8A

| GAMING MACHINE | WAGERED MONETARY UNITS | ACTIVE | APPLICABLE ACCUMULATION WAGER POOL MONETARY UNITS | PROBABILITY OF BEING SELECTED |
|---|---|---|---|---|
| 14a | 110 | NO | 0 | 0% |
| 14b | 77 | YES | 110 | 70% |
| 14z | 33 | YES | 110 | 30% |

FIG. 8B

| GAMING MACHINE | WAGERED MONETARY UNITS | ACTIVE | APPLICABLE ACCUMULATION WAGER POOL MONETARY UNITS | PROBABILITY OF BEING SELECTED FOR PRIMARY BONUS AWARD | PROBABILITY OF BEING SELECTED FOR SECONDARY BONUS AWARD |
|---|---|---|---|---|---|
| 14a | 110 | NO | 0 | 0% | 0% |
| 14b | 77 | YES | 110 | 70% | 70% |
| 14z | 33 | YES | 110 | 30% | 30% |

FIG. 8C

| GAMING MACHINE | WAGERED MONETARY UNITS | ACTIVE | APPLICABLE ACCUMULATION WAGER POOL MONETARY UNITS | PROBABILITY OF BEING SELECTED | PARTICIPATION IN GROUP EVENT |
|---|---|---|---|---|---|
| 14a | 176 | YES | 220 | 80% | PARTICIPANT #2; PARTICIPANT #3 |
| 14b | 11 | YES | 220 | 5% | PARTICIPANT #1 |
| 14z | 33 | YES | 220 | 15% | |

FIG. 9

| GAMING MACHINE | WAGERED MONETARY UNITS | ACTIVE | APPLICABLE ACCUMULATION WAGER POOL MONETARY UNITS | PROBABILITY OF BEING SELECTED |
| --- | --- | --- | --- | --- |
| 14a | 110 | YES | 143 | 77% (rounded) |
| 14b | 77 | NO | 0 | 0% |
| 14z | 33 | YES | 143 | 23% (rounded) |

FIG. 10

| GAMING MACHINE | WAGERED MONETARY UNITS | ACTIVE | APPLICABLE ACCUMULATION WAGER POOL MONETARY UNITS | PROBABILITY OF BEING SELECTED |
|---|---|---|---|---|
| 14a | 110 | YES | 110 | 100% |
| 14b | 77 | NO | 0 | 0% |
| 14z | 33 | NO | 0 | 0% |

FIG.11

EXAMPLE OF PAYOUT CONTRIBUTIONS FOR PRIMARY BONUS VALUE

| Payout | Probability | Contribution |
|---|---|---|
| 1 | 0.008 | 0.008 |
| 2 | 0.008 | 0.015 |
| 3 | 0.015 | 0.045 |
| 4 | 0.015 | 0.061 |
| 5 | 0.015 | 0.076 |
| 6 | 0.023 | 0.136 |
| 7 | 0.038 | 0.265 |
| 8 | 0.045 | 0.364 |
| 9 | 0.053 | 0.477 |
| 10 | 0.061 | 0.606 |
| 12 | 0.061 | 0.727 |
| 15 | 0.068 | 1.023 |
| 20 | 0.076 | 1.515 |
| 25 | 0.083 | 2.083 |
| 30 | 0.091 | 2.727 |
| 35 | 0.076 | 2.652 |
| 40 | 0.061 | 2.424 |
| 50 | 0.053 | 2.652 |
| 60 | 0.045 | 2.727 |
| 70 | 0.038 | 2.652 |
| 80 | 0.030 | 2.424 |
| 90 | 0.023 | 2.045 |
| 100 | 0.015 | 1.515 |

Average Expected Value Pay or Component For Primary Bonus Award 29.2197

FIG.12

EXAMPLE OF PAYOUT CONTRIBUTIONS FOR SECONDARY BONUS VALUE

| Payout | Probability | Contribution |
|---|---|---|
| 1 | 0.207 | 0.207 |
| 2 | 0.241 | 0.483 |
| 3 | 0.172 | 0.517 |
| 4 | 0.103 | 0.414 |
| 5 | 0.069 | 0.345 |
| 6 | 0.069 | 0.414 |
| 7 | 0.034 | 0.241 |
| 8 | 0.034 | 0.276 |
| 9 | 0.034 | 0.310 |
| 10 | 0.034 | 0.345 |

Average Expected Value Pay or Component For Secondary Bonus Award 3.55172

FIG.13

| | |
|---|---|
| Number of Gaming Machines Enrolled in Gaming System | 60 |
| Number of Gaming Machines Per Additional Secondary Bonus Award in Bonus Event | 6 |
| Maximum Number of Secondary Bonus Awards Available | 10 |
| Average Total Bonus Coin Out For Maximum Machines Enrolled (i.e., with all players playing and being active) | 64.7369 |
| Percentage of Total Game Paytable Dedicated to This Bonus | 30.0% |
| Total Number of Credits Bet Per Bonus To Be Activated (Threshold) | 215.78966 |
| Target Average Pay of Primary Bonus Award | 300 Credits |
| Bonus RNG Sample Rate (how often central server checks to see if bonus event will occur) | 50 Credits |
| Total Number of Credits Wagered Per Average Bonus Event Occurs | 2215.5124 |
| Probability of Bonus Event Occurring Per Sample | 2.5% |
| Number of Games Per Bonus Event at 18 Credits Bet Per Game | 123.1 |

FIG.14

| Pooled Amount of Monetary Units | Determination If Bonus Event Occurs Based on 2.5% Probability |
|---|---|
| 216 | NO |
| 266 | NO |
| 316 | NO |
| 366 | NO |
| 416 | NO |
| 466 | NO |
| 516 | NO |
| 566 | NO |
| 616 | NO |
| 666 | NO |
| 716 | NO |
| 766 | NO |
| 816 | NO |
| 866 | NO |
| 916 | NO |
| 966 | NO |
| 1016 | NO |
| 1066 | NO |
| 1116 | NO |
| 1166 | NO |
| 1216 | NO |
| 1266 | NO |
| 1316 | NO |
| 1366 | NO |
| 1416 | NO |
| 1466 | NO |
| 1516 | NO |
| 1566 | NO |
| 1616 | NO |
| 1666 | NO |
| 1716 | NO |
| 1766 | NO |
| 1816 | NO |
| 1866 | NO |
| 1916 | NO |
| 1966 | NO |
| 2016 | NO |
| 2066 | NO |
| 2116 | NO |
| 2166 | NO |
| 2216 | NO |
| 2266 | NO |
| 2316 | NO |
| 2366 | NO |
| 2416 | YES |

FIG. 16A

| Determination of Active Gaming Machines | | | | | | |
|---|---|---|---|---|---|---|
| Gaming Machine | Player | Amount of Each Placed Wager (in Monetary Units) | Average Frequency of Each Placed Wager (seconds per each placed wager) | Amount Wagered during Bonus Event Accumulation Period (in Monetary Units wagered during last thirty seconds preceding determination to provide a bonus event) | Number of Wagers Placed during Bonus Event Accumulation Period (last thirty seconds preceding determination to provide a bonus event) | Active Status |
| 14a | A | 200 | 20 | 200 | 1 | YES |
| 14b | B | 100 | 15 | 200 | 2 | YES |
| 14c | C | 50 | 10 | 150 | 3 | NO |
| 14d | D | 10 | 6 | 50 | 5 | YES |

FIG. 16B

| Determination of Active Gaming Machines to Provide Primary Bonus Award | | | | |
|---|---|---|---|---|
| Gaming Machine | Player | Total Amount Wagered During Bonus Event Accumulation Period (in Monetary Units) | Applicable Amount Wagered during Accumulation Period (in Monetary Units) | Probability of being selected for primary bonus award |
| 14a | A | 3600 | 3600 | 55% (3600/6500) |
| 14b | B | 2400 | 2400 | 37% (2400/6500) |
| 14c | C | 1500 | 0 (Not Active) | 0% (Not Active) |
| 14d | D | 500 | 500 | 8% (500/6500) |
| | | Total: 8000 | Total: 6500 | |

FIG. 16C

| Determination of Which Active Gaming Machine to Provide Secondary Bonus Award After Determining to Provide Primary Bonus Award to Gaming Machine 14a | | |
|---|---|---|
| Gaming Machine | Player | Probability of being selected for secondary bonus award |
| 14a | A | 0% |
| 14b | B | 100% |
| 14c | C | 0% (Not Active) |
| 14d | D | 0% |

GAMING SYSTEM HAVING MULTIPLE GAMING MACHINES WHICH PROVIDE BONUS AWARDS

PRIORITY CLAIM

This application is a continuation-in-part application of, claims priority to and the benefit of U.S. patent application Ser. No. 11/548,579, filed on Oct. 11, 2006, which is a continuation-in-part application of, claims priority to and the benefit of U.S. patent application Ser. No. 11/204,101, filed on Aug. 15, 2005, which is a non-provisional application of, claims priority to and the benefit of U.S. Provisional Patent Application Ser. No. 60/603,144, filed on Aug. 19, 2004, the entire contents of which are incorporated herein by reference.

CROSS-REFERENCE TO RELATED APPLICATIONS

This application relates to the following co-pending commonly owned patent applications: "GAMING SYSTEM HAVING MULTIPLE GAMING MACHINES WHICH PROVIDE BONUS AWARDS," Ser. No. 11/204,214; "GAMING SYSTEM HAVING MULTIPLE GAMING MACHINES WHICH PROVIDE BONUS AWARDS," Ser. No. 11/204,147; "GAMING SYSTEM HAVING MULTIPLE GAMING MACHINES WHICH PROVIDE BONUS AWARDS," Ser. No. 11/204,148; "GAMING SYSTEM HAVING MULTIPLE GAMING MACHINES WHICH PROVIDE BONUS AWARDS," Ser. No. 11/204,135; "GAMING SYSTEM HAVING MULTIPLE GAMING MACHINES WHICH PROVIDE BONUS AWARDS," Ser. No. 11/830,630; "GAMING SYSTEM HAVING MULTIPLE GAMING MACHINES WHICH PROVIDE BONUS AWARDS," Ser. No. 11/830,641; "GAMING SYSTEM HAVING MULTIPLE GAMING MACHINES WHICH PROVIDE BONUS AWARDS," Ser. No. 11/830,354; "GAMING SYSTEM HAVING MULTIPLE GAMING MACHINES WHICH PROVIDE BONUS AWARDS," Ser. No. 11/830,273; "GAMING SYSTEM HAVING MULTIPLE GAMING MACHINES WHICH PROVIDE BONUS AWARDS," Ser. No. 11/830,289; "GAMING SYSTEM HAVING MULTIPLE GAMING MACHINES WHICH PROVIDE BONUS AWARDS," Ser. No. 11/830,337; "GAMING SYSTEM HAVING MULTIPLE GAMING MACHINES WHICH PROVIDE BONUS AWARDS," Ser. No. 11/830,314; "GAMING SYSTEM HAVING MULTIPLE GAMING MACHINES WHICH PROVIDE BONUS AWARDS," Ser. No. 11/830,422; and "GAMING SYSTEM HAVING MULTIPLE GAMING MACHINES WHICH PROVIDE BONUS AWARDS," Ser. No. 11/830,075.

BACKGROUND OF THE INVENTION

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Symbols or symbol combinations which are less likely to occur usually provide higher awards.

In such known gaming machines, the amount of the wager made on the base game by the player may vary. For instance, the gaming machine may allow the player to wager a minimum number of credits, such as one credit (e.g., penny cent, nickel, dime, quarter or dollar) up to a maximum number of credits, such as five credits. This wager may be made by the player a single time or multiple times in a single play of the primary game. For instance, a slot game may have one or more paylines and the slot game may allow the player to make a wager on each payline in a single play of the primary game. Slot games with 1, 3, 5, 9, 15 and 25 lines are widely commercially available. Thus, it is known that a gaming machine, such as a slot game, may allow players to make wagers of substantially different amounts on each play of the primary or base game ranging, for example, from one credit up to 125 credits (e.g., five credits on each of 25 separate paylines). This is also true for other wagering games, such as video draw poker, where players can wager one or more credits on each hand and where multiple hands can be played simultaneously. Accordingly, it should be appreciated that different players play at substantially different wagering amounts or levels and at substantially different rates of play.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machines generally indicates this to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be). In other words, obtaining a bonus award is part of the enjoyment and excitement for players.

Certain secondary or bonus games include a group gaming aspect wherein a plurality of players participate in a group event for one or more bonus awards. These group events often include a plurality of players that are classified as actively playing eligible gaming machines in the gaming system. However, as players frequently keep their level of game play at the minimum amount required to remain classified as actively playing an eligible gaming machine, participation in the group event often does not correspond with player's level of play. This skews the participation (and subsequent award distribution) in group events to such players that keep their level of game play at the minimum amount required to remain active. Accordingly, there is a need to provide a gaming system with a group event, wherein each active player's probability of participation in the group event corresponds to that player's relative level of game play.

Certain secondary or bonus games are activated automatically and certain secondary or bonus games require player activation. Once activated, certain secondary or bonus games play to the end or final bonus award automatically and certain secondary or bonus games require at least some level of player interaction. The amount of player interaction may vary. In certain secondary or bonus games, the player may need to pick selections and in certain secondary or bonus games, the player may need to make one or more decisions, such as whether to risk one amount for a higher amount. From the triggering of these secondary or bonus games to the end of these secondary or bonus games, the player is generally provided indications, instructions and/or information about the play of these secondary or bonus games. These indications, instructions and/or provided information inform the player of how and why the player is obtaining or has obtained any award(s) in the secondary or bonus game. Gaming machines often include a display device, such as one or more reels, wheels, dice, video display screens, to display how and why the player is obtaining the secondary or bonus award.

Progressive awards associated with gaming machines are also known. In one form, a progressive award is an award amount which includes an initial amount funded by a casino and an additional amount funded through a portion of each wager made on the progressive gaming machine. For example, 1% of each wager placed on the primary game of the gaming machine may be allocated to the progressive award or progressive award fund. The progressive award grows in value as more players play the gaming machine and more portions of the players' wagers are allocated to the progressive award. When a player obtains a winning symbol or symbol combination which results in the progressive award, the accumulated progressive award is provided to the player. After the progressive award is provided to the player, the amount of the next progressive award is reset to the initial value and a portion of each subsequent wager is allocated to the next progressive award as described above.

A progressive award may be associated with a single gaming machine or multiple gaming machines which each contribute portions of the progressive award. The multiple gaming machines may be in the same bank of machines, in the same casino or gaming establishment (usually through a local area network ("LAN")) or in two or more different casinos or gaming establishments (usually through a wide area network ("WAN")). Such progressive awards are sometimes called local area progressives ("LAP") and wide area progressives ("WAP"), respectively.

Mystery bonus awards are also known. For instance, U.S. Pat. Nos. 5,655,961, 5,702,304, 5,741,183, 5,752,882, 5,820,459, 5,836,817, 5,876,284, 6,162,122, 6,257,981, 6,319,125, 6,364,768, 6,375,569, 6,375,567, RE37,885 and 6,565,434 describe mystery bonus awards and certain methods for providing such awards to players. These patents also describe certain methods for determining which gaming machines will provide the awards to players. These patents further describe methods for a central server to determine which gaming machines will provide the bonus awards and the amount of the bonus awards.

PCT Application No. PCT/AU98/00525, entitled "Slot Machine Game And System With Improved Jackpot Feature" discloses a jackpot awardable to a plurality of gaming machines connected to a network. Upon each play of each gaming machine, a jackpot controller increments the value of the jackpot. Prior to each primary game, the gaming machine selects a random number from a range of numbers and during each primary game, the gaming machine allocates the first n numbers in the range, where n is the number of credits bet by the player in that primary game. At the end of the primary game, the randomly selected number is compared with the numbers allocated to the player and if a match occurs, that particular gaming machine is switched into a feature game mode in which a jackpot game is played for all or part of the incremental jackpot.

More specifically, for every game that is played, a random trigger value is selected in the preprogrammed range as determined from an average number of credits wagered per jackpot. When the primary game is commenced, it is then reported to the controller, which allocates a contribution to the prize pool. Each game is also allotted numbers from the same number range from which the random number was selected, one number in the range being allotted for each credit bet such that the player's probability of being awarded the jackpot game is proportional to the bet. The previously selected random number is then used as a trigger value and compared with the values allotted to the player, if there is a match between the trigger value and the player values, the player is given an opportunity to play the jackpot game. Alternatively, a number is allocated which is equal to, or proportional to the number of credits bet in the respective primary game, the trigger value is compared with the single player value and a jackpot game awarded if the trigger value is less than or equal to the player value.

In one embodiment of the system disclosed in PCT Application No. PCT/AU98/00525, a prize is always awarded in the jackpot game. The jackpot game is used to determine the size of the prize to be awarded. The winning machine is then locked up and the controller awaits an indication that the prize has been paid before allowing the machine to be unlocked. The machine then returns to commence a new primary game. If the trigger value does not match, then there is no feature game awarded for that bought game and the machine returns to step and waits for the next game to commence.

PCT Application No. PCT/AU99/01059, entitled "Player Information Delivery" discloses a gaming console in which an animated character occasionally randomly appears and awards a player a variable random bonus prize. The occurrence of the animated character is weighted by the desired hit rate of the feature and is dependent upon the player's bet and may or may not be dependent upon the size and type of the player's bet. Additionally, the gaming console includes a bonus pool (funded by the player) and a random decision is made whether the contents of the bonus pool will be awarded in addition to any other win.

U.S. Pat. No. 6,241,608 B1 entitled "Progressive Wagering System" discloses a linked progressive wagering system that is capable of accepting wagers in different currencies and different denominations of the same currency. The system periodically computes each current prize value using the data acquired from each gaming device and displays the current prize value at each location where participating gaming devices are located (in the currency used at each particular location). This patent also discloses the system specifying a boundary criteria, such as a maximum value or an expiration date and time, for a progressive award prize. If a gaming device has not randomly generated a prize award event when the specified boundary criteria is met, a progressive award prize is forced by the system upon one or more randomly selected participating players.

There is a continuing need to provide new and different gaming machines and gaming systems as well as new and different ways to provide awards to players including bonus awards. There is also a continuing need to provide new and different linked or related gaming machines.

It is also known to enable one or more players to play games at gaming tables. To play a game at such gaming tables, a player generally is required to place or make a wager. A dealer subsequently provides a player one or more playing cards. At certain of these gaming tables, an award may be provided based on the player obtaining a winning playing card or playing card combination. At certain other of these gaming tables, an award may be provided based on a comparison of the player's playing cards to the dealer's playing cards. At certain other of these gaming tables, an award may be provided based on a comparison of the player's playing cards to another player's playing cards. At other gaming tables, an award may be provided based on an outcome generated in association with one or more gaming table components, such as one or more die, one or more tiles or one or more wheels.

Player tracking systems are also known. Player tracking systems enable gaming establishments to recognize the value of customer loyalty through identifying frequent customers and rewarding them for their patronage. The cumulative history of a particular player's wagers made is stored in association with a player profile. In existing player tracking systems, a player is issued a player identification card which has an encoded player identification number that uniquely identifies the player. Player tracking on gaming devices such as slot machines, is typically accomplished with a card reader mounted to the gaming device. When the player first sits down at a gaming device, the player inserts the card into the card reader. The card reader reads the player identification number from the player tracking card and communicates information through a network to a central computer regarding the player's subsequent wagers. Based on this communicated information or data, the gaming establishment classifies each player and provides players certain benefits based on these classifications.

Subsequent systems have adapted the card reader technology to live gaming tables. Existing live gaming table tracking systems include magnetic stripe card readers mounted to the table for entering player identification information by reading the magnetic stripe cards. In certain of these systems, wagering information is entered by a pit boss using a touch screen mounted to the table or in a pit area. These systems require a manual data entry of the wagers, and thus do not fully automate data collection for player tracking.

Other systems have enhanced tracking systems for live gaming tables that incorporate chip identifiers and card identifiers. These technologies help to further automate the tracking process. One example is an optical chip reading technology that includes mounting a black and white charge-coupled device image sensor ("CCD sensor") into a reading turret placed in proximity to a player's wagering area. In this system, each wagering chip includes patterns of repeated coding around the periphery of the chip. The patterns are identifiable by the CCD sensor. Therefore, the gaming system is operable to determine the amount of each wager by imaging all of the chips and associating the patterns with a chip value.

One example of a playing card identifier includes a card data reader where the card data recorded on the back of the playing card will be read by an image sensor internal to the gaming table. Another example of tracking technology includes a table monitor that automatically images the activity occurring at a gaming table. Such tracking technology makes a periodic comparison of captured images identifying player wagering, as well as the appearance, removal and position of cards and other game objects on the gaming table. Another example of tracking technology includes a multi-player station or gaming table which utilizes infrared coding and/or visual recognition to identify player's wagers as well as the appearance, removal and position of cards and other game objects at the multi-player stations or gaming tables. Another example of chip and/or playing card tracking technology includes radio frequency identification (RFID) to track chip and/or playing card activity. Generally, the RFID is a system that uses a small electronic device that includes a small chip and an antenna. The chips and/or playing cards are scanned to retrieve the identifying information. Another example of tracking technology includes an automated multi-player station or gaming table which utilizes virtual or digital chips and virtual or digital playing cards or other game objects to provide one or more games to the players at these multi-player stations or gaming tables. Accordingly, such chip and/or playing card tracking systems enable the casino to automatically track playing cards dealt to a player and wagering patterns, and store the information into memory.

SUMMARY OF THE INVENTION

One embodiment of the present invention provides a gaming system including a central server or controller in communication with or linked to a plurality of gaming machines or gaming devices. Another embodiment of the present invention provides a gaming system having a plurality of linked gaming machines where one of the gaming machines functions as the central server or controller. The gaming system also includes a plurality of bonus awards adapted to be provided to one or more players of the gaming machines in the gaming system.

In operation, the controller or central server monitors wagers or wager activity on the primary games of the gaming machines. Based at least in part on the wagers or wager activity on the primary games of the gaming machines, the controller or central server determines when a bonus event will occur. If a bonus event is determined to occur, the controller or central server determines if one or more of the gaming machines will provide one or more bonus award(s) and which of the gaming machine(s) will be selected to provide the bonus award(s) in the bonus event. The terms central server and controller are used interchangeably herein.

In one embodiment, for each gaming machine selected by the controller or central server to provide a bonus award, the central server or controller and that selected gaming machine co-act to determine the amount of the bonus award to be provided to the player of that selected gaming machine. In this embodiment, both the central server and the gaming machine selected to provide a bonus award to a player each contribute or determine, at least in part, one or more different components of the bonus award ultimately provided to the player. In an alternative embodiment, the selected gaming machine determines which of a plurality of different awards that are maintained by the central server, such as a plurality of different progressive awards, to provide to the player of the selected gaming machine. This alternative embodiment may include a game having player interaction to determine the award.

As indicated above, the controller tracks the wager activity or amounts wagered on plays of the primary game of each gaming machine in the gaming system. In one embodiment, the controller includes: (a) a separate coin-in or wager meter for each individual gaming machine which tracks the total coin-in or wagers placed on the primary games for each of the gaming machines in the gaming system and (b) a total coin-in or wager meter which tracks the total coin-in wagers placed on all of the primary games for all of the gaming machines in the gaming system. This total wager meter can be a calculated amount based on the sum of the individual gaming machine coin-in meters. The controller tracks the total wagers for each individual gaming machine and the total wagers for all of the gaming machines in the gaming system in any suitable compatible or comparable manner such as credits wagered (i.e., if all of the system gaming machines are of the same denomination) or monetary units (e.g., total dollars or other currency) wagered. Alternatively, each of the gaming machines tracks the wagers placed on that gaming machine (via an individual gaming machine meter). This can be done for all wagers or for the wagers placed by individual players. In these embodiments, the gaming machines sends information to the central controller upon request from the central controller, at designated intervals or in any other suitable manner. Tracking in monetary units accounts for gaming machines having multi-denominations and/or for gaming machines of different denominations and/or gaming machines which accept different currencies.

In one embodiment, the controller maintains an accumulated wager pool for all of the gaming machines in the gaming system. The accumulated wager pool includes at least the total coin-in or amounts wagered on the plays of the primary games of the gaming machines in the gaming system during an accumulation period or a bonus event accumulation period as further discussed below. In certain embodiments of the present invention, after the first bonus event occurs, the accumulated wager pool may include a remainder from a previous bonus event to be utilized in one or more subsequent bonus events as further discussed below.

In one embodiment, each bonus event accumulation period starts at the occurrence of a first bonus event and ends at the occurrence of a second subsequent bonus event. For example, when a bonus event occurs, the accumulation of the monetary units for that bonus event simultaneously or substantially simultaneously ceases. In this example, any wagers made on the primary games of the gaming machines which subsequently occur are part of the next bonus event accumulation period and are accumulated for the next bonus event. It should be appreciated that in this embodiment, the next bonus event accumulation period starts or can start even before the central server selects the gaming machine(s) which will provide the bonus award(s).

In another embodiment, each bonus event accumulation period starts at the issuance of a first bonus event and ends at the issuance of a second subsequent bonus event. For example, after a bonus event is determined to occur, the selected gaming machine will subsequently provide the bonus award to a player of that selected gaming machine. Accumulation of the monetary units for that bonus event ceases at the time that bonus award is provided to or received by the player. In this example, any wagers made on the primary games of the gaming machines which subsequently occur after issuance of that bonus award are for the next bonus event accumulation period and are accumulated in the accumulated wager pool for the next bonus event.

As indicated above, in one embodiment of the present invention, the accumulated wager pool includes at least the total coin-in or amounts wagered by the players on the primary games of all of the gaming machines in the gaming system during the bonus event accumulation period. In an alternative embodiment, the accumulated wager pool also includes any unaccounted for portions of the amounts in one or more previous accumulated wager pools from one or more previous bonus event(s) as discussed in more detail below. This is referred to herein as the remainder.

In one embodiment, the central server determines when a bonus event will occur based, at least in part, on the accumulated amount in the accumulated wager pool. For example, the central server determines if a bonus event will occur at preset intervals based on a suitable sampling rate. The sampling rate can be based on any suitable criteria, such as amounts wagered, time elapsed or one or more other factors. For example, where the sampling rate is based on the amount wagered, at each predetermined interval, the central server determines if the accumulated wager pool has reached at least a predefined minimum threshold level of monetary units required to provide a bonus event. The minimum threshold level may be any suitable number including zero, any number greater than zero or may be equal to the sampling rate interval.

In this embodiment, if the accumulated wager pool has not reached the predefined minimal threshold level, the central server does not make a determination of whether to cause a bonus event to occur at one or more of the gaming machines in the system. In this case, the central server continues to track wagered monetary units and waits until the next interval (i.e., based on the suitable sampling rate) to determine if a bonus event will occur at one or more gaming machines in the gaming system.

In this embodiment, if the accumulated wager pool has reached at least the minimum threshold level of monetary units required to provide a bonus event, the central server randomly determines, based on a predetermined probability, whether the bonus event will occur or not. In one embodiment, this random determination is based on a suitable probability, such as 1%, 2.5%, 5% or 10%. For example, if the accumulated wager pool has at least reached the minimum threshold level of monetary units, the central server randomly determines, based on 2.5% probability of the bonus event occurring, whether to provide a bonus event at one or more of the gaming machines in the system. In one embodiment, the probability from sample to sample can remain constant or in an alternative embodiment, the probability can be different for two or more of the samples. In one such embodiment, the probability can increase for each sample or after a designated number of samples. The present invention contemplates any suitable method for determining the probabilities.

If the central server determines not to provide the bonus event to the gaming machines, the central server continues to track wagered monetary units and waits until the next interval (i.e., based on the sampling rate) to determine if a bonus event will occur. It should be appreciated that in other embodiments, there is no minimum threshold level and the central server determines if such bonus event will occur at each preset interval based on a suitable sampling rate.

If the central server determines that a bonus event will occur, the central server also determines which system gaming machine(s) will be selected to provide bonus awards to the players of those gaming machine. Such determination is based in part on the individual status of each of the gaming machines in the gaming system. That is, the individual status of each gaming machine determines whether that gaming machine is eligible to be selected to provide a bonus award to the player of that gaming machine. In one embodiment, each gaming machine is determined to be in either active status or enrolled status. Active status means that the gaming machine is being actively played by a player during a bonus event qualification period as discussed below. The active status requirements can be based on any suitable number of satisfied criteria or defined in any suitable manner by the implementer of the gaming system of the present invention. For instance, a play of or wager on the primary game of the gaming machine within a predetermined period of time may be part of the determination of whether that gaming machine is in the active status. Other factors such as: (a) the amount of time between each play of or wager on the primary game of the gaming machine; (b) the amount being wagered on the primary game (s); (c) the number of plays within a period of time, and (d) the existence of credits on the gaming device may also or alternatively be part of the determination of whether a gaming machine is in the active status. On the other hand, the enrolled status means that the gaming machine is one of the gaming machines in the gaming system, but is not in the active status (i.e., not being actively played by a player according to one or more of the predetermined criteria) during the bonus event qualification period.

In another embodiment, one or more side bets or additional wagers are utilized in determining if a player is provided at least one bonus award. In one such embodiment, the gaming system enables a player to place a side bet to be active for one or more bonus events, regardless of any other amounts wagered. In another embodiment, placing a specific side bet, in addition to another wagering criteria, provides that the player is eligible to potentially win one or more bonus awards. In another embodiment, the gaming system enables a player to place a side bet greater than or equal to a designated amount to be active for one or more bonus events. In this embodiment, the player's probability of being selected to win at least one bonus award is weighted based on the relationship of the player's placed side bet to the designated amount. In another embodiment, a quantity or number of side bets placed in a designated period of time, such as during a bonus event accumulation period, determines a player's probability of being selected to win at least one bonus award.

As indicated above, if the central server determines that a bonus event will occur, in one embodiment, the central server determines which active gaming machines to select to provide the bonus award(s) to the players of those active gaming machine. In one embodiment, the central server determines which active gaming machines to select to provide each of the bonus awards to based on the respective relative total amounts wagered on each of the active gaming machines during the bonus event accumulation period. In one embodiment, the central server determines the relative percentages of total amounts wagered for each of the active gaming machines by determining the amount wagered at each gaming machine in relation to the total amount wagered at all active gaming machines during the bonus event accumulation period. The central server uses these relative percentages determined for each active gaming machine to randomly determine which of the active gaming machines will be selected to provide the bonus award(s). Using this process, each active gaming machine has a chance of being selected to provide a bonus award. It should be appreciated that in this embodiment, the active gaming machine which had the most amount wagered during the bonus event accumulation period has the greatest relative percentage of total amounts wagered and thus has the highest chance of being selected to provide a bonus award. On the other hand, the active gaming machine which had the least amount wagered during the bonus event accumulation period has the lowest relative percentage of total amounts wagered and thus has the lowest chance of being selected to provide a bonus award.

In another embodiment, if the central server determines that a bonus event will occur, the central server determines which active gaming machines to select to provide each of the bonus awards to based on the respective relative total amounts wagered on each of the active gaming machines, wherein one active gaming machine may be selected a plurality of times to provide a plurality of bonus awards. In another embodiment, if the central server determines that a bonus event will occur, the central server determines which active gaming machines (or players tracked via a player tracking system) to participate in the bonus event based on the respective relative total amounts wagered on each of the active gaming machines, wherein one active gaming machine may be selected a plurality of times to participate in the bonus event. In one such embodiment, the central server determines a probability of winning a bonus award (or alternatively a probability of participating in a bonus event) for each active gaming machine, wherein each gaming machine's determined probability is based on an amount that gaming machine contributed to the accumulated wager pool during the bonus event accumulation period. In this embodiment, for each bonus award to be provided (or each of a determined number of participants in the bonus event), the central server randomly selects, based on the probabilities associated with the active gaming machines, one of the gaming machines wherein each gaming machine may be selected more than once. That is, even if a gaming machine is selected to provide one bonus award (or is alternatively selected to be one participant in a group event), the same gaming machine may be reselected to provide another bonus award (or alternatively be selected to be another participant in the group event).

In one example, the central server determines that a bonus event will include three participants and the gaming system currently includes a first gaming machine which contributed 60% to the accumulated wager pool, then the first gaming machine has a 60% of being the first participant in the bonus event, a 60% of being the second participant in the bonus event (regardless of if the first gaming machine is selected to be the first participant in the bonus event), and a 60% of being the third participant in the bonus event (regardless of if the first gaming machine is selected to be the first participant in the bonus event and/or the first gaming machine is selected to be the second participant in the bonus event). It should be appreciated that this embodiment provides that a gaming machine with a high level of play is provided a correspondingly high probability of wining one or more bonus awards (or participating in a bonus event) while a gaming machine with a low level of play is provided a correspondingly low probability of winning one or more bonus awards (or participating in a bonus event).

As discussed above, a gaming machine in the gaming system may be enrolled but not active when a bonus event occurs. In one embodiment, each enrolled but not active gaming machine is not eligible to obtain a bonus award and the total wagered amount for each of these gaming machines is excluded or otherwise not used in determining the relative percentages of the active gaming machines. However, it should be appreciated that these amounts wagered by the enrolled, but not active, gaming machines are included in the accumulated wager pool. In one embodiment, the bonus event is funded on average by the accumulated wager pool as discussed below. More specifically, in one embodiment which includes a primary bonus award and one or more secondary bonus awards, as further discussed below, the average primary bonus awards and the secondary bonus awards are accounted for based on the amounts of monetary units which will be in the accumulated wager pool when a bonus event is triggered or determined to occur. It should thus be appreciated that the present invention allows for large bonus awards to occur at any time because after the minimum threshold of the accumulated wager pool is achieved, the bonus event can be determined to occur and a value component of the bonus award is not based on the actual amount of the accumulated wager pool at the time of the bonus event.

The number of bonus awards and the amount of the bonus awards of a bonus event can vary and be determined in a variety of different manners in accordance with the present invention. In one embodiment, one bonus award is selected to be provided by one of the active gaming machines in the gaming system. In another embodiment, one bonus award from a plurality of different bonus awards is selected to be provided by one of the active gaming machines in the gaming system. In one such embodiment, the plurality of bonus awards are progressive awards. In another embodiment, the number of bonus awards in a bonus event is determined based on the number of active gaming machines in the gaming system during the bonus event qualification period for that bonus event. In one such embodiment, one bonus award is provided for each designated number of active gaming machines (e.g., one bonus award for each two active gaming machines, one bonus award for each five active gaming machines or one bonus award for each ten active gaming machines). In another such embodiment, one primary bonus award is provided and additionally one secondary bonus award is provided for each designated number of active gaming machines. It should thus be appreciated that the number of bonus awards of bonus event can vary in accordance with the present invention.

In one embodiment, the bonus event includes a primary bonus award and zero, one or more secondary bonus awards which are distributed based on the number of active gaming machines. The primary and secondary bonus awards are each based in part on a first component, such as a value component, determined by the active gaming machine selected by the central server to provide an award and in part on a second component, such as a modifier component, (e.g., a multiplier component), determined by the central server and sent to each selected gaming machine. That is, the central server determines a modifier component for each of the bonus awards provided and each selected active gaming machine individually or independently determines a value component for the individual bonus award provided by that individual gaming machine.

In one embodiment, the value or first component of the bonus award is based on a random determination made by the selected gaming machine from a range of potential value components, wherein each potential value component is associated with a probability. The value components determined for each active gaming machine can vary for the different selected gaming machines in the gaming system in a single bonus event because each selected gaming machine individually or independently determines the value component for that selected gaming machine. It should be appreciated that because each selected active gaming machine independently determines the value component for that gaming machine, the value components will often be different for the different selected active gaming machines.

In one embodiment, a modifier or second component, such as the multiplier component, is based in part on the accumulated wager pool of the bonus event accumulation period for the bonus event. In one embodiment, the central server employs the accumulated wager pool to determine a single modifier or multiplier component for all of the selected active gaming machines. The modifier or multiplier component is partly based on the accumulated wager pool, a sum of the expected average value components for each of the selected gaming machines and a relative portion of the bonus percentage of the entire paytable. For example, if the accumulated wager pool is 100 monetary units and the relative portion of the bonus percentage of the overall average return to the player is 30%, then 30 monetary units of the accumulated wager pool can be used to determine the modifier or multiplier. Since it is generally desired to have integer multipliers in gaming machines to avoid fractional units or credits, not all of these monetary units may be accounted for in determining the multiplier. In this simple example, if the multiplier is 9× and accounts for 27 of the monetary units, then 3 monetary units are unaccounted for in determining the multiplier for the bonus event. These remaining 3 monetary units must be on average accounted for because this bonus event is funded on average by the accumulated wager pool. Therefore, in this simple example, the 3 monetary units divided by the percentage of the overall average return to be provided as bonus awards (3/0.3) or 10 monetary units are the remainder of unaccounted for monetary units which are placed back in or remain in the accumulated wager pool for the next or a subsequent bonus event. This will allow the minimum threshold to be reached sooner for the next sampling and possibly increase the value of the next modifier or multiplier component for the next bonus event.

In one embodiment which includes multiple bonus awards, such as a primary bonus award and a secondary bonus award, the modifier or multiplier component is determined based on the average expected value of the value components of the primary and secondary awards which are independently determined by the individual selected gaming machines. Because the average expected value and not the actual value components are used, the remainder is typically not an actual remainder but rather an average expected remainder.

In an alternative embodiment, the bonus awards are accounted for directly in the paytables of the gaming machines. In one such embodiment, the bonus awards include a plurality of progressive awards funded by the gaming machines in the system in a conventional manner. In this embodiment, the central server maintains the plurality of progressive awards. The progressive awards start or are reset at multiple different levels (e.g., $10, $100, $1000, $10,000). In one embodiment, the gaming machine selected by the central server to provide one of the progressive awards as the bonus award will determine or cause to be determined which progressive award that gaming machine will provide to the player. In one embodiment, the gaming machine can provide a suitable bonus game where the outcome of the bonus game determines which progressive award is obtained. The bonus game may include or not include player interaction.

In another embodiment, the gaming system disclosed herein is operable to provide at least one bonus award to at least one player in a group gaming or multi-player environment. In one embodiment, the gaming system enables a plurality of players to play one or more linked games at one or more multi-player gaming stations, wherein one or more players are provided at least one bonus award. In one such embodiment wherein the gaming system enables each of a plurality of players to simultaneously play one or more of a plurality of games, the gaming system tracks wagers placed on all of the games. In this embodiment, if the gaming system determines to provide at least one bonus award as described herein, the central server picks one of the plurality of simultaneously played games and then picks one, more or each of the players playing the picked game to provide the bonus award.

In another embodiment, the gaming system enables one or more players to input or otherwise communicate to the gaming system a list of other players. In this embodiment, if the gaming system determines to provide at least one bonus award to a designated player, at least one, a plurality of or each of the other players included in the designated player's list are provided at least part, but not all of the determined bonus award. In another embodiment, if the gaming system determines to provide a bonus award to a designated player, at least one, a plurality of or each of the other players on the designated player's list are provided a separate bonus award. For example, the designated player is provided a primary bonus award and each of the players on the designated player's list are provided a secondary bonus award.

In one embodiment, in addition to providing at least one bonus award to a player at the gaming medium of a gaming machine, the gaming system disclosed herein is operable to provide at least one bonus award (as described herein) to at least one player currently playing at least one alternative gaming medium. Such alternative gaming mediums include, but are not limited to, games played over a network setup, such as an internet, games played utilizing a hand-held device, games played at non-dedicated gaming terminals, games played which are downloaded from a central server and games played at a multi-player gaming station, such as a multi-player gaming table. It should be appreciated that in these embodiments, the gaming system disclosed herein provides that a player may win one or more bonus awards regardless of the type of gaming medium currently played. That is, in one such embodiment, the different players at the different gaming mediums may each be eligible to win one or more bonus awards such that the different players playing the games at these different gaming mediums compete for one or more bonus awards.

In another embodiment, one of the alternative gaming mediums employed to provide at least one player at least one bonus award is an intelligent gaming table or wagering chip tracking system. In this embodiment, the gaming system disclosed herein includes at least one central server, central controller or remote host in communication with or linked to a plurality of intelligent gaming tables or wagering chip tracking systems. In one embodiment, each intelligent gaming table enables one or more players to play one or more suitable games by placing one or more wagers utilizing wagering chips. In another embodiment, each intelligent gaming table disclosed herein employs a virtual gaming table. In this embodiment, the virtual gaming table provides virtual playing cards and/or virtual wagering chips which enable one or more players to play one or more games at the intelligent gaming table. In one such embodiment, the virtual gaming tables utilizes one or more surface computing mechanisms and one or more of a plurality of display devices to provide these games. In these embodiments, the intelligent gaming tables tracks, monitors and records game play of one or more players at such gaming tables. Based on such game play information provided by the intelligent gaming tables and similar to the manner described below in relation to gaming devices, the gaming system determines which players at such gaming tables are to be provided with one or more bonus awards (via a dealer or host at or near the gaming table). In different embodiments, one or a plurality of the players at the gaming table are provided the bonus awards.

In different embodiments, the intelligent gaming table disclosed herein may be any suitable multi-player station adapted to track wagering chips, playing cards and/or game elements. Such intelligent gaming table includes, but is not limited to, a gaming table connected to a processor that is operable to receive and/or send information or data related to: the status of a game or sequence (e.g., amounts wagered, outcomes generated); the status of any player currently playing at the gaming table (e.g., betting history, player tracking level); the status of any wagering position at the gaming table (regardless of identifying a specific player); one or more security features of the gaming system; one or more outcome verification features of the gaming system; one or more payout features of the gaming system or the status of any other aspect or feature of the player's gaming experience at the gaming table.

In different embodiments, as described in more detail below, such an intelligent gaming table is in communication with one or more additional devices and/or systems, including, but not limiting to, one or more gaming devices in the gaming system, one or more additional gaming tables, at least one player tracking system (i.e., to identify at least one player currently placing at least one wager on at least one suitable game at the gaming table), at least one bonusing system (i.e., to provide at least one bonus award to at least one player currently playing at least one suitable game at the gaming table), at least one sign manager system (i.e., to display the results of at least one game or sequence to a group of players at a gaming table or at a location remote from the gaming table), at least one progressive system (i.e., to provide at least one progressive award to at least one player currently playing at least one suitable game at the gaming table).

The present invention further contemplates employing one or more displays in conjunction with the gaming machines which will provide the players of the gaming machines information about the bonus awards to increase player awareness of these awards and interaction between players of the gaming machines. The display(s) can provide any suitable information about the gaming system, gaming machines, bonus events and bonus award such as information regarding the bonus event or bonus award(s), which gaming machines are winning or have won the primary awards and secondary awards, the amount of the progressive awards, when the progressive award is about to be hit and which gaming machines are winning or have won the progressive award.

It is therefore an advantage of the present invention to provide a gaming system including a controller or central server linked to a plurality of gaming machines, wherein the central server determines when a bonus event will occur and which gaming machine(s) will be selected to provide the bonus award(s). In this gaming system, each selected gaming machine determines, at least in part, the amount of the bonus award to be provided by that selected gaming machine. This provides a more secure award determination at the machine level and allows for different bonuses on different machines.

A further advantage of the present invention is to provide a gaming system having an accumulated wager pool including at least wagers on the primary games of the system gaming machines during a bonus event accumulation period, wherein based at least in part on the accumulated wager pool, a controller determines when a selected gaming machine will provide one of the bonus awards independent of any event in or of any play of any of the primary games. In this gaming system, the determination of which gaming machine(s) will be selected to provide bonus awards is based, at least in part, on the wagers placed on the primary games of the gaming machines in the system. That is, each selected gaming machine determines, at least in part, the amount of the bonus award to be provided by that gaming machine.

A further advantage of the present invention is to provide a gaming system having an accumulated wager pool maintained by a controller based at least in part on the wagers by the players of primary games of gaming machines in the gaming system. The gaming system further includes a bonus award adapted to be provided to the player of a controller selected gaming machine, wherein the bonus award is determined based on a value component (which is determined by the selected gaming machine independent of the accumulated wager pool) and based on a modifier or multiplier component (which is determined by the controller based in part on the accumulated wager pool).

A further advantage of the present invention is to provide a gaming system having a central server operable to determine if a bonus event will occur at designated intervals, and if the bonus event is determined to occur, determine which of the gaming machines were in an active state during a bonus event qualification period for the bonus event, select at least one of the active gaming machines, and send a signal to the selected gaming machine to provide a bonus award to the player of that gaming machine. The central server at least in part determines the bonus award and the selected gaming machine at least in part determines the bonus award to provide to the player.

A further advantage of the present invention is to provide a gaming system having a central server operable for each gaming machine to maintain a total of the wagers placed on the primary games of the gaming machines during a bonus event accumulation period, maintain a total of the wagers placed on the primary games of all of gaming machines during the bonus event accumulation period and at designated intervals during the bonus event accumulation period determine if a bonus event will occur. If the bonus event is determined to occur, the central server determines which of the gaming machines were in an active state during a bonus event qualification period for the bonus event, select at least one of the active gaming machines based on a probability determined from the total wagers placed during the bonus event accumulation period for each active gaming machines relative to the total wagers placed for all active gaming machines during the bonus event accumulation period, and send a signal to the selected gaming machine to provide a bonus award to the player of the gaming machine. The selected gaming machine at least in part determines the bonus award to provide to the player.

A further advantage of the present invention is to provide a gaming system having a central server operable for each gaming machine to maintain a total of the wagers placed on the primary game of the gaming machine during a bonus event accumulation period between a first bonus event and a second bonus event, maintain an accumulated wager pool including a total of the wagers placed on the primary games of all of gaming machines during the bonus event accumulation period and a remainder of average unaccounted for wagers from a first bonus event accumulation period for the first bonus event, at designated intervals during the bonus event accumulation period, determine if the second bonus event will occur wherein the designated intervals are based on the accumulated wager pool. If the bonus event is determined to occur, the central server sends a signal to a selected gaming machine to provide a bonus award to the player of the gaming machine. The selected gaming machine at least in part determines the bonus award to provide to the player.

A further advantage of the present invention is to provide a gaming system having a gaming system including a plurality of gaming machines, each gaming machine including a primary game operable upon a wager by a player, a bonus event and an expected average value component for the bonus event. The gaming system also includes a first accumulated wager pool for a first occurrence of the bonus event, a second accumulated wager pool for a second occurrence of the bonus event and a controller in communication with the gaming machines. The controller is operable to cause the first occurrence of the bonus event, determine a first bonus award for the first occurrence of the bonus event, wherein the first bonus award is based at least in part on the first accumulated wager pool and at least in part on a value component for the first occurrence of the bonus event and determine a remainder including an unused portion of the first accumulated wager pool and the average expected value component for the bonus event. The controller is also operable to maintain the second accumulated wager pool, cause the second occurrence of the bonus event and use the second accumulated wager pool and the remainder to at least in part determine a second bonus award to provide to a player for the second occurrence of the bonus event.

A further advantage of the present invention is to provide a gaming system including a plurality of gaming machines, each gaming machine including a primary game operable upon a wager by a player, a first accumulated wager pool and a controller in communication with the gaming machines. The controller is operable to maintain the first accumulated wager pool based at least in part on the wagers placed on the primary games of all of the gaming machines and determine a first bonus portion of the accumulated wager pool, wherein the first bonus portion is at least in part based on a percentage less than 100% of the first accumulated wager pool. The controller is also operable to select at least one gaming machine to provide a first bonus award to a player, wherein the total expected value of all of the first bonus awards provided to all of the players is equal to or less than the first bonus portion and allocate a remainder to a second accumulated wager pool for a second bonus award to be provided to a player, wherein the remainder accounts for any difference between the first bonus portion and the total expected value of all of the first bonus awards provided to all of the players.

A further advantage of the present invention is to provide a gaming system including a plurality of gaming machines, each gaming machine including a primary game operable upon a wager by a player and a plurality of potential first bonus awards. The gaming system also includes a first accumulated wager pool, a second accumulated wager pool and a controller in communication with the gaming machines. The controller is operable to maintain the first accumulated wager pool based at least in part on the wagers placed on the primary games of all of the gaming machines and select at least one gaming machine to provide one of the first bonus awards to a player, wherein a total expected value of all of the first bonus awards provided to all of the players is equal to or less than a predetermined percentage of the first accumulated wager pool. The controller is also operable to allocate a remainder to the second accumulated wager pool for a second one of the bonus awards to be provided to a player, wherein the remainder accounts for any difference between the predetermined percentage of the first accumulated wager pool and the total expected value of all of the first bonus awards provided to all of the players.

A further advantage of the present invention is to provide a method of operating a gaming system including a controller and a plurality of gaming machines which each include a primary game operable upon a wager by a player. The method includes maintaining a first accumulated wager pool, maintaining an average expected value component for a bonus event and causing a first occurrence of the bonus event. The method also includes determining a first bonus award for the first occurrence of the bonus event, wherein the first bonus award is based at least in part on the first accumulated wager pool and at least in part on a value component for the occurrence of the bonus event, determining a remainder including an unused portion of the first accumulated wager pool and the average expected value component for the bonus event and maintaining a second accumulated wager pool. The method further includes causing a second occurrence of the bonus event and using the second accumulated wager pool and the remainder to at least in part determine a second bonus award to provide to a player for the second occurrence of the bonus event.

A further advantage of the present invention is to provide a gaming system having pool of wagered amounts on the gaming machines wherein the actual amount of the pool in part determines when a bonus award can be provided to a player, but the actual amount of the pool does not determine the amount of the bonus award given to the player and accounted for by pool.

Another advantage of the present invention is to provide a gaming system having a plurality of gaming machines wherein multiple different bonus awards can be provided simultaneously or substantially simultaneously.

A further advantage of the present invention is to provide a gaming system having bonus events for a plurality of gaming machines which employ multi-denominations or different denominations or different bet amount.

Another advantage of the present invention is to provide a gaming system having a plurality of gaming machines which employs a wager pool to fund the bonus event but provides a more random feel in providing the bonus awards.

Additional features and advantages of the present invention are described in, and will be apparent from, the following Detailed Description of the Invention and the figures.

BRIEF DESCRIPTION OF THE FIGURES

FIG. 7 is a chart of an example of the relative wagered amounts for three active gaming machines and the probability of being selected to provide the primary bonus award for each active gaming machine.

FIG. 8A is a chart of an example of the relative wagered amounts for two active gaming machines and the probability of being selected to provide the primary bonus award for each active gaming machine.

FIG. 8B is a chart of an example of the relative wagered amounts for two active gaming machines and the probability of being selected to provide a bonus award for each active gaming machine of an alternative embodiment of the gaming system disclosed herein.

FIG. 8C is a chart of an example of the relative wagered amounts for three active gaming machines and the probability of being selected to participate in a group event for each active gaming machine of an alternative embodiment of the gaming system disclosed herein.

FIG. 9 is a chart of an example of the relative wagered amounts for two different active gaming machines and the probability of being selected to provide the primary bonus award for each active gaming machine.

FIG. 10 is a chart of an example of the wagered amount for one active gaming machine and the probability of being selected to provide the primary bonus award for that active gaming machine.

FIG. 11 is a chart illustrating a range of payouts or value components and probabilities associated with those payouts or value components for a primary bonus award of one embodiment of the present invention.

FIG. 12 is a chart illustrating a range of payouts or value components and probabilities associated with those payouts or value components for a secondary bonus award of one embodiment of the present invention.

FIG. 13 is a chart illustrating one example embodiment of the gaming system of the present invention.

FIG. 14 is a chart illustrating an example of the pooled amounts of monetary units and the determinations if the bonus event occurs in one embodiment of the gaming system of the present invention.

FIGS. 16*a*, 16*b* and 16*c* are charts illustrating an example of one embodiment of the present invention.

DETAILED DESCRIPTION OF THE INVENTION

Mystery Bonus Awards Embodiment

Figure 1:
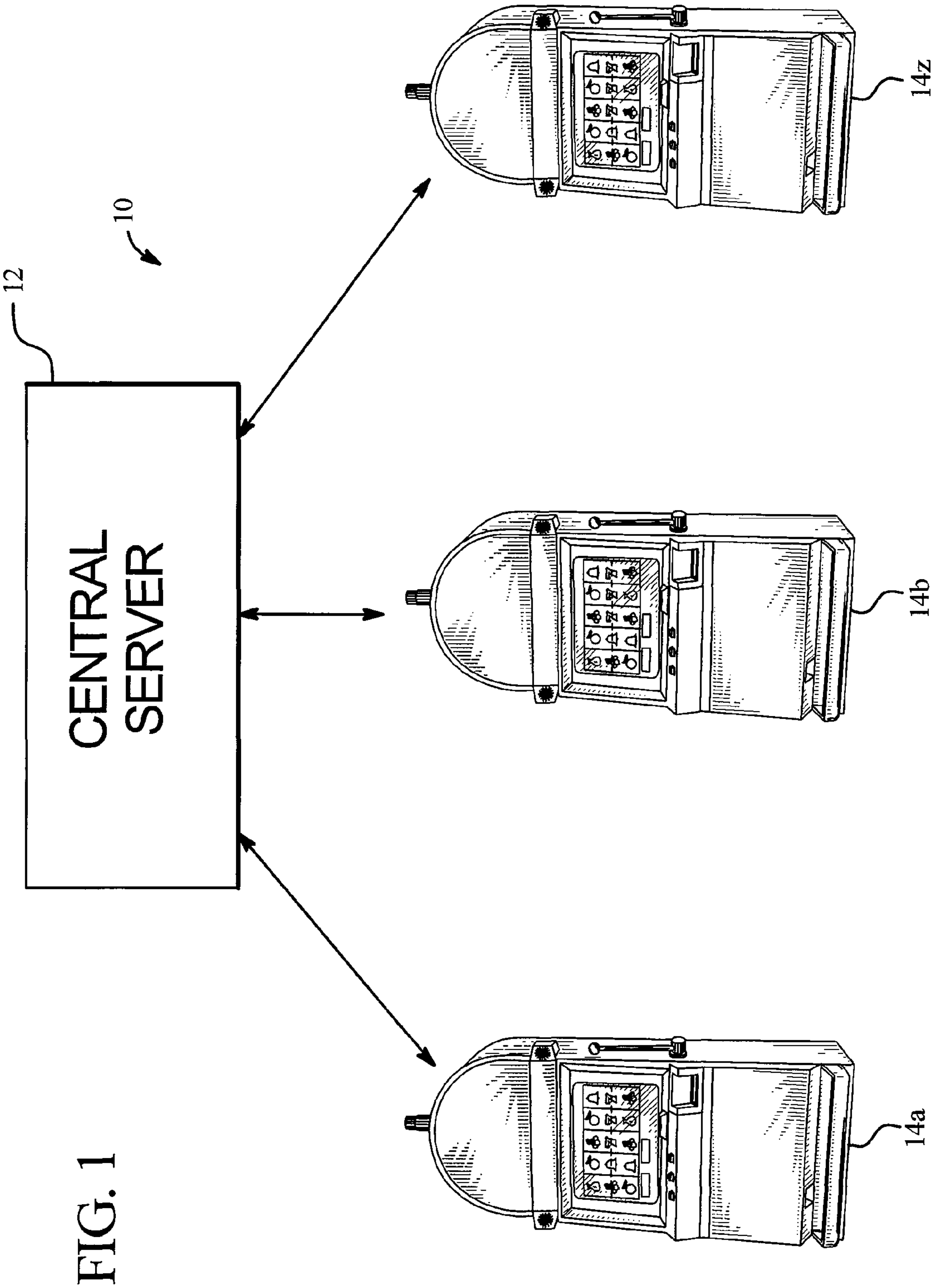
FIG. 1 is a schematic diagram of the central server in communication with a plurality of gaming machines in accordance with one embodiment of the present invention.

One embodiment of the present invention provides a gaming system including a plurality of linked gaming machines and a plurality of awards provided to players of the linked gaming machines in an apparently random fashion to the players of these gaming machines. These awards are referred to herein as bonus awards to distinguish them from the awards that the gaming machines provide to the players for winning outcomes in the plays of the primary wagering games, such as slot games, card games (e.g., poker, blackjack) or any other suitable game. The awards can be any suitable type of awards, such as monetary awards or progressive awards. The gaming machines can also include other secondary games or secondary awards, such as other progressive jackpot awards.

In one embodiment of the present invention, the gaming machines do not provide any apparent reasons to the players for obtaining such bonus awards. In this embodiment, the bonus awards are not triggered by an event in or based specifically on any of the plays of any primary game or on any of the plays of any secondary game of the gaming machines in the system. That is, the gaming machines may simply provide the bonus awards to the players without any explanation or alternatively with simple explanations such as "You Have Won a Mystery Bonus Award of $______."

In one embodiment, the gaming machines of the gaming system are operable to provide multiple bonus awards to multiple players at the multiple linked gaming machines at the same time or substantially the same time. Alternatively, the gaming machines of the gaming system are operable to provide multiple bonus awards to multiple players at the multiple linked gaming machines in an overlapping or sequential manner. In one embodiment, upon the determination or trigger of a bonus event, the gaming system determines the number of bonus awards, such as one primary bonus award and zero, one or more secondary bonus awards that the gaming machine(s) will provide to the player(s) of the multiple linked gaming machines in the gaming system as described below. In one embodiment, one primary bonus award is always provided to one of the players of the gaming machines in the gaming system and the number of secondary bonus awards is determined based on the number of active gaming machines in the gaming system at the time the bonus event occurs.

In one embodiment of the present invention, the primary bonus awards and any secondary bonus awards of a bonus event are based, at least in part, on monetary units which are accumulated in an accumulated wager pool. The accumulated wager pool includes the amounts wagered on primary games of the multiple linked gaming machines during a bonus event qualification period for that bonus event and any theoretical remainder from one or more prior bonus events. More specifically, the primary bonus awards and the secondary bonus awards of a bonus event are derived in part from a ratio of the expected awards to be paid from the bonuses versus the amount in the accumulated wager pool for that bonus event. Since this ratio is employed instead of basing the awards on the actual amount of pooled monetary units, the amounts of the bonus awards can have a greater volatility because they are not limited by the amount of monetary units actually in the accumulated wager pool for that bonus event. The actual bonus awards provided to the players of the gaming machines can thus be greater than the accumulated wager pool monetary units.

It should thus be appreciated that the gaming system of this embodiment will sometimes over hold and will sometimes under hold the expected monetary units to be awarded relative to the actual amount of wagered monetary units actually in the accumulated wager pool for that bonus event. This will give a more random feel to the gaming system and provide more excitement for the players. It should also be appreciated that in certain embodiments, the actual amount of pooled monetary units at least partially determines when the bonus event will occur as discussed below.

In one embodiment, the central server or controller tracks wagering activity or game play, maintains a combined theoretical and actual bonus wager accumulation pool which includes the actual amounts wagered and a theoretical remainder from a previous bonus event, wherein the theoretical remainder is based on the ratio of the expected awards to be paid versus a the amount in the accumulated wager pool for the previous bonus event. The total expected value of actual bonus awards roughly equals bonus pool accounting.

Central Server Generally

Referring now to FIG. 1, one embodiment of the gaming system 10 of the present invention includes a central server or controller 12 and a plurality of gaming machines or gaming devices 14*a*, 14*b* . . . 14*z* in communication with or linked to the central server or processor 12. The number of gaming machines in the gaming system can vary as desired by the implementer of the gaming system. These gaming machines are referred to herein alternatively as the group of gaming machines, the linked gaming machines or the system gaming machines. The linked gaming machines may be of the same type or of different types of gaming machines. The linked gaming machines may have the same primary game or two or more different primary games. For example, one gaming machine may be adapted to play a slot game while another gaming machine may be adapted to play a poker game. The linked gaming machines may have no secondary games, one or more secondary games, the same secondary games or two or more different secondary games. The linked gaming machines may have no progressive award, one or more progressive awards, the same progressive awards or may have two or more different progressive awards. The play of each of the gaming machines 14*a*, 14*b* . . . 14*z* in the group is monitored by the central server 12. The central server or controller may be any suitable server or computing device which includes a processor and a memory or storage device. In alternative embodiments, the central server is a progressive controller or another gaming machine in the gaming system.

The central server or controller maintains or keeps track of the play and/or other activity on or relating to the gaming machines in the gaming system. In one embodiment, the central server keeps track of the play on each gaming machine 14*a*, 14*b* . . . 14*z* including at least: (1) the amount wagered by the player(s) for each play of the primary game for each gaming machine and (2) the time the wagers are placed or the amount of time between each play of the primary game for each gaming machine. It should be appreciated that the player of a gaming machine may change during this tracking and that this tracking can be independent of the specific player playing the gaming machine. In one embodiment, the central server determines the status of each of the gaming machines in the group based on this information. It should be appreciated that other information may be employed by the central server or controller to determine the status of each of the gaming machines in the group. For instance, the number of games played or the amount of each wager placed on each play may be used in the determination of the status of each gaming machine.

It should be appreciated that the central server also keeps track or maintains additional information regarding play of the gaming machines in the group, such as one or more conventional progressive awards associated with the gaming machines which are provided to the players in a conventional manner. Moreover, the central server may track other information, such as when (or if) a bonus event is played by a gaming machine which has been selected to provide the bonus event.

Figure 2:
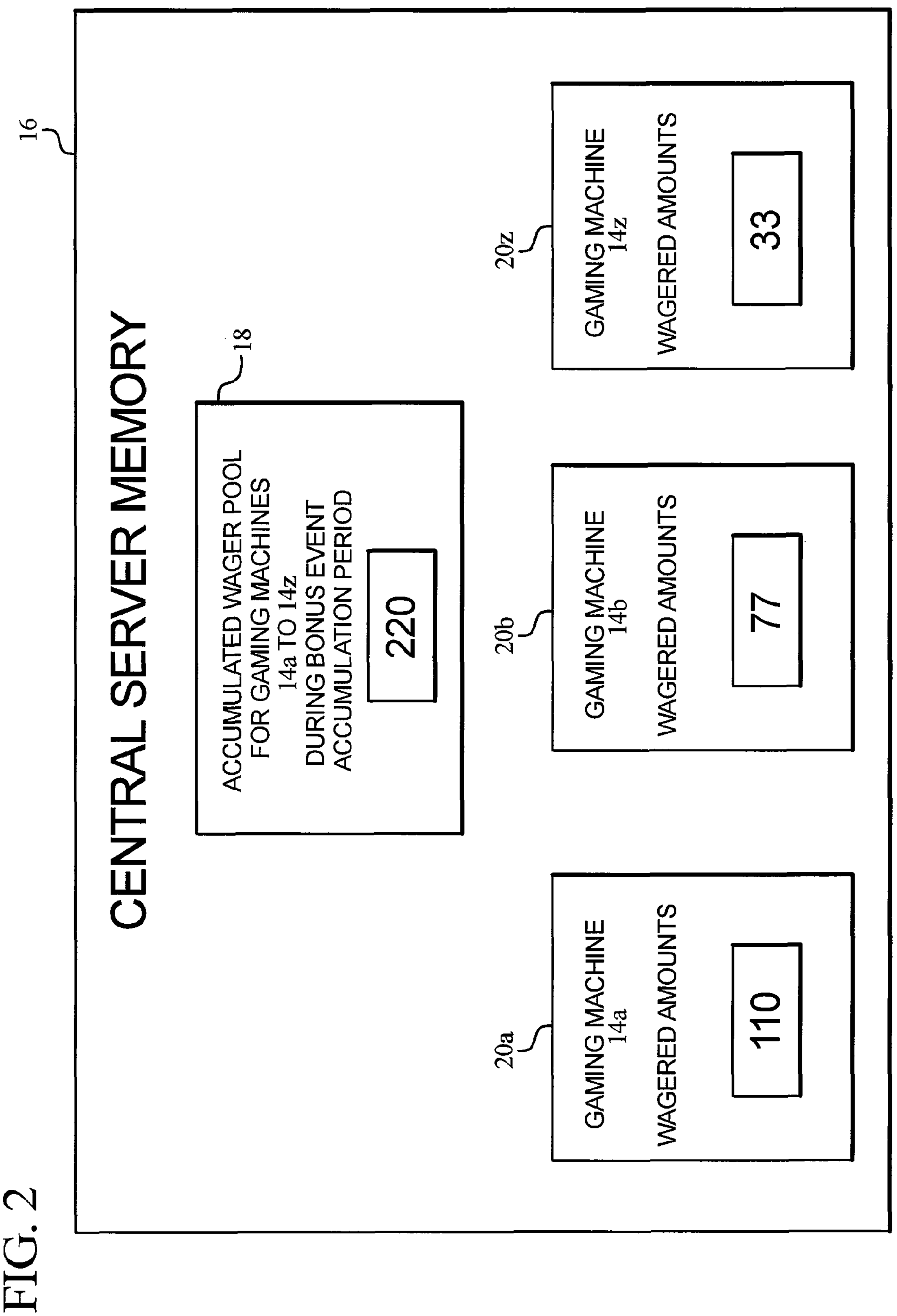
FIG. 2 is a schematic diagram of the memory of the central server of the embodiment of FIG. 1, and which generally illustrates one example of the accumulated wager pool.

As generally illustrated in FIG. 2, the memory 16 of the central server also maintains an accumulated wager pool 18 and the wagered amounts 20*a*, 20*b* . . . 20*z* for each gaming machine 14*a*, 14*b* . . . 14*z* in the group, respectively. The accumulated wager pool 18 includes at least the total amounts wagered by the players of the primary games for each of the gaming machines during the bonus event accumulation period. In FIG. 2, the wagered amounts on gaming machine 14*a* during the bonus event accumulation period is 110 monetary units, the wagered amounts on gaming machine 14*b* during the bonus event accumulation period is 77 monetary units and the wagered amounts on gaming machine 14*z* during the bonus event accumulation period is 33 monetary units. Therefore, the accumulated wager pool 18 includes 220 monetary units as illustrated in FIG. 2.

Figure 3:
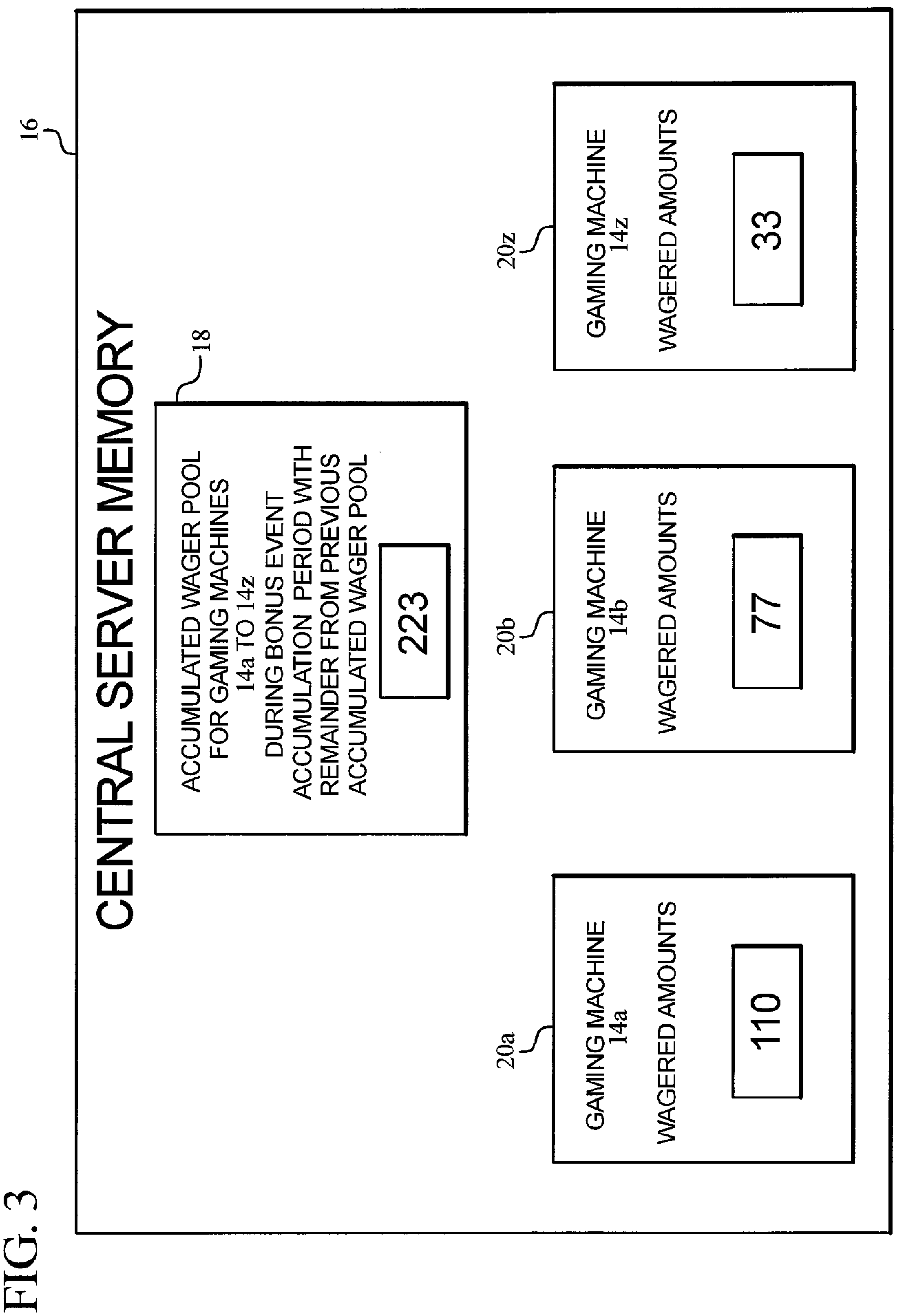
FIG. 3 is a schematic diagram of the memory of the central server of the embodiment of FIG. 1, and which generally illustrates an example of the accumulated wager pool with a remainder for a previous accumulated wager pool.

The example shown in FIG. 2 illustrates the gaming system prior to the occurrence of a first bonus event or after a bonus event in which there is no remainder. After the first bonus event, as described in more detail below, the accumulated wager pool may include a remainder. The remainder accounts for the unaccounted portion of the accumulated wager pool from a previous bonus event. Using this example and referring now to FIG. 3, if a remainder of 3 monetary units exists from a previous accumulated wager pool and the amounts wagered during the present bonus event accumulation period are the same as in FIG. 2, the accumulated wager pool will include 223 monetary units.

The present invention includes defined points which trigger different functions for the central server to perform based on: (a) monetary units wagered on the group of gaming machines; (b) sampling intervals; (c) designated levels of wagers, such as maximum wagers; (d) time passed. Monetary units wagered on gaming machines are sometimes referred to as "coin-in" in the gaming industry and herein.

Generally, in one embodiment, the central server determines when a bonus event will occur based on a sampling rate of the accumulated wager pool and a random determination. The central server also determines which gaming machines to select to provide the bonus award(s) and sends signals or messages containing such information to the gaming machines to indicate such a bonus event.

Bonus Event Accumulation Period and Tracking of Wagered Amounts and Remainders from Previous Bonus Events Referring back to FIGS. 2 and 3, the central server 12 tracks the play of the gaming machines 14*a*, 14*b* . . . 14*z* during a bonus event accumulation period. The central server 12 includes coin-in or wager meters or counters 20*a*, 20*b* . . . 20*z* which respectively individually track the wagers placed on the primary games for each of the gaming machines 14*a*, 14*b* . . . 14*z* in the group. The central server 12 includes an accumulated wager pool 18 which at least tracks the total coin-in or wagers placed on all of the primary games for the gaming machines 14*a*, 14*b* . . . 14*z* in the group. The individual gaming machine wager meters 20*a*, 20*b* . . . 20*z* and the accumulated wager pool 18 may track the wagers made on the gaming machines in any suitable manner, such as in monetary units. Tracking in monetary units allows for two or more of the gaming machines in the group to be of different denominations and also allows for the individual gaming machines to have multiple denominations. In such embodiments, the monetary unit can be in the lowest common denomination. In one embodiment, every gaming machine of the system will also have a separate coin-in or wager meter for the bonus event accumulation period. This may or may not be displayed by the gaming machines to the players.

In an alternative embodiment of the present invention, the central server tracks the play of the gaming machines by having a theoretical coin-in or wager meter or counter for each of the gaming machines in the group. This theoretical wager meter individually tracks the expected average wagers placed on the primary games of each of the gaming machines in the system. This is tracked based on the range of possible wagers on each of the machines and an expected average wager for each wager made. The central server includes a theoretical accumulated wager pool which at least tracks the total theoretical coin-in or wagers placed on all of the primary games for all of the gaming machines in the group.

As described above, in one embodiment of the present invention, the central server maintains or keeps track of the accumulated wager pool. The accumulated wager pool includes the total coin-in or amounts wagered by the players on the primary games of the gaming machines during the bonus event accumulation period. The accumulated wager pool also includes a theoretical remainder, as discussed in more detail below, to account for portions of previous accumulated wager pools which are unaccounted for in previous bonus event(s).

The central server tracks these amounts wagered during each bonus event accumulation period. In one embodiment, each bonus event accumulation period starts at the occurrence of a bonus event and ends at the occurrence of a next or subsequent bonus event. For example, when a bonus event occurs, the accumulation of the monetary units for that bonus event immediately ceases, the values in the meters are stored or set, the accumulated wager pool and meters are reset and all further coin-in or wagers on the linked gaming machines which subsequently occur are accumulated for the next bonus event. This starts even before the gaming machines are selected to provide the bonus awards of that initiated bonus event to the player. It should be appreciated that the exact period of time of the bonus event accumulation period will vary based on many factors, such as the rate of coin-in or wagered monetary units, probability of triggering a bonus event and when the bonus events are triggered. It should also be appreciated that the bonus event accumulation session of the triggering for the first bonus event for the gaming machines in the group can begin upon the initiation or enrollment of the gaming machines in the group. In one embodiment, at the start of each bonus event accumulation period, the wager meter in the central server for each gaming machine will be set to zero.

In an alternative embodiment, the accumulated wager pool and one or more of the gaming machine wager tracking meters do not need to be reset to zero. In one such embodiment, a percentage of the accumulated wager pool is employed for the bonus event (as discussed below) and a percentage of the accumulated wager pool is not employed for the bonus event but is saved for a subsequent bonus event. The same percentages are used for the individual gaming machine wager meters. For example, if the percentage employed is 90% and if:

(a) the accumulated wager pool is at 1000 monetary units,
(b) the wager meter of active gaming machine 14*a* is at 500 credits,
(c) the wager meter of active gaming machine 14*b* is at 300 credits, and
(d) the wager meter of active gaming machine 14*z* is at 200 credits, then
  a. the employed amount of the accumulated wager pool is 900 monetary units,
  b. the employed amount of the wager meter of active gaming machine 14*a* is 450 credits,
  c. the employed amount of the wager meter of active gaming machine 14*b* is 270 credits, and
  d. the employed amount of the wager meter of active gaming machine 14*z* is at 180 credits, and
    i. the unemployed amount of the accumulated wager pool is 100 monetary units,
    ii. the unemployed amount of the wager meter of active gaming machine 14*a* is 50 credits,
    iii. the unemployed amount of the wager meter of active gaming machine 14*b* is 30 credits, and
    iv. the unemployed amount of the wager meter of active gaming machine 14*z* is at 20 credits.

This embodiment leaves the relative ratio's of the meters intact, which allows such ratios to be used for a subsequent bonus event which is immediately triggered.

It should also be appreciated that the relative amount of the wager meters for the gaming machines could vary based on other factors such as the desire to reward a player who has a higher gaming status than other players. For instance, if a player has a higher level player tracking card, the player may be provided more monetary units in the meter of the gaming machine which the player plays to provide that player a greater advantage in being selected to receive a bonus award as discussed below. Thus, in one embodiment, a meter for a gaming machine may be set or reset to a seed amount or to include a seed amount based on the status of the player or one or more other factors. Alternatively, credits or monetary units may be added to the players total wagered amounts to give a player an advantage.

Figure 5:
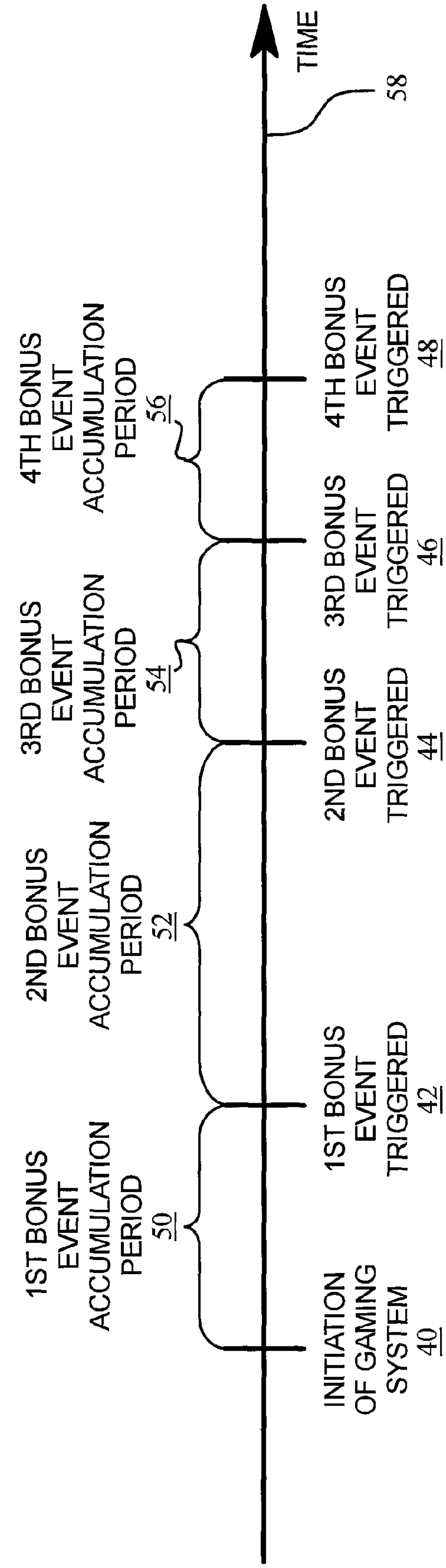
FIG. 5 is a timeline illustrating the bonus event accumulation periods relative to the bonus triggers.

Turning now to FIG. 5, initiation of the gaming system 40, a first bonus triggering event 42, a second bonus triggering event 44, a third bonus triggering event 46, a fourth bonus triggering event 48, a first bonus event accumulation period 50, a second bonus event accumulation period 52, a third bonus event accumulation period 54, and a fourth bonus event accumulation period 56 occur along timeline 58. This illustrates that the first bonus event accumulation period begins upon initiation of the gaming machine in the system and ends upon triggering of the first bonus event 42. This also illustrates that the second, third and fourth bonus event accumulation periods 52, 54 and 56 occur between the first, second, third and fourth bonus event triggers 42, 44, 46 and 48 respectively. FIG. 5 further illustrates that the bonus event accumulation periods can vary in time because the bonus event triggers will occur at different times as the gaming machines in the system are played.

In one embodiment, the bonus event accumulation period and the bonus event qualification period will be different time periods. In another embodiment, the bonus event accumulation period and the bonus event qualification period will be the same or substantially similar time periods. In one embodiment, the bonus event accumulation period is the period of time from the occurrence of one bonus event to the occurrence of the next bonus event. In one embodiment, the bonus event qualification period is the period of time when a primary game of a gaming machine must be actively played prior to a bonus event in order to qualify that gaming machine for that bonus event.

For example, based on the amount wagered on the gaming machines in the group, the bonus event accumulation period may start at 8:30 p.m. and end at 8:32 p.m. In this example, the bonus event accumulation period is one-hundred-twenty seconds from a previous bonus event to a current bonus event and a gaming machine may be eligible to win a bonus award in that current bonus event if a wager has been made on the primary game of that gaming machine in the last fifteen seconds (i.e., the bonus qualification period) of that one-hundred-twenty second period.

Figure 6:
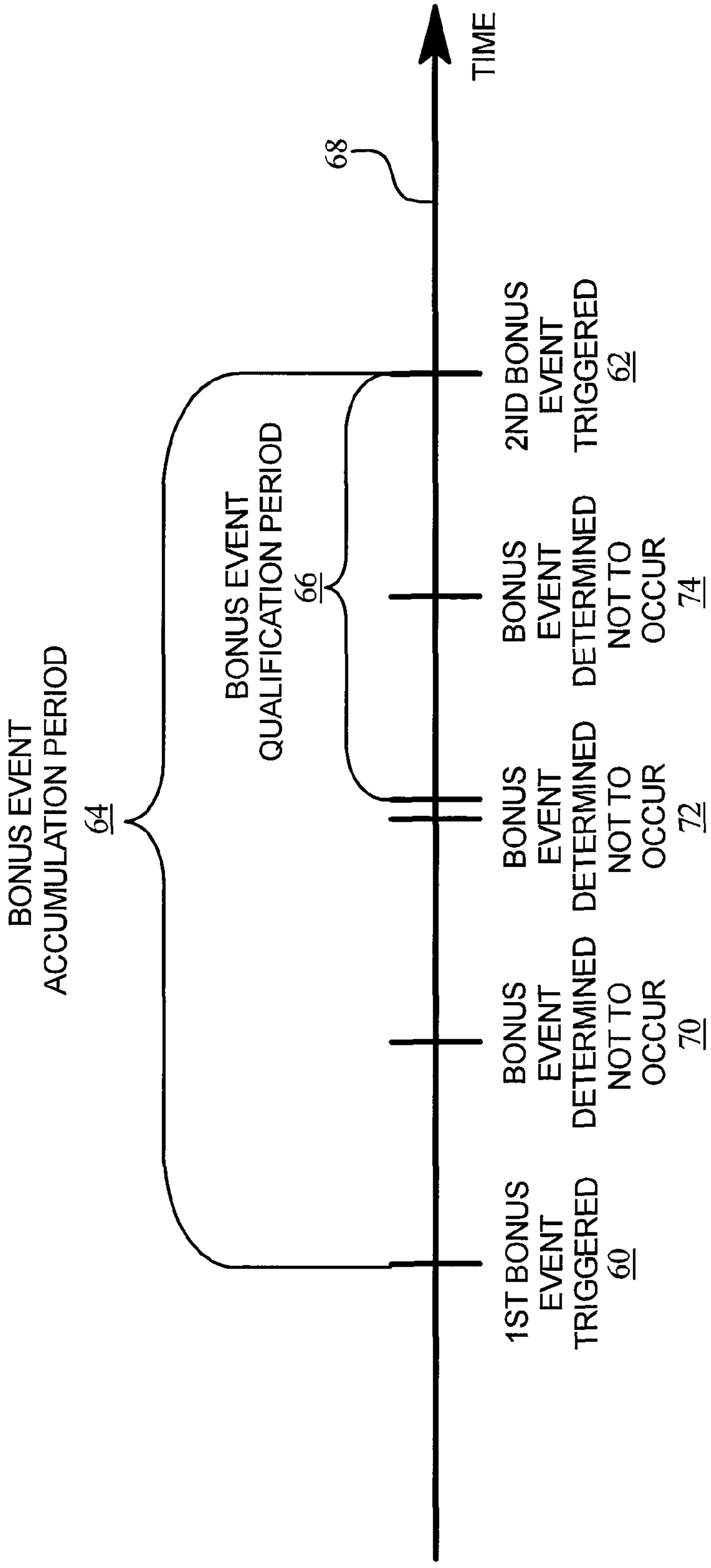
FIG. 6 is a timeline illustrating a bonus event accumulation period relative to the bonus event triggers and a bonus event qualification period.

This is generally illustrated in FIG. 6, where a first triggered bonus event 60, a second triggered bonus event 62, a bonus event accumulation period 64 and a bonus event qualification period 66 occur along time line 68. This illustrates that the bonus event accumulation period can be longer than the bonus event qualification period. FIG. 6 also illustrates three bonus event determinations 70, 72 and 74 that each do not trigger a bonus event. In this example, the central server or controller makes a random determination of whether a bonus event will occur at each interval based on the sampling rate. At determinations 70, 72 and 74, the controller randomly determined that the bonus event will not occur. Thus, the range of the bonus event qualification period will vary based on when the central server or controller determines that the bonus event will occur.

It should be appreciated that in an alternative embodiment of the present invention, the points or wagers are accumulated based on individual players instead of gaming machines. Thus, the system can be alternatively configured to track each player's total wagers and base the bonus events on an accumulated wager pool of the combination of such player's wagers. In one such embodiment, if a player leaves the gaming machine of the gaming system, that player's wagers are removed from the accumulated wager pool. In another such embodiment, if a player leaves the gaming machine of the gaming system, that player's wagered amounts are saved for the player for later use in a pool at another gaming machine. In one embodiment, each player's wagers are tracked via a player tracking system (implemented through the use of a playing tracking card or any other suitable manner). In one embodiment, if the player leaves a gaming machine of the gaming system, the player's points or wagers are retained through the playing tracking system until a designated time or event, such as until the accumulated wager pool is reset. In another embodiment, if the player leaves a gaming machine of the gaming system without transferring their accumulated points using the player tracking system (e.g., the player is not registered in the player tracking system or the player does not have a playing tracking card), the gaming system sets certain criteria which must be fulfilled to reset the accumulated wager pool for that individual gaming machine. For example, if no additional wagers are made at that gaming machine within a designated period of time, the gaming machine determines that the player has left without transferring any accumulated points to the player tracking system and thus the accumulated wager pool is reset without that player's wagered amount. Other suitable uses of that player's wagers can be made by the gaming system of the present invention. Such wagers can be taken in account or not taken in account for future bonus events.

Status of Gaming Machines

In one embodiment of the present invention, the status of each gaming machine in the gaming system as either enrolled status or active status determines whether that gaming machine is eligible to be selected to provide a primary or secondary bonus award in a bonus event. In one embodiment, the status of each gaming machine in the gaming system when the bonus event occurs also determines the number of secondary bonus awards provided in the bonus event.

The enrolled status means that the gaming machine is one of the linked gaming machines in the system, but is not being actively played by a player during a bonus event qualification period. A gaming machine may be classified as enrolled status for several reasons. For example, no player may be playing the gaming machine. In another example, a player could be playing the gaming machine (i.e., by having credits on the gaming machine), but be playing too slowly or be interrupted during play. In this case, the player could have credits on the credit meter of the gaming machine, but the player has not made a wager on a primary game or otherwise qualified for a bonus event during the bonus event qualification period.

The active status means that the gaming machine is being actively played by a player during a bonus event qualification period. In one embodiment, actively playing during a bonus event qualification period means that the player is playing the primary game of the gaming machine (i.e., placing wagers on plays of the primary game) at least at a predefined minimum rate during a predefined time period. For example, the gaming machine may be in active status when a player has made at least one play of the primary game in a fifteen second period prior to the triggering of the bonus event. In this example, the bonus event qualification period is that fifteen second period prior to the triggering of the bonus event.

In another embodiment, the bonus event qualification period may begin with the determination that a bonus event will occur. In this embodiment, any additional accumulation of the monetary units for the current bonus event will cease immediately upon the conclusion of the bonus event qualification period. That is, the bonus event accumulation period ends at the same time as the bonus event qualification period ends. For example, the bonus event qualification period is that fifteen second period after the determination to trigger a bonus event. In another embodiment, the active status may alternatively or additionally be based on the amount wagered on the plays of the primary game during a bonus event qualification period. In a further alternative embodiment, the determination of the active status may be based on a designated minimum number of plays of the primary game or number of wagers on the primary game in a designated time period. The determination of active status may take into account other factors such as interruptions or displays in play of the primary game such as caused by the triggering of other bonuses or the operation of other secondary games of the gaming machines. In another embodiment, a gaming machine can only be determined to be an active gaming machine if an additional wager, such as a side-bet or side-wager, is made by a player at a gaming machine of the gaming system for one play of a game, a plurality of plays of a game or all plays of a game in a designated period of time. It should be appreciated that a gaming machine may be classified as active based on any one or more suitable parameters or criteria as determined by the implementer or operator of the gaming system.

Figure 4:
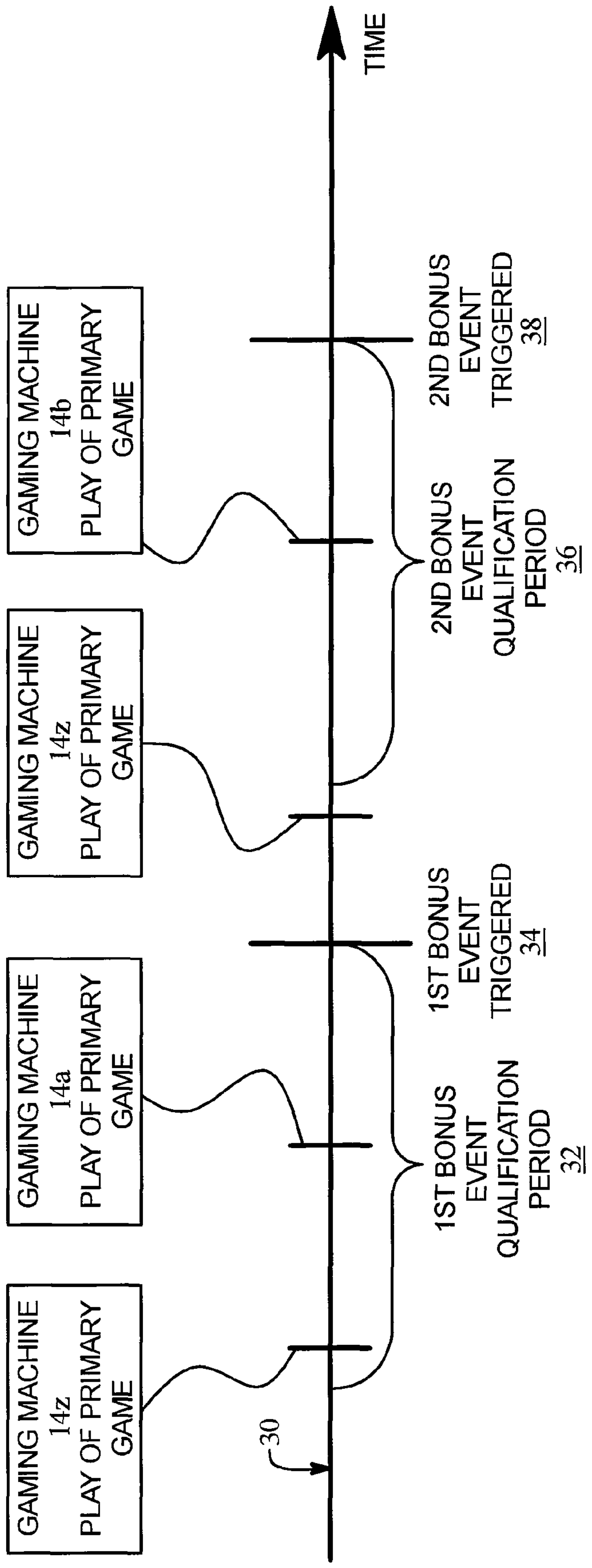
FIG. 4 is a timeline illustrating the bonus event qualification periods relative to the bonus event triggers.

FIG. 4 illustrates a timeline 30 of a first bonus event qualification period 32, a first bonus triggering event 34, a second bonus event qualification period 36 and a second bonus triggering event 38. This illustrates that the bonus event qualification periods 32 and 36 are periods of time prior to the triggering of the respective bonus events 34 and 38. This also illustrates that gaming machine 14*z* and gaming machine 14*a* both played the primary game during the first bonus event qualification period 32 and therefore were in active status for the first bonus event 34. This further illustrates that gaming machine 14*b* played the primary game during the second bonus event qualification period 36 and therefore was in active status for the second bonus event 38. However, since gaming machine 14*z* played the primary game after the first bonus event, but not within the second bonus event qualification period 36, gaming machine 14*z* is in enrolled status but not in active status to be eligible for the second bonus event 38. It should be appreciated that the bonus event qualification periods preferably remain constant or consistent.

After a bonus event is determined to occur, the central server or controller will determine for each gaming machine if that gaming machine is in an active status and thus eligible to be selected by the controller to provide a bonus award. It should appreciated that a gaming machine in the system needs to be in active status during the bonus event qualification period to be eligible to provide either of the primary bonus or any secondary bonuses in the bonus event. It should also be appreciated that the bonus event qualification period could alternatively be based on the amount of the wagers in addition to or instead of the time of the wagers. In one such embodiment, if the player makes a designated number of wagers at a designated level, such as maximum wager on the primary game of a gaming machine, that gaming machine can qualify for the next triggered bonus event.

In an alternative embodiment, one or more other or additional awards, such as one or more progressive awards, are associated with the linked gaming machines. In one embodiment, the gaming machine must also be in active status to provide one of these additional award(s) to a player.

Additionally, it should be appreciated that the present invention contemplates other or additional methods for determining that a gaming machine is active. For instance, the player may be enabled to make a side wager or additional wager to be active for one or more subsequent bonus events. The side wager feature could also be time based where the additional wager causes the gaming machine to be active for a subsequent time period, such as one minute.

It should also be appreciated that one or more additional statuses may be employed in accordance with the present invention. In one embodiment, a participating status is provided for a gaming machine based on a determination of whether the gaming machine will be part of the bonus event or be eligible to be selected to provide a bonus award to the player of that gaming machine. For instance, a gaming machine will be in a participating status if an individual player playing the gaming machine is a premier player. This could be determined at least in part based on the status of that player determined via a player tracking card used by that player in the gaming machine. It should be appreciated that other criteria can be used to determine if a player is in the participating status. It should be further appreciated that when a gaming machine is in the participating status, the gaming system automatically treats the gaming machine as an active gaming machine for purposes of the other determinations including bonus event eligibility by the gaming system.

Central Server Determination of Occurrence of Bonus Event

One embodiment of the gaming system of the present invention includes a minimum accumulated wagered amount or threshold prior to a determination of whether a bonus event will occur. As generally illustrated in FIG. 14, the amount in this example is 216 monetary units. If the accumulated wager pool is below this predefined minimum threshold amount, the central server does not determine whether a bonus event will occur. In one embodiment, the central server determines at regular intervals whether to provide a bonus event to the active status gaming machines. The sample rate can be any suitable rate, such as based on a number of monetary units wagered as tracked by the accumulated wager pool. For example, as seen in FIG. 14, a determination is made every fifty monetary units wagered. At each predetermined interval, the central server determines if the accumulated wager pool has reached the predefined minimum level of wagered monetary units for all of the gaming machines in the system including the active status and enrolled status gaming machines.

In another embodiment, the central controller determines whether to provide a bonus event at regular intervals based on any other suitable sample rate, such as once every two minutes. In one embodiment, each time interval is associated with a probability of the bonus event occurring, wherein the probability of a bonus event occurring increases over time until the probability of the bonus event occurring is one-hundred percent (which may additionally coincide with a cap or limit of which the accumulated wager pool may grow to). For example, if the probability associated with a bonus event occurring after two minutes is 2.0%, the probability associated with a bonus event occurring after ten minutes may be 10.0%. In another such embodiment, even if a bonus event is determined to occur (i.e., based on the probability associated with the elapsed time interval), the bonus event will only occur if the accumulated wager pool is at or above the predefined minimum threshold amount. In another such embodiment, if the accumulated wager pool is at or above the predefined minimum threshold amount, the central controller will begin to determine at regular or predetermined intervals (such as every fifteen seconds) whether to provide a bonus event.

In another embodiment, each time interval is associated with a probability of the bonus event occurring, wherein the probability of a bonus event occurring is based on the number of gaming machines in the active state. In this embodiment, the greater the number of active gaming machines in the gaming system, the greater the probability of the bonus event occurring at each designated time interval. For example, if one gaming machine is in the active state, the probability of the bonus event occurring at each designated time interval may be 0.1%, if two gaming machines are in the active state, the probability of the bonus event occurring at each designated time interval may be 0.2% and if three gaming machines are in the active state, the probability of the bonus event occurring at each designated time interval may be 0.3%. In another embodiment, each time interval is associated with a probability of the bonus event occurring, wherein the probability of a bonus event occurring is based on the number of credits played or wagers placed during the previous bonus event accumulation period or bonus event qualification period.

If the accumulated wager pool has reached the predefined minimal level, the central server determines whether to provide the bonus event to one of the gaming machines. In one embodiment, this is a random determination based on a suitable probability, such as two percent, five percent or ten percent. It should be appreciated that other suitable methods can be employed for determining whether to provide the bonus event to the player.

If the central server determines to provide the bonus event to the player, the central server immediately stores the accumulated wager pool for determining the modifier component of the bonus award and resets the accumulated wager pool for the subsequent bonus event. This accumulated wager pool for the subsequent bonus event will include any remainder as discussed below.

If the accumulated wager pool has not reached the predefined minimal level, the central server does not determine whether to provide a bonus event to one the gaming machines in the system. If the central server does not determine whether to provide a bonus event to one of the gaming machines in the system or the central server determines not to provide the bonus event to the players, the central server waits until the next interval based on the sampling rate. In this case, the server continues to track monetary units in each of the meters because a new bonus event has not occurred.

It should also be appreciated that these determinations could be combined as one function instead of two functions. More specifically, as the accumulated wager pool reaches each of a plurality of predefined levels, the central server will make the random determination of whether to provide a bonus event. This eliminates the need to sample the accumulated wager pool at regular intervals. In a further embodiment, sampling is done only after the accumulated wager pool reaches the predefined threshold level.

In an alternative embodiment, the gaming system can allow the gaming machines to trigger the occurrence of the bonus event for a group of gaming machines instead of determining if the bonus event will occur based on a sampling rate. After a bonus event is determined to occur by one of the gaming machines, the bonus awards are determined as described herein.

Central Server Determination of Active Gaming Machine to Provide Bonus Award after Determination to Provide Bonus Event If the central server determines to provide the bonus event, the central server determines which active gaming machines to select to provide the bonus awards. In one embodiment, the central server determines which active gaming machine to select to provide the primary bonus award based on the relative amounts of total wagers placed by the active gaming machines during the bonus event accumulation period. In one embodiment, the central server selects the gaming machine (to provide the primary bonus award) which had the largest total wagers during the bonus event accumulation period.

In another embodiment, the central server determines the relative percentage of amounts wagered at the active gaming machines to the total accumulated amounts wagered by those active gaming machines during the bonus event accumulation period. In other words, the sum of the active gaming machines total wagers placed during the bonus event accumulation period will be used to determine a probability or percentage for each active gaming machine of being selected to provide the primary bonus award. The relative probabilities or percentages will almost always be different because as stated above, players play at different rates, players wager different amounts or players may play at different denominations and players also often vary their own wager rates and amounts.

It should be appreciated that if there are not active gaming machines or no gaming machines are being played when a bonus event is determined, in one embodiment, no gaming machines are selected to provide the bonus award and the amount of monetary units in the accumulated wager pool can be rolled into the next accumulated wager pool for the next or a subsequent bonus event. In this embodiment, the controller can detect if no gaming machines are active in the manner described above and can detect if no machines are being played in any suitable manner, such as based on cash outs, the existence of credits on the machines within certain time periods and/or the presence of player tracking cards.

The central server uses the relative probabilities or percentages of wagered amounts during the bonus event accumulation period for each active gaming machine to randomly determine which active gaming machine will be selected to provide the primary bonus award. Using this process, each active gaming machine has a chance of being selected to provide the primary bonus award. In this embodiment, the active gaming machine with the most amount wagered during the bonus event accumulation period has the best chance of providing the primary bonus award. On the other hand, the active gaming machine with the least amount wagered during the bonus event accumulation period has the worst chance of providing the primary bonus award.

Referring back to FIG. 2 and also to FIG. 7, in this example, if gaming machines 14*a*, 14*b*, and 14*z* are active, the wager meter 20*a* or amount for gaming machine 14*a* is 110 monetary units, the wager meter 20*b* or amount for gaming machine 14*b* is 77 monetary units and the wager meter 20*z* or amount for gaming machine 14*z* is 33 monetary units. In this example, as each of the gaming machines 14*a*, 14*b*, 14*z* are active, the applicable accumulation wager pool is 220 and the probabilities for being selected to provide the primary bonus award for gaming machine 14*a* is $^{110}/_{220}$ or 50%, for gaming machine 14*b* is $^{77}/_{220}$ or 35% and for gaming machine 14*z* is $^{33}/_{220}$ or 15%. The central server will determine the gaming machine which will provide the primary bonus award based on these probabilities using a random number generator or random number generating algorithm.

As illustrated in FIG. 8A, in this example, if gaming machines 14*b* and 14*z* are active and gaming machine 14*a* is enrolled but not active, the wager meter or amount for gaming machine 14*a* is 110 monetary units, the wager meter or amount for gaming machine 14*b* is 77 monetary units and the wager meter or amount for gaming machine 14*z* is 33 monetary units. In this example, as gaming machines 14*b* and 14*z* are active, the applicable portion of the accumulation wager pool is 110 and the probabilities for being selected to provide the primary bonus award for gaming machine 14*a* is 0/110 or 0%, for gaming machine 14*b* is 77/110 or 70% and for gaming machine 14*z* is 33/110 or 30%.

As illustrated in FIG. 9, in this example, if gaming machines 14*a* and 14*z* are active, and gaming machine 14*b* is enrolled but not active, the wager meter or amount for gaming machine 14*a* is 110 monetary units, the wager meter or amount for gaming machine 14*b* is 77 monetary units and the wager meter or amount for gaming machine 14*c* is 33 monetary units. In this example, as gaming machines 14*a* and 14*z* are active the applicable accumulation wager pool is 143 and the probabilities for being selected to provide the primary bonus award for gaming machine 14*a* is approximately 110/143 or 77%, for gaming machine 14*b* is 0/143 or 0% and for gaming machine 14*z* is 33/143 or 23%.

As illustrated in FIG. 10, in this example, if gaming machine 14*a* is active and gaming machines 14*b* and 14*z* are enrolled but not active, the wager meter or amount for gaming machine 14*a* is 110 monetary units, the wager meter or amount for gaming machine 14*b* is 77 monetary units, and the wager meter or amount for gaming machine 14*z* is 33 monetary units. In this example, as only gaming machine 14*a* is active, the application accumulation wager pool is 110 and the probabilities for being selected to provide the primary bonus award for gaming machine 14*a* is 110/110 or 100%, for gaming machine 14*b* is 0/110 or 0% and for gaming machine 14*z* is 0/110 or 0%.

As discussed above, a gaming machine in the group may be enrolled but not active when a bonus event occurs. For instance, a gaming machine may be active for a period of time during the bonus event accumulation period, but then a player may be interrupted and allow the gaming machine to become inactive. In one embodiment, this enrolled but not active gaming machine is not eligible to obtain a primary or secondary bonus award. In this example, the inactive gaming machine's accumulated monetary units are excluded or not used in determining the relative percentages of wagered amounts of the active gaming machines as specifically illustrated in FIGS. 7 to 10, but are used in determining the part of the bonus award including the modifier or multiplier component as discussed below.

In one embodiment of the present invention, if a gaming machine is selected to provide an award and no player is playing that selected gaming machine during a timeout period (such as a 1 hour period), the amount of the award or amount of the accumulated wager pool which accounts for that award can be reallocated or rolled back into an accumulated wager pool for a subsequent bonus award. Alternatively, said award could be saved for a subsequent bonus event provided to another selected gaming machine.

As indicated above and illustrated in FIGS. 7 to 10, the central server determines which active gaming machines will be selected to provide the bonus awards based on a true weighted average of the wagered amounts for each active gaming machine relative to the total wagered amounts for all active gaming machines. In an alternative embodiment, the weighting is not truly proportional. In one such embodiment, the gaming machine with the largest portioned wagered amounts could achieve a higher weighting. Employing this embodiment, in the example of FIG. 7, the weighting could be 55% for gaming machine 14*a*, 35% for gaming machine 14*b*, and 10% for gaming machine 14*z*. Employing this embodiment in the example in FIG. 8A, the weighting could be 80% for gaming machine 14*b* and 20% for gaming machine 14*z*. This embodiment further rewards greater wagers during the bonus event accumulation period.

The present invention contemplates a further alternative embodiment where a fixed percentage grid, matrix, or table is employed to determine the relative percentages. In one such embodiment, the rank of the wager meters of the active gaming machines determines the relative percentages regardless of how much is accumulated in each wager meter. For example, the higher rank could always have a 75% probability, the intermediate rank could always have a 20% probability and the lowest rank could always have a 5% probability. In the example where:

(a) gaming machine 14*a* has 110 monetary units,
(b) gaming machine 14*b* has 77 monetary units, and
(c) gaming machine 14*z* has 33 monetary units, then
  (1) gaming machine 14*a* would have a 75% chance of being selected because it has the highest rank,
  (2) gaming machine 14*b* would have a 20% chance of being selected because it has an intermediate rank, and
  (3) gaming machine 14*z* would have a 5% chance of being selected because it has the lowest rank.

These percentages are fixed regardless of the actual ratios. It should also be appreciated that in this embodiment, each different number of active gaming machine can have a different table, grid or matrix associated with it. For example, the following grids, tables or matrixes could be provided for a gaming system with six gaming machines:

| 1 Active Gaming Machine | |
|---|---|
| 1st | 100% |
| **2 Active Gaming Machines** | |
| 1st | 75% |
| 2nd | 25% |
| **3 Active Gaming Machines** | |
| 1st | 75% |
| 2nd | 20% |
| 3rd | 5% |
| **4 Active Gaming Machines** | |
| 1st | 50% |
| 2nd | 30% |
| 3rd | 15% |
| 4th | 5% |
| **5 Active Gaming Machines** | |
| 1st | 45% |
| 2nd | 30% |
| 3rd | 10% |
| 4th | 10% |
| 5th | 5% |
| **6 Active Gaming Machines** | |
| 1st | 45% |
| 2nd | 29% |
| 3rd | 11% |
| 4th | 9% |
| 5th | 5% |
| 6th | 1% |

In another alternative embodiment, each gaming machine can be placed in a category or range. If two or more gaming machines are placed in the same category or range, than the percentage for that category or range is divided between those gaming machines.

In another alternative embodiment, if the central server determines that a bonus event will occur, the central server determines which active gaming machines to select to provide each of the bonus awards to based on the respective relative total amounts wagered on each of the active gaming machines, wherein one active gaming machine may be selected a plurality of times to provide one or a plurality of bonus awards. In this embodiment, a gaming machine (or individual player tracked via a player tracking system) is provided the chance to win a plurality of bonus awards to qualify for inclusion in the bonus event a plurality of times, regardless of whether or not the central server previously selected the gaming machine (or individual player) to win a previous bonus award.

In one such embodiment, upon the determination to provide a bonus event, the central server determines, for each active gaming machine in the gaming system, a probability of winning a bonus award based on an amount that gaming machine contributed to the accumulated wager pool during the bonus event accumulation period. In this embodiment, for the primary bonus award, the central server randomly selects, based on the probabilities associated with the active gaming machines, one of the gaming machines. For each secondary bonus award (as described below), the central server randomly selects, based on the probabilities associated with the active gaming machines, one of the gaming machines, wherein the same gaming machine selected to provide the primary bonus award may also be selected to provide one, more or each of the secondary bonus awards. That is, even if a gaming machine is selected to provide one of the bonus awards, the same gaming machine may be reselected to provide another of the bonus awards. In other words, in this embodiment, a probability table constructed to determine each players relative probability of winning a bonus award includes a replacement feature wherein every gaming machine may be picked for each selection. Thus, even if a gaming machine is selected to provide one bonus award, the same gaming machine may be reselected to provide another bonus award. It should be appreciated that this embodiment provides that a gaming machine (or player) is provided a chance to win one or more bonus awards based on the respective relative total amounts wagered on that active gaming machine wherein a gaming machine (or player) with a high level of play is provided a correspondingly high probability of wining one or more bonus awards while a gaming machine (or player) with a low level of play is provided a correspondingly low probability of winning one or more bonus awards.

For example, as seen in FIG. 8B, if gaming machines 14*b* and 14*z* are active and gaming machine 14*a* is enrolled but not active, the wager meter or amount for gaming machine 14*a* is 110 monetary units, the wager meter or amount for gaming machine 14*b* is 77 monetary units and the wager meter or amount for gaming machine 14*z* is 33 monetary units. In this example, as gaming machines 14*b* and 14*z* are active, the applicable portion of the accumulation wager pool is 110 and the probabilities for being selected to provide the primary bonus award for gaming machine 14*a* is $^{0}/_{110}$ or 0%, for gaming machine 14*b* is $^{77}/_{110}$ or 70% and for gaming machine 14*z* is $^{33}/_{110}$ or 30%. As further seen in FIG. 8B, if the central server determines to provide one primary bonus award and one secondary bonus award, then regardless of the selection of which gaming machine will provide the primary bonus award, the probabilities for being selected to provide the secondary bonus award for gaming machine 14*a* is $^{0}/_{110}$ or 0%, for gaming machine 14*b* is $^{77}/_{110}$ or 70% and for gaming machine 14*z* is $^{33}/_{110}$ or 30%. As seen in this example, even if gaming machine 14*b* is selected to provide the primary bonus award, because gaming machine 14*b* contributed the highest amount of monetary units to the accumulation wager pool, gaming machine 14*b* is associated with the highest probability of winning the primary bonus award and gaming machine 14*b* is also associated with the highest probability of winning the secondary bonus award.

In one alternative embodiment, the gaming system includes a triggering gaming machine which is provided the primary bonus award. In this embodiment, the triggering gaming machine is a gaming machine associated with a suitable triggering event which causes a primary bonus award and one or more secondary bonus awards to be provided. For example, a triggering gaming machine is a gaming machine which generated a designated symbol or symbol combination in a primary game. In another example, a triggering gaming machine is a gaming machine which contributed an appropriate amount to cause an accumulated wager progressive award to reach a progressive award hit value (as described below). In this embodiment, for each secondary bonus award, the central server randomly selects, based on the probabilities associated with the active gaming machines, one of the gaming machines, wherein the triggering gaming machine may also be selected to provide one, more or each of the secondary bonus awards. In one alternative embodiment, all active gaming machines and all enrolled but not active gaming devices in the gaming system are operable to be provided the primary bonus award and one or more second bonus awards, wherein each gaming machine may be provided one or more bonus awards based on that gaming machine's respective relative total amount wagered.

In another such embodiment, upon the determination to provide a bonus event to a specific gaming machine or to a specific player (tracked via a player tracking system), the central server designates the specific gaming machine/player as the first participant in the group event. The central server determines for each gaming machine/player, a probability of participating in the bonus event based on an amount that gaming machine/player contributed to the accumulated wager pool since the last bonus event. In this embodiment, for the number of participants determined to be included in the bonus event, the central server randomly selects, based on the probabilities associated with the gaming machines/players, one of the gaming machines/players to participate in the bonus event. For the specific gaming machine/player designated as the first participant in the bonus event, the central server also determines a probability of participating in the bonus event based on an amount the specific gaming machine/player contributed to the accumulated wager pool since the last bonus event. It should be appreciated that in this embodiment, if a gaming machine/player is previously designated as a participant for the bonus event and that gaming machine/player is subsequently selected to participate in the bonus event, then that gaming machine/player is designated as more than one participant in the same bonus event, a different bonus event or a set of bonus events. It should be further appreciated that the group event may include a plurality of players (i.e., if at least two different players at least two gaming devices are each selected to be at least one participate in the group event) or one player (i.e., if one player at one gaming device is selected to be each participant in the group event).

For example, if a player's wager at gaming machine 14*b* increments an accumulated value progressive award to a determined progressive award hit value (as described in more detail below), the central server determines that a group event will occur and gaming machine 14*b* is designated as the first participant in the group event. In this example, the =central server constructs a weighted probability table for each player's chance to participate in the group event, wherein the weighted probability table is based on the amount of play (such as the amount of monetary units wagered) since the last group event. As seen in FIG. 8C, if gaming machines 14*a*, 14*b*, and 14*z* are active, the wager meter 20*a* or amount for gaming machine 14*a* is 176 monetary units, the wager meter 20*b* or amount for gaming machine 14*b* is 11 monetary units and the wager meter 20*z* or amount for gaming machine 14*z* is 33 monetary units. As each of the gaming machines 14*a*, 14*b*, 14*z* are active, the applicable accumulation wager pool is 220 and the weighted probability table provides that the probabilities for being selected to participate in the group event for gaming machine 14*a* is 176/220 or 80%, for gaming machine 14*b* is 11/220 or 5% and for gaming machine 14*z* is 33/220 or 15%. It should be appreciated that even though the central server designated gaming machine 14*b* as the first participant in the group event, in this embodiment, the central server determines a probability of gaming machine 14*b* being designated as another participant in the group event.

In this example, the central server determines to provide three participants in the group event and based on the associated probabilities described above, the central server randomly selects one of the gaming machines from the constructed probability table to be designated as the second participant in the group event. If the selected gaming machine is not an active gaming machine, the central controller randomly selects another one of the gaming machines until an active gaming machine is selected. In this case, gaming machine 14*a* is selected as the second participant in the group event. After selecting the second participant, the central server determines based on the probabilities of the constructed probability table, that gaming machine 14*a* is also selected as the third participant in the group event. That is, since gaming machine 14*a* contributed 80% to the accumulated wager pool, gaming machine 14*a* has an 80% of being selected as the second participant in the group event and also an 80% of being selected as the third participant in the group event (regardless of if gaming machine 14*a* was previously selected as the second participant). This multiple participation embodiments provides active players the opportunity to either win more awards up front or to have more entries in a group event (i.e., more opportunities to win one or more awards).

In one alternative embodiment, all active gaming machines and all enrolled but not active gaming devices in the gaming system are operable to be provided a chance to participate in the bonus event, wherein each gaming machine's chances to participate as one or more participants in the bonus event is based on that gaming machine's respective relative total amount wagered.

In another embodiment, the gaming system enables one or more players to selectively decide if they want their tracked wager amounts or points to be included in a determination of if any bonus awards are provided to any players. In this embodiment, the gaming system enables a player to decide to include their tracked wager amounts in the currently accumulating wager pool or to store their tracked wager amounts for a subsequent accumulated wager pool. If the player decides to include their tracked wager amounts in the currently accumulated wager pool, the gaming system proceeds as described above. On the other hand, if the player decides to store or save their tracked wagers, such amounts are stored or saved in association with a player tracking system. In this embodiment, the gaming system enables the player to determine at a subsequent time and at the player's leisure, if they want part or all of their stored tracked wager amounts to be included in a subsequent accumulated wager pool. Such a configuration provides that a player may store and build up their tracked wagers and then include their built up tracked wagers in an accumulated wager pool to improve their chances of winning at least one bonus award.

For example, if the wager meter for a player at a gaming machine is 50 monetary units and the accumulated wager pool includes 1000 monetary units, then as described above, the player has a 5% chance of being selected to win at least one bonus award. In this example, the player decides to store their 50 monetary units for a subsequent accumulated wager pool and continues to place wagers to increment their respective wager meter. In this example, when the player has built up and stored 200 monetary units, the player decides to contribute their stored monetary units into the currently accumulating wager pool for a chance to win at least one bonus award. In this example, if the player has 200 monetary units stored and the accumulated wager pool (including the player's contributed 200 monetary units) includes 1000 monetary units, the player has a 20% chance of being selected to win at least one bonus award. Accordingly, by withdrawing from one player selection determination and storing tracked wagers for a subsequent player selection determination, this embodiment enables a player to increase their chances of winning at least one bonus award.

In one embodiment, the gaming system implements restrictions on storing such tracked wagers in association with a player tracking system. For example, the gaming system restricts the quantity of tracked wagers which may be stored and/or the timing of when such tracked wagers may be stored. In different embodiments, such restrictions on storing tracked wagers are predetermined, randomly determined, determined based on a player's status (such as determined through a player tracking system), determined based on a generated symbol or symbol combination, determined based on a random determination by the central controller, determined based on a random determination by a gaming device, determined based on one or more side wagers placed, determined based on the player's primary game wager, determined based on time (such as the time of day), determined based on the amount of coin-in accumulated in one or more pools, or determined based on any other suitable method or criteria.

In another alternative embodiment, the bonus event utilizes a shared device, such as a wheel, to determine one, more or each bonus event awards. It should be appreciated that any suitable manner of determining a bonus event award may be implemented in accordance with the gaming system disclosed herein.

Central Server Determination of Number of Secondary Bonus Awards Upon Occurrence of Bonus Event When a bonus event is determined to occur, a primary bonus award will be provided to the player of one of the active gaming machines as discussed above. Additionally, in one embodiment, zero, one or more secondary bonus awards are also provided to the players of zero, one or more of the active gaming machines. In one embodiment, the number of secondary awards is based on the number of active gaming machines at the time of the occurrence of the bonus event and the maximum number of secondary bonus awards is limited by the number of enrolled gaming machines. In this embodiment, for each group of "x" gaming machines which are active, one secondary bonus award is provided to one of the active gaming machines. In one example illustrated in FIG. 13, sixty gaming machines are enrolled in the gaming system (i.e., zero to sixty gaming machines may be active) and each group of six gaming machines activated during the bonus event qualification period causes an additional secondary bonus to be awarded in the bonus event. Since groups of six machines per secondary bonus are defined and sixty machines are enrolled, there can be up to ten secondary bonus awards. In this example, to ensure enough money has been wagered on average to pay for or account for the bonus event, the first chance for the bonus event will occur after two hundred-sixteen monetary units are on the total wager meter as discussed below.

In the first scenario of this example, one gaming machine is active when the bonus event occurs. In this scenario, a primary bonus award and zero secondary bonus awards are provided by the gaming machines in the system. In a second scenario of this example, two to six gaming machines are active when the bonus event occurs. In this scenario, one secondary bonus award will be provided by one of the active gaming machines in the system which does not provide the primary bonus award. In one embodiment, the active gaming machine which provides the primary bonus award is excluded from this determination. In one embodiment, the secondary bonus award will be provided by the active gaming machine with the highest wager meter that did not provide the primary bonus award. In this embodiment, the active gaming machine with the greatest amount wagered during the bonus event accumulation period will be selected to provide the secondary bonus award. It should be appreciated that this embodiment compensates the player who wagered the most during the bonus event accumulation period. This method creates a small advantage to the players that play the most monetary units during the bonus event accumulation period. In the unlikely event of a tie, in one embodiment, the central server randomly selects the active gaming machine selected to provide the secondary bonus award. In one embodiment, each active gaming machine has an equal probability of being selected to obtain a secondary bonus award. Other suitable methods can be employed in accordance with the present invention to determine which gaming machine which will obtain any secondary bonus award.

In a third scenario of this example, more than six gaming machines are active when the bonus event occurs. In this scenario, the bonus event will include multiple secondary bonus awards provided by the active gaming machines in the system. The number of secondary bonus awards will be based on the group size, in this example six. The number of active gaming machines will be divided by the group size and then rounded up. For example, if seven to twelve machines are active, the bonus event will include two secondary bonuses awards, if thirteen to eighteen machines are active, the bonus event will include three secondary bonus awards, etc. This could continue for more bonus awards depending on the active number of gaming machines. In one embodiment, similar to the second scenario, these secondary bonus awards will be provided by the active gaming machines with the highest wager meters during the bonus event accumulation period. Alternatively, any suitable method, such as the methods described above with respect to the primary award, could be used to determine which gaming machines will be selected to provide the secondary bonus awards.

It should thus be appreciated that in one embodiment, the central server determines each active gaming machine which will provide the secondary award. In alternative embodiments, a greater number of gaming machines or all of the active gaming machines could each be selected to provide a secondary award to the respective players. In such embodiments, the value component of the award determined by each gaming machine (as further discussed below) would be from a smaller range or have a smaller expected value. In one such embodiment, the ranges would have descending average expected values based on the order of the wager totals for such gaming machines. The value component would be combined with the modifier component, such as a multiplier component sent by the central server to each gaming machine to determine the secondary bonus award provided by each gaming machine. In a further alternative embodiment, the gaming machine could provide a fixed or designated award or a progressive award.

Determination of the Primary Bonus Award and Secondary Bonus Award(s)

In one embodiment of the present invention, the primary bonus award is determined based on a value or value component determined for the primary bonus award and a modifier or modifier component determined for the primary bonus award. The value component modified by the modifier component results in the primary bonus award which is provided to or received by the player. In one embodiment, the gaming machine selected to provide the primary bonus award determines the value component of the primary bonus award and the central server determines the modifier component. In this embodiment, the central server determines and sends the modifier component to the selected gaming machine.

In one embodiment of the present invention, each secondary bonus award is determined based on a value or value component determined for that secondary bonus award and a modifier or modifier component determined for that secondary bonus award. The value component modified by the modifier component forms the secondary bonus award for that gaming machine. In one embodiment, the gaming machine selected to provide the secondary bonus award independently determines the value component of the secondary bonus award for that gaming machine and the central server determines the modifier component. In this embodiment, the central server sends the modifier component to that gaming machine. It should be appreciated that since the value components for the secondary bonus awards are each determined by the respective gaming machine selected to provide the secondary bonus awards, the secondary bonus awards for each selected gaming machine may be different.

In one embodiment of the present invention, the modifier or modifier component determined for each primary bonus award and each secondary bonus award is the same. In this embodiment, the central server determines the modifier component for the bonus awards and sends the modifier component to each of the selected gaming machines.

Gaming Machine Determination of Value Components of the Primary Bonus Award and Secondary Bonus Award(s)

As discussed above, in one embodiment of the present invention, the number of active gaming machines in the system at the time of the occurrence of the bonus event determines the number of bonus awards provided in the gaming system. In one embodiment, a primary bonus award activating minimum level of gaming machines must be active for a bonus event to occur. If the minimum level of activated gaming machine is satisfied and the bonus event occurs, the central server will select one of the active gaming machines to provide the primary bonus award. If there is a primary and secondary bonus award activating minimum level of active gaming machines and such minimum level of active gaming machines is satisfied when the bonus event occurs, the central server will select the gaming machines to provide the primary bonus award and secondary bonus award(s). In one embodiment, as discussed above, the number of secondary awards will depend on the number of active gaming machines when the bonus event is triggered.

The determination of the value components of the primary and secondary bonus awards is determined based on the gaming machine system implementer's established probabilities for achieving each of the value components. The example payout tables in FIGS. 11 and 12 illustrate the probabilities for the determinations of the value components of the primary and secondary bonus awards for one example of the gaming system of the present invention. It should be appreciated that, in one embodiment, the value component may be determined through one or more bonus events. It should be further appreciated that other suitable payout tables may be employed in accordance with the present invention.

Example Primary and Secondary Game Payouts

FIG. 13 illustrates one example which implements the primary and secondary game payouts of FIGS. 11 and 12. In this example, certain numbers are rounded for simplicity. As illustrated in FIG. 13, sixty gaming machines are enrolled in the gaming system. For each bonus event, one additional secondary bonus award is provided for each six active gaming machines and therefore a total maximum number of ten secondary bonus awards can be provided to the players of the gaming machines.

The average expected value or value component of the primary bonus award is 29.2197 as illustrated in FIG. 11. More specifically, FIG. 11 illustrates the different payout values, the probability of obtaining each different payout value and the contribution to the average expected value for each payout value (which is the payout value multiplied by the probability of obtaining that payout value). The average expected value or value component for each secondary bonus award is 3.55172 as illustrated in FIG. 12. More specifically, FIG. 12 illustrates the different payout values, the probability of obtaining each different payout value, and the contribution to the average expected value for each payout value (which is the payout value multiplied by the probability of obtaining that payout value).

In this example, there is one primary bonus award and there are ten possible secondary bonus awards (where all sixty gaming machines are being played and are active when the bonus event occurs). Accordingly, the expected average total bonus value or value component paid out for the maximum number of active gaming machines is (29.2197 for one primary bonus award)+(3.55172×ten secondary awards) =64.7369.

In this example, the bonus event awards (i.e., the primary bonus award and the secondary bonus awards) accounts for 30% or 0.30 of the overall average return for the gaming machines in the system. The 30% is a bonus percentage desired by the game designer which represents the allotment of the total return or average expected payout for the gaming machines in the system which is accounted for as primary bonus awards and secondary bonus awards. This excludes awards or payouts for the primary game and any other secondary games. This percentage can be any suitable amount to fit with the gaming machines of the present invention.

Example of Funding of the Bonus Event and Determination of How Often Bonus Event Can Occur As described above, in one embodiment of the present invention, the accumulated wager pool must be sufficiently funded or funded to a designated level to make the first or initial random determination as to whether the bonus event should occur. In one embodiment, the designated level is determined based on the average total bonus pay out for the maximum amount of active gaming machines (which is 64.7369 in this example) divided by the dedicated bonus event percentage of the overall average player return (which is 0.30 in this example). Thus, (64.7369)/(0.30)=215.78966 is the minimum total number of monetary units which must actually be in the accumulated wager pool to allow the bonus event to occur in the example as illustrated in FIG. 13.

In this example, the target average pay of the primary bonus award is 300 monetary units. In other words, on average, this is the amount that the game implementer desires the player who receives the primary bonus award to obtain or receive. It should be appreciated that this amount can vary from this example and that game implementers desire different target amounts for different bonuses.

As 300 is the target average pay of the primary bonus award and 29.2197 is the average pay value or value component per primary bonus award in this example, then (300)/(29.2197) or 10.2670 is the average multiplier which must be employed on average to reach the targeted average primary bonus award of 300.

In this example, since 215.78966 is the total minimum number of monetary units which must be pooled (in the accumulated wager pool) to allow the determination of whether the bonus event will occur and 10.2670 is the average multiplier which must be employed to reach the target average pay of the primary bonus award, then (215.78966)×(10.2670) or 2215.5124 which is rounded to 2216 monetary units is the target average of the accumulated wager pool per bonus award triggered. It should also be appreciated that as described above, the amounts wagered by all of the enrolled gaming machines during the bonus event accumulation period are used as part of the accumulated wager pool in determining the modifier or multiplier even though certain of the enrolled gaming machines may not be active and thus may not be eligible to provide a bonus award.

In this example, the sample rate which is how often the central server will check to see if a bonus event will occur is every 50 monetary units. It should be appreciated that the sample rate could vary. It should also be appreciated that the sample rate could alternately be based on an amount of time. In this example, the probability of the bonus event occurring per sample is determined in the following manner. As the bonus pool must be greater than 215.78966 or 216 monetary units (rounded) to allow a bonus event determination to occur, the total number of monetary units which must be pooled on average to allow the bonus event to occur is the target average of the accumulated wager pool per bonus award triggered (2215.5124 rounded to 2216 in this example) less the minimum total number of monetary units which must actually be pooled to allow the bonus event determination (215.78966 rounded to 216 in this example). Thus, in this example, (2216-216) or 2000 is the average number of the accumulated wager pool which must be used. As 2000 is the average number of the accumulated wager pool which must be used, the probability is determined by dividing the desired sample rate by this average ((50)/(2000)=2.5%) to determine the probability of the bonus event occurring per sample. This probability is used to determine whether the bonus event occurs at each sampling after the minimum level of the accumulated wager pool is reached. It should be appreciated that any suitable method can be used to determine this probability.

Central Server Determination of Modifier for the Primary Bonus Award and the Secondary Bonus Award The central server determines the modifier component, such as the multiplier component, of the primary bonus award and the secondary bonus award for each bonus event based on the accumulated wager pool for that bonus event. The central server will send this modifier or multiplier component to each gaming machine selected to provide the primary bonus award or selected to provide a secondary bonus award. Each selected gaming machine will use the received modifier or multiplier component and respective value component (determined by that gaming machine) to determine or calculate the primary bonus award or the secondary bonus award, respectively.

In one such embodiment, the modifier or multiplier is determined based on a ratio of the expected award to be paid versus the amount in the accumulated wager pool. The continuing example demonstrates this ratio.

As indicated above and in FIGS. 11 and 12, after the bonus event is determined to occur or is triggered, the average expected value or value component of the primary bonus award is 29.2197 monetary units and the average expected value or value component for each secondary bonus award is 3.5517 monetary units. While each selected gaming machine will determine an actual amount for the value component of the award it will provide to the player, these averages are used by the central server to calculate the modifier or multiplier and the remainder.

An expected average bonus payout value is calculated by summing the average expected primary bonus value (29.2197) with the product of the average expected secondary bonus value times the number of secondary bonuses which will be awarded (i.e., 3.55172×(# active gaming machines)/6 (rounded up)). Thus, for (a) only 1 active gaming machine, the bonus payout value will be 29.2197;
(b) 2 to 6 active gaming machines, the bonus payout value will be 32.7714;
(c) 7 to 12 active gaming machines, the bonus payout value will be 36.3231;
(d) 13 to 18 active gaming machines, the bonus payout value will be 39.8749;
(e) 19 to 24 active gaming machines, the bonus payout value will be 43.4266;
(f) 25 to 30 active gaming machines, the bonus payout value will be 46.9783;
(g) 31 to 36 active gaming machines, the bonus payout value will be 50.5300;
(h) 37 to 42 active gaming machines, the bonus payout value will be 54.0817;
(i) 43 to 48 active gaming machines, the bonus payout value will be 57.6335;
(j) 49 to 54 active gaming machines, the bonus payout value will be 61.1852; and
(k) 55 to 60 active gaming machines, the bonus payout value will be 64.7369.

The central server determines the multiplier by: (1) dividing the accumulated wager pool by the average expected bonus payout values or value components for the primary and secondary awards of the bonus event; (2) taking into account that the bonus event is 30% of the overall average payout and (3) making the multiplier a whole number or integer. The central server sends each of the selected gaming machines the multiplier component.

Using case (c) above as an example, there is one primary bonus award and two secondary bonus awards (because twelve gaming machines are active). Accordingly, the expected average bonus payout value with one primary bonus award and two secondary bonus awards is 29.2197+(3.55172×2) or 36.3231. This, of course, is less than the maximum expected average bonus payout value of 64.7367 in this example which occurs with one primary bonus award and ten secondary bonus awards as described above.

In this example, as illustrated in FIG. 14, the bonus event occurs when the accumulated wager pool is at 2416 monetary units. In other words, the bonus event occurred, at the fourth determination after the total number of credits wagered per average bonus event of 2216 was reached. This is illustrated in FIG. 14 which has a sample rate or sampling every 50 monetary units after the first 216 monetary units are pooled. It should be appreciated that as explained above the sampling to determine if the bonus event will occur will not start until a minimum level of monetary units is accumulated in the accumulated wager pool. It should also be appreciated that the determination may not and most likely will not occur at each specific pooled amount of monetary or sampling level because different wager amounts are being made at different time intervals on the different gaming machines in the gaming system.

The central server takes into account that only part (i.e., 30% or 0.30) of the overall average payout or return to the player of the gaming machine is accounted for by the bonus event and the rest of the overall average payout or return to the player is accounted for by the primary game as well as other possible payouts or awards, such as a progressive jackpot award, or other secondary or bonus games. Therefore, on average, the coin-in must account for the payout of the bonus event. In this example, the accumulated wager pool is at 2416 monetary units when the central server determines that the bonus event is triggered and the bonus percentage is 0.3, thus the amount of the accumulated wager pool which can account for the bonus event is (2416)×(0.3) or 724.8 monetary units.

The central server determines the multiplier based on this allocated amount of the accumulated wager pool of 724.8 monetary units and the expected average bonus payout for the number of gaming machines selected for this bonus event which is 36.3231 monetary units (as indicated above). In this example, the allocated amount of the accumulated wager pool divided by the expected average bonus payout is (724.8)/(36.3231) or 19.9542. In this example, this amount is rounded down (i.e., truncated) to 19 to determine the multiplier. The multiplier is preferably rounded to avoid a non-integer multiplier which complicates the game for the player and can also lead to fractional credits. Thus, the amount of the allocated portion of the accumulated wager pool and the expected average bonus payout value (i.e., a theoretical amount) is used to determine the multiplier. The central server sends the multiplier of 19 to the gaming machine selected to provide the primary bonus award and each gaming machine selected to provide one of the secondary bonus awards.

The central server also uses the determined multiplier to determine the remainder of monetary units in the accumulated wager pool which are not accounted for in determining the multiplier and thus the awards in the bonus event. In this example, the expected average bonus payout value for the number of gaming machines selected times the multiplier is (36.3231)×(19) or 690.1389 which is the average expected payout for this example bonus event (including the primary bonus awards and secondary bonus awards). This amount is subtracted from the bonus portion of the accumulated wager pool to determine the bonus portion of the remainder which is (724.8)−(690.1389) or 34.6611 monetary units. This amount is then divided by the bonus percentage of the overall payout which is accounted for as bonus awards in the bonus event to determine the remainder of (34.6611)/(0.30) or 115.537 which is rounded to 116 monetary units in this example. This remainder represents the accumulated wager pool level which is necessary to subsequently provide the unallocated portion of the current accumulated wager pool while still maintaining the desired average return (30% here). In this example, a subsequent bonus event will include the 116 monetary units in the accumulated wager pool, 30% of which is 34.8, so the unused portion of a previous accumulated wager pool will be accounted for and dispersed in a subsequent bonus event, thereby preserving the desired average return. The 116 monetary units will remain in the accumulated wager pool for one or more subsequent bonus events. It is important to track the decimal values because this is based on the actual monetary units wagered by the players.

It should be appreciated that this remainder is an average expected remainder because the expected average bonus payout value is used to calculate this remainder. This is necessary to hold the percentage since it is theoretical and allows for volatility and the random feel of the bonus events instead of the pooled payouts.

It should be appreciated that, in one embodiment, the central server determines when to provide the bonus event to the gaming machines based in part on the actual accumulated wager pool. In this embodiment, the selected gaming machines determine the value components of the primary bonus awards and secondary bonus awards and the central server uses the expected average value component and the accumulated wager pool to determine the multiplier. The central server determines the remainder based on the accumulated wager pool and the modifier or multiplier. It should be appreciated that the remainder is based on the expected average value component and not the actual value components used to determine the bonus awards. Accordingly, the remainder added back to the accumulated bonus pool will not be an actual remainder. The accumulated wager pool after the first bonus event will be based on the remainder and the actual number of subsequently wagered monetary units. It should be further appreciated that, in one embodiment, after an initial bonus event, the accumulated wager pool for each subsequent bonus event is based in part on the actual number of monetary unit wagers placed and in part on the theoretical average expected remainder which is carried over from a previous bonus event.

In this example, because the number of active gaming machines is relatively low, the multiplier is relatively high. As the number of active gaming machines increases, the multiplier will decrease. This is in part because the equation accounts for the maximum number of active gaming machines and thus the maximum number of secondary awards.

In certain instances, a gaming machine will provide a negative return and in some instance, a gaming machine will overhold, but in the long run it should balance out. As described above, as the expected average bonus payout amount is employed instead of the actual payout amount, the provided bonus awards can have a great volatility over the short term while providing the player with the average expected values over the long term. That is, as the multiplier component is based, at least in part, on an expected average bonus payout value for the bonus event and not on the actual selected bonus payout values for the bonus event, the determined modifier or multiplier component may at times cause an over hold or an under hold of the actual accumulated wager pool.

An over hold of the actual accumulated wager pool occurs when the selected gaming machine(s) provide less primary and secondary bonus awards than the gaming system should theoretically provide as primary and secondary bonus awards based on the percentage of the overall paytable allocated to be paid out as primary and secondary bonus awards. For example, using the calculations described above and illustrated in FIG. 13, if sixty gaming machines are active and the central server determines that a bonus event will occur when the accumulated wager pool has reached 2250 monetary units, then the central server will determine a multiplier component of 10 (rounded from 10.4268) or (2250×0.3)/64.7369. If the gaming machines selected to provide the primary bonus award and the ten secondary bonus awards each select a payout of 1, then the primary bonus award will be 10 monetary units and each secondary bonus award will be 10 monetary units. In this example, the total bonus awards provided in the bonus event will be 110 monetary units which is significantly less than the 675 (i.e., 2250×0.3) monetary units which should theoretically be provided as the primary and secondary bonus awards. Accordingly, this example causes an over hold for the selected gaming machine of 565 monetary units. In other words, a low value component coupled with a low multiplier may cause an over hold of the actual accumulated wager pool to occur. These credits are not returned to the pool because the following scenario can occur.

On the other hand, an under hold of the actual accumulated wager pool occurs when the selected gaming machine(s) provide more primary and secondary bonus awards than the gaming system should theoretically provide as primary and secondary bonus awards based on the percentage of the overall average payout to be paid out as primary and secondary bonus awards. For example, using the calculations described above and illustrated in FIG. 13, if only one gaming machine is active and the central server determines that a bonus event will occur when the accumulated wager pool has reached 2600 monetary units, then the central server will determine a multiplier component of 26 (rounded from the 26.6943) or (2600×0.3)/29.2197. If the gaming machine selected to provide the primary bonus award selects a payout of 100, then the primary bonus award will be 2600 monetary units. In this example, the total bonus award provided in the bonus event of 2600 monetary units is significantly more than the 780 (i.e., 2600×0.3) monetary units which should theoretically be provided as the primary and secondary bonus awards. Accordingly, this example causes an under hold by the gaming machine of 1820 monetary units. In other words, a high value component coupled with a high multiplier may cause an under hold of the actual accumulated wager pool to occur. It should be appreciated that while these instances of over holding and under holding may occur and increase volatility of the payouts of the gaming system, over the long term play of the gaming system, the payouts will theoretically equate with the average expected payouts illustrated above and desired by the game implementer.

In one embodiment, any unaccepted awards become part of the remainder that is returned to or remains in the accumulated wager pool for a subsequent bonus event. For example, if a gaming machine is selected to provide a primary award, but the player of that gaming machine, not knowing that the gaming machine has been selected and they will achieve a bonus event on the next play, leaves the selected gaming machine prior to that play, the primary award is unaccepted and returned to the accumulated wager pool as part of the remainder. In another embodiment, no secondary awards may be provided to any players of gaming machines of the gaming system until the primary award is provided to a player of a gaming machine of the gaming system. For example, if one gaming machine is selected to provide a primary award, at least another gaming machine is selected to provide a secondary award and the player of the gaming machine selected to provide the primary award cashes out and leaves the selected gaming machine, then the primary award is unaccepted and thus no secondary awards may be provided to any players either. In another embodiment, if a primary award is unaccepted, then a gaming machine selected to provide a secondary award is selected to provide the unaccepted primary award. For example, if one gaming machine is selected to provide a primary award, one gaming machine is selected to provide a secondary award and the player of the gaming machine selected to provide the primary award cashes out and leaves the selected gaming machine, then the primary award is unaccepted and the player of the gaming machine selected to provide a secondary award is provided the unaccepted primary award. In such an embodiment, the secondary award may or may not also be provided to the player of the gaming machine selected to provide a secondary award.

FIGS. 15, 16*a*, 16*b*, 16*c* and 17 illustrate an example of the present invention wherein four players are playing four gaming machines enrolled in the gaming system. In this example, upon the first player(s) initiating game play on system gaming machine(s), a first bonus event accumulation period begins as indicated by block 302 in FIG. 15. In this example, as seen in FIG. 16*a*, Player A is playing at a $2 denomination gaming machine 14*a* at an average rate of one play of the primary game every twenty seconds and Player B is playing at a $1 denomination machine gaming machine 14*b* at an average rate of one play of the primary game every fifteen seconds. The amounts wagered at the enrolled gaming machines in the system are tracked by the central server and accumulated in an accumulated wager pool as indicated by block 304 of FIG. 15. It should be appreciated that even though Player A and Player B are playing different denomination gaming machines, the system equates and tracks each player's wagers in terms of monetary units. In this example, each penny or $0.01 wagered at a gaming machine in the system is equivalent to one monetary unit. Thus, in this example, the system equates and tracks one play of gaming machine 14*a* by Player A as two-hundred monetary units and one play of gaming machine 14*b* by Player B is equated to and tracked as one-hundred monetary units.

Figure 15:
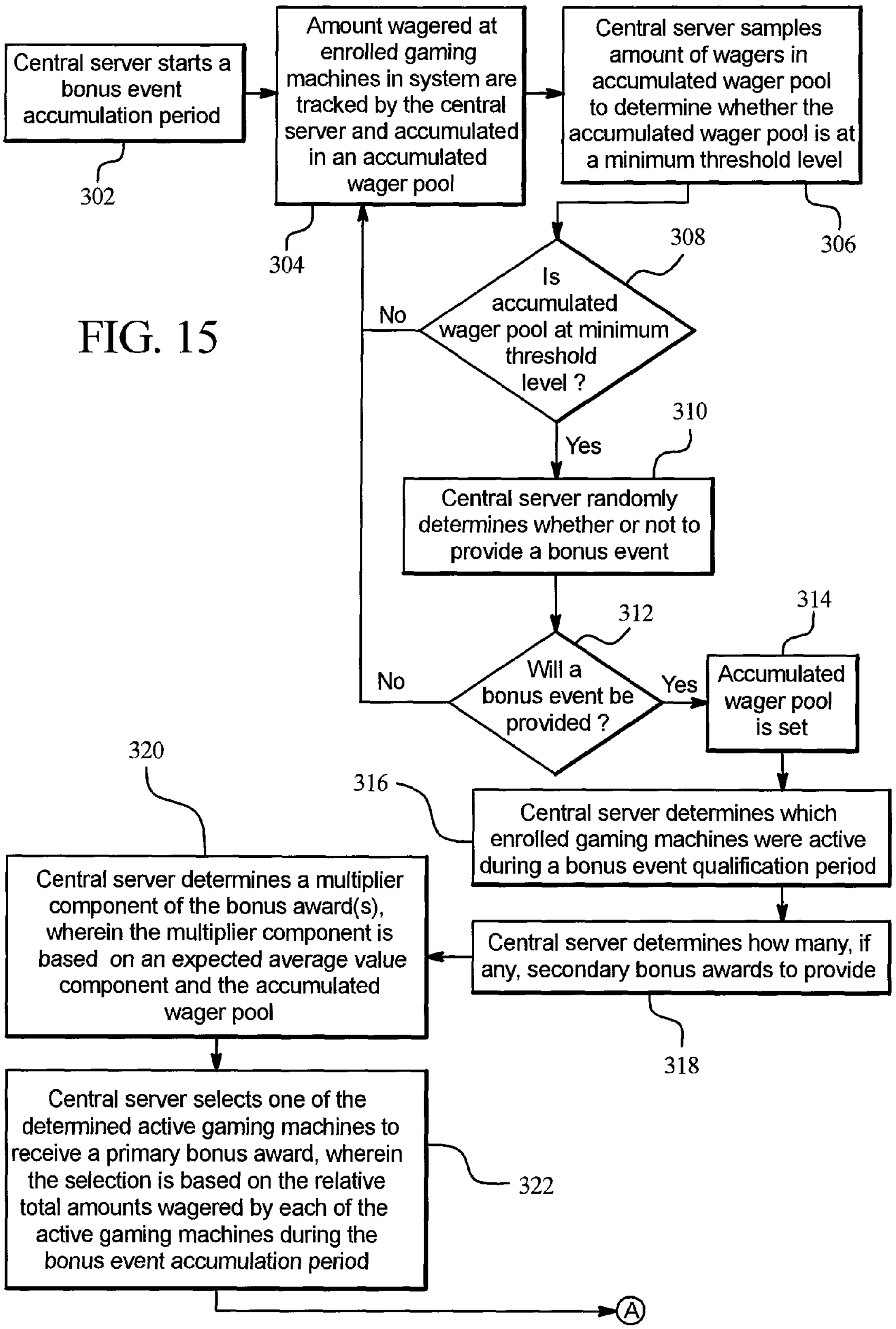
FIG. 15 is a flowchart of a one embodiment of the present invention illustrating the beginning of a bonus event accumulation period to the providing of one or more bonus awards.
Figure 17:
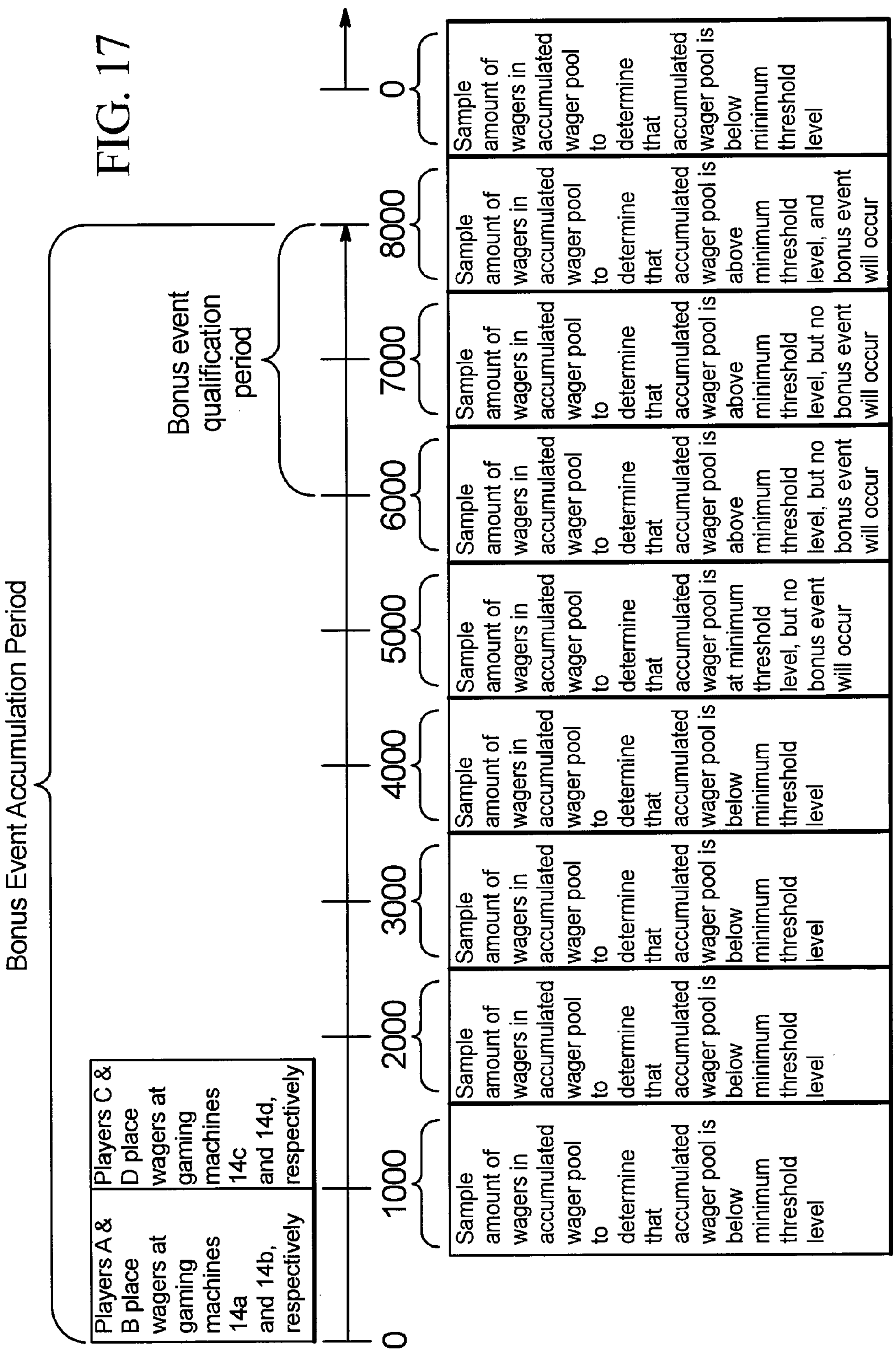
FIG. 17 is a timeline illustrating the example of FIGS. 16*a*, 16*b* and 16*c* of one embodiment of the present invention.

At regular intervals, the central server samples the amount of monetary units wagered in the accumulated wager pool to determine whether the accumulated wager pool is at or above a minimum threshold level as indicated by block 306 and diamond 308 of FIG. 15. In this example, the sampling rate is every one-thousand monetary units wagered and the minimum threshold level is five-thousand monetary units wagered. As illustrated in the timeline of FIG. 17, after Player A has wagered six-hundred monetary units and Player B has wagered four-hundred monetary units, a total of one-thousand monetary units has been wagered or placed into the accumulated wager pool. As the accumulated wager pool is not at or above the predefined minimum threshold level, the central server determines that a bonus event will not occur and the bonus event accumulation period continues as indicated in block 304 of FIG. 15.

As illustrated in FIGS. 16*a* and 17, when the current accumulated wager pool is at one-thousand wagered units, Player C begins playing at a $0.50 denomination gaming machine 14*c* at an average rate of one play of the primary game every ten seconds and Player D begins playing at a $0.10 denomination gaming machine 14*d* at an average rate of one play of the primary game every six seconds. As described above, even though the four gaming machines each enable play at different denominations, the central server equates and tracks each player's wagers in terms of wagered units or monetary units (i.e., wherein each $0.01 wagered equals one monetary unit) and thus one play of gaming machine 14*c* by Player C is tracked as fifty monetary units and one play of gaming machine 14*d* by Player D is tracked as ten monetary units.

In this example, after another thousand monetary units are wagered (i.e., the accumulated wager pool grows to two-thousand accumulated monetary units), the central server again samples the accumulated wager pool to determine if the accumulated wager pool is at or above the predefined threshold level of five-thousand monetary units. As the accumulated wager pool is not at or above the predefined threshold level, the central server determines that a bonus event will not occur and the bonus event accumulation period continues.

As seen in FIG. 17, this process of sampling the accumulated wager pool every thousand wagered monetary units continues as described above until the central server determines that the accumulated wager pool has reached at least the predefined threshold level of five-thousand wagered units. At this point, the central server randomly determines whether or not to provide a bonus event as indicated in block 310 and diamond 312 of FIG. 15. As described above, after the minimum level of the accumulated wager pool is reached, the central server utilizes a determined probability of the bonus event occurring per sample to determine whether or not to provide a bonus event. In this example, after five-thousand wagered units are accumulated in the accumulated wager pool (i.e., the predefined threshold level is reached), the central server determines that a bonus event will not occur based on the probability determination and the bonus event accumulation period continues as indicated in block 304 of FIG. 15.

After another one-thousand monetary units are wagered (i.e., the accumulated wager pool grows to six-thousand accumulated monetary units), the central server again samples the accumulated wager pool to determine if the accumulated wager pool is at or above the predefined threshold level of five-thousand units. As the accumulated wager pool is at six-thousand units which is above the predefined threshold level, the central server randomly determines whether or not to provide a bonus event based on the probability determination. In this example, the central sever determines not to provide a bonus event and thus the bonus event accumulation period continues with the amounts wagered at the four gaming machines funding the accumulated wager pool.

As illustrated in FIG. 17, after another one-thousand monetary units are wagered (i.e., the accumulated wager pool grows to seven-thousand accumulated monetary units), the central server again samples the accumulated wager pool to determine if the accumulated wager pool is at or above the predefined threshold level of five-thousand units. As the accumulated wager pool is at seven-thousand units which is above the predefined threshold level, the central server randomly determines whether or not to provide a bonus event based on the probability determination. In this example, the central sever determines not to provide a bonus event and the bonus event accumulation period continues.

After another one-thousand monetary units are wagered (i.e., the accumulated wager pool grows to eight-thousand accumulated monetary units), the central server again samples the accumulated wager pool to determine if the accumulated wager pool is at or above the predefined threshold level of five-thousand units. As the accumulated wager pool is at eight-thousand units which is above the predefined threshold level, the central server randomly determines whether or not to provide a bonus event. In this example, the central sever determines to provide a bonus event and thus the accumulated wager pool is set or closed as indicated by block 314 of FIG. 15. Once the accumulated wager pool is set or closed, any subsequent wagers by the enrolled gaming machines will be applied toward a subsequent accumulated wager pool and not the set or closed accumulated wager pool. As seen in FIG. 17, after the accumulated wager pool is set or closed, a subsequent accumulated wager pool begins or opens with an initial accumulated amount of zero wagers. The central sever will sample this accumulated wager pool at regular intervals to determine whether the accumulated wager pool is at or above a minimum threshold level as described above.

After the accumulated wager pool is set or closed, the central server determines which of the four enrolled gaming machines were active during a bonus event qualification period as indicated by block 316 of FIG. 15. In this example, the bonus event qualification period is the thirty seconds prior to the determination that a bonus event will occur. In this example, a gaming machine is considered in active status when, during the bonus event qualification period, a player has made at least four plays of the primary game regardless of the amount wagered or the player has wagered a minimum of two-hundred units in the primary game. In this embodiment, a gaming machine is being actively played if one of two separate criteria (i.e., the minimum amount wagered requirement or the minimum frequency of wagers placed requirement) are satisfied. However, it should be appreciated that, as described above, any number of different criteria alone or in combination may be employed in accordance with the present invention. For example, a gaming machine may be considered in active status when a player has played at least one primary game in the ten or fifteen seconds preceding the determination to provide a bonus event.

In this example, as illustrated in FIG. 16*a*, since one wager for two-hundred monetary units (i.e., one $2 wager) was placed at gaming machine 14*a* during the thirty seconds prior to the determination that a bonus event will occur, the central server determines that gaming machine 14*a* was in active status (i.e., satisfied the minimum amount wagered requirement) during the bonus event qualification period. Since two wagers for one-hundred monetary units each (i.e., two $1 wagers) were placed at gaming machine 14*b* during the thirty seconds prior to the determination that a bonus event will occur, the central server determines that gaming machine 14*b* was in active status (i.e., satisfied the minimum amount wagered requirement) during the bonus event qualification period. Since three wagers for fifty monetary units each (i.e., three $0.50 wagers) were placed at gaming machine 14*c* during the thirty seconds prior to the determination that a bonus event will occur, the central server determines that gaming machine 14*c* was not in active status (i.e., did not satisfy the minimum amount wagered requirement or the minimum frequency of wagers placed requirement) during the bonus event qualification period. Since five wagers for ten monetary units each (i.e., five $0.10 wagers) were placed at gaming machine 14*d* during the thirty seconds prior to the determination that a bonus event will occur, the central server determines that gaming machine 14*d* was in active status (i.e., satisfied the frequency of wagers placed requirement) during the bonus event qualification period.

After determining which of the enrolled gaming machines were in active status during the bonus event qualification period, the central server next determines how many, if any, secondary bonus awards will be provided for this bonus event as indicated by block 318 of FIG. 15. In this example, as described above, since there are between two and six active gaming machines, one secondary bonus award will be provided for this bonus event.

After determining how many bonus awards to provide for this bonus event, the central server determines a modifier or multiplier component for the bonus awards to be provided as indicated by block 320 of FIG. 15. As described above, the central server determines the multiplier component based on the expected average value component (which is itself based on the number of bonus awards to be provided) and the accumulated wager pool. In this example, the central server determined a multiplier component of 15×.

After determining a modifier or multiplier component, the central server selects one the determined active gaming machines to receive a primary bonus award as indicated by block 322 of FIG. 15. The central server's selection of one of the active gamine machines is based on the relative total amounts of monetary units wagered by each of the active gaming machines during the bonus event accumulation period. For example, as illustrated in FIG. 16*b*, as gaming machines 14*a*, 14*b*, and 14*d* are active, the player(s) on gaming machine 14*a* wagered three-thousand-six-hundred monetary units during the bonus event accumulation period, the player(s) on gaming machine 14*b* wagered two-thousand-four-hundred monetary units during the bonus event accumulation period and the player(s) on gaming machine 14*d* wagered five-hundred monetary units during the bonus event accumulation period, the applicable accumulation wager pool is six-thousand-five-hundred monetary units. It should be appreciated that, as described above, unless each enrolled gaming machine was active during the bonus event qualification period, the total amount wagered during the bonus event accumulation period will not correspond with the applicable amount wagered during the bonus event accumulation period (which only includes the amounts wagered at active gaming machines).

In this example, based on the relative total amounts of monetary units wagered by each of the active gaming machines during the bonus event accumulation period, the probabilities for being awarded the primary bonus award for gaming machine 14*a* is 55% (i.e., $^{3600}/_{6500}$), for gaming machine 14*b* is 37% (i.e., $^{2400}/_{6500}$) and for gaming machine 14*d* is 8% (i.e., $^{500}/_{6500}$). With these determined probabilities and one or more random number generators or random number generating algorithms, the central server will select one of the active gaming machines to provide the primary bonus award. In this example, based on these determined probabilities, the central server selected gaming machine 14*a* to provide the primary bonus award. It should be appreciated that in this example, as more monetary units were wagered at gaming machine 14*a* during the bonus event accumulation period, gaming machine 14*a* has the greatest odds or probability of being selected to provide the primary bonus award. That is, even though significantly more primary games were played at gaming machine 14*d* during the bonus event accumulation period, the central server accounts for the wager in monetary units of each play as well as the number of primary games played in determining the odds of which gaming machine will be selected to provide the primary bonus award.

If at least one secondary bonus award will not be provided to the player for this bonus event, the central server communicates the determined modifier or multiplier component to the selected gaming machine as indicated by diamond 324 and block 326 of FIG. 15. The gaming machine selected to provide the primary bonus award then determines a value component of the primary bonus award as indicated by block 328 of FIG. 15. As described above, each gaming machine determines each value component based on the probabilities associated with each of the possible value components. That is, each of the possible value components or payout values is associated with a probability and the gaming machine selects one of the possible value components or payout values based on these probabilities. As indicated by block 330 of FIG. 15, the gaming machine selected to receive the primary bonus award next determines the primary bonus award based on the determined modifier or multiplier component and the determined value component. The primary bonus award is then provided to the player of the selected gaming machine as indicated by block 332 of FIG. 15 and this bonus event is complete.

For illustration purposes, if at least one secondary bonus award will not be provided to the player for this bonus event (i.e., only one gaming machine is active), the central server would communicate the multiplier component of 15× to selected gaming machine 14*a*. Gaming machine 14*a* would then select a value component of ten and determine a primary bonus award of one-hundred-fifty based on multiplying the determined value component of ten by the determined multiplier of 15×. This determined primary bonus award of one-hundred-fifty would be provided to the player of gaming machine 14*a* and this bonus event would be complete.

On the other hand, if the central server previously determined that at least one secondary bonus award will be provided to the player for this bonus event, the central server selects one of the determined active gaming machines (not previously selected to receive the primary bonus award) for each secondary bonus award to be provided, as indicated by diamond 324 and block 334 of FIG. 15. In this example, the central server will automatically select the gaming machine with the highest applicable amount of monetary units wagered during the accumulation period which was not selected to receive the primary bonus award. As seen in FIGS. 16*b* and 16*c*, in this example, with a wager equated to two-thousand-four-hundred monetary units, gaming machine 14*b* wagered the highest applicable amount of monetary units during the accumulation period without being selected to provide the primary bonus award and thus gaming machine 14*b* is associated with a 100% probability of being selected for the secondary bonus award. Accordingly, based on associated probability, gaming machine 14*b* is selected to provide the one determined secondary bonus award.

The central server then communicates the determined multiplier component to the selected gaming machine as indicated by block 336 of FIG. 15. In this example, the central server would communicate the determined multiplier of 15× to each of the selected gaming machines 14*a* and 14*b*. It should be appreciated that if at least one secondary bonus award will be provided, the central server communicates the determined multiplier to each gaming machine selected to provide a secondary bonus award as well as the gaming machine selected to provide the primary bonus award.

Each of the gaming machines selected to provide a secondary bonus award individually determines a value component for the secondary bonus award they will provide as indicated by block 338 of FIG. 15. As described above, each gaming machine determines each value component based on the probabilities associated with each of the possible secondary bonus award value components. In this example, gaming machine 14*b* selects the value component of five based on the probabilities associated with each of the possible secondary bonus award value components.

As indicated by block 340 of FIG. 15, each gaming machine selected to provide a secondary bonus award next determines the secondary bonus award they will provide based on the determined modifier or multiplier component and the value component that the gaming device determined. In this example, for the one secondary bonus award provided, gaming machine 14*b* would determine a secondary bonus award of seventy-five based on multiplying the determined value component of five by the determined multiplier of 15×. Each gaming machine selected to provide a secondary bonus award then provides the player of that selected gaming machine the determined secondary bonus award as indicated by block 342 of FIG. 15.

It should be appreciated that as each gaming device selected to provide a secondary bonus award individually determines the value component which will be modified by the central server determined modifier, there may be significant differences in value between any two or more secondary bonus awards. For example, if a first gaming machine selects the secondary bonus award value component of one and a second gaming machine selects the secondary bonus award value component of ten, then using the central server determined multiplier component of 15×, the first gaming machine will be provided a secondary bonus award of fifteen while the second gaming machine will be provided a secondary bonus award of one-hundred-fifty.

Along with each secondary bonus award provided to the player, the gaming machine selected to provide the primary bonus award to a player also determines and provides a primary bonus award to a player as indicated by block 328 of FIG. 15. While the determination of a primary bonus award is illustrated as occurring after the determination of each of the secondary bonus awards, it should be appreciated that the determination of the primary bonus award may occur prior to, simultaneous with or after the determination of each secondary bonus award.

In the above embodiment, a single modifier or multiplier is determined and sent by the controller to each gaming machine which is selected to provide a bonus award (i.e., a primary bonus award or a secondary bonus award) to the player of that selected gaming machine. In the alternative embodiment where all of the active gaming machines are selected to provide a bonus award, the modifier or multiplier for each active gaming machine can equal the ratio or relative percentage of wager amounts for that gaming machine. The single modifier or multiplier can be divided into a plurality of individual gaming machine modifiers or multipliers. This division can be based on the relative percentages of the wagers of such gaming machines during the bonus event accumulation period. These are the same ratios used to determine which gaming machine will be selected to provide the primary bonus award as described above.

In one example of this embodiment, the multiplier is determined to be 20× and there are three active gaming machines in the system. The relative percentages of wagered amounts and the split of the multiplier component is illustrated below:

| Gaming Machine | Percentage of Wagers | Multiplier |
| --- | --- | --- |
| 14a | 50% | 10× |
| 14b | 30% | 6× |
| 14z | 20% | 4× |

In this embodiment, one table instead of two can be employed to determine the value components for the primary and secondary awards determined by each of the active gaming machines because the individual modifiers or multipliers account for the different award levels.

Cap for Modifier Component

In one embodiment, the gaming system includes a cap for the bonus modifier or multiplier. In the above example, the cap is 200. This prevents the gaming machines from overflowing the bonus displays or awarding a jackpot larger than desired. In the example, if the total wagered meter results in a bonus multiplier of 210, only the maximum multiplier of 200 will be sent to the gaming machine which wins the primary bonus award and the extra 10 times the bonus award value will be part of the remainder that is returned to the accumulated wager pool for a subsequent bonus event. In one embodiment, the controller can guarantee that a bonus event will occur after enough monetary units are accumulated in the accumulated wager pool such that the maximum multiplier will be determined by the controller.

Accumulated Wager Pool Resetting After Bonus Event

As mentioned above, in one embodiment, after each bonus event, the accumulated wager pool is reset to a remainder value based on any unaccounted for monetary units in determining the modifier component of the bonus award. In one embodiment, the enrolled gaming machines wager meters are also zeroed out regardless of whether such machines were active or not at the occurrence of the bonus event. In another embodiment, the wager meters are not zeroed out and/or respectively include a percentage of the previous wager meters.

It should also be appreciated that the present invention contemplates other methods for increasing the individual gaming machine meters or changing the percentage the gaming machine has in being selected to provide a bonus award. For instance, the gaming system can allow the players to place one or more side wagers or additional wagers to have a greater relative percentage of obtaining the primary bonus award or the secondary bonus award.

Wager Levels

In one alternative embodiment of the present invention, a minimum wager level is required for a gaming machine to qualify to be selected to obtain the primary award or be considered in the determination of which gaming machine is active and thus may be selected to obtain the primary award. In one embodiment, this minimum wager level is the maximum wager level for the primary game in the gaming machine. This requirement is in addition to the requirement that the gaming machine be active to qualify for the determination of which gaming machine will be selected to obtain the primary award.

In another alternative embodiment of the present invention, a minimum wager level is required for a gaming machine to qualify to be selected to obtain one of the secondary bonus awards or be considered in the determination of which gaming machines are active and thus may be selected to obtain the secondary bonus awards. In one embodiment, this minimum wager level is the maximum wager level for the primary game in the gaming machine. This requirement is in addition to the requirement that the gaming machine be active to qualify for the determination of which gaming machine will be selected to obtain the primary award.

Another method for determining if the gaming machine is active is whether or not the player has wagered a minimum level of monetary units since the occurrence of the last bonus event.

In another embodiment, one or more side bets or additional wagers are utilized in determining if a player is provided at least one bonus award. In one such embodiment, the gaming system enables a player to place a side bet to be active for one or more bonus events, regardless of any other amounts wagered. In this embodiment, placing a specific side bet, regardless of other amounts wagered, provides that the player is eligible to potentially win one or more bonus awards. In another embodiment, for each play of each game at a linked gaming device, the gaming system requires that a fixed amount, funded by a side wager, is allocated into the accumulated wager pool. For example, the gaming system requires that one credit is side bet for each payline wagered on, wherein these side bets fund, at least in part, the accumulated wager pool. In one embodiment, the amount of any side bet is included in the accumulated wager pool. In another embodiment, the amount of any side bet is not included in the accumulated wager pool but is allocated to a separate, side bet pool.

In another embodiment, placing a specific side bet, in addition to another wagering criteria, provides that the player is active for one or more bonus events (i.e., eligible to potentially win one or more bonus awards). In different embodiments, the additional wagering criteria required (in addition to the side bet amount) is a fixed amount, a dynamic amount, predetermined, randomly determined, determined based on a player's status (such as determined through a player tracking system), determined based on a generated symbol or symbol combination, determined based on a random determination by the central controller, determined based on a random determination by a gaming device, determined based on one or more side wagers placed, determined based on the player's primary game wager, determined based on time (such as the time of day), determined based on the amount of coin-in accumulated in one or more pools, or determined based on any other suitable method or criteria.

In another embodiment, the gaming system enables a player to place a side bet greater than or equal to a designated amount to be active for one or more bonus events. In this embodiment, the player's probability of being selected to win at least one bonus award is weighted based on the relationship of the player's placed side bet to the designated amount. In different embodiments, the designated amount is a fixed amount, a dynamic amount, predetermined, randomly determined, determined based on a player's status (such as determined through a player tracking system), determined based on a generated symbol or symbol combination, determined based on a random determination by the central controller, determined based on a random determination by a gaming device, determined based on one or more side wagers placed, determined based on the player's primary game wager, determined based on time (such as the time of day), determined based on the amount of coin-in accumulated in one or more pools, or determined based on any other suitable method or criteria.

In another embodiment, a quantity or number of side bets placed in a designated period of time, such as during a bonus event accumulation period or bonus event qualification period, determines a player's probability of being selected to win at least one bonus award. In different embodiments, the quantity of side bets placed in the designated period of time is predetermined, randomly determined, determined based on a player's status (such as determined through a player tracking system), determined based on a generated symbol or symbol combination, determined based on a random determination by the central controller, determined based on a random determination by a gaming device, determined based on one or more side wagers placed, determined based on the player's primary game wager, determined based on time (such as the time of day), determined based on the amount of coin-in accumulated in one or more pools, or determined based on any other suitable method or criteria.

Awards Can be Provided in Conjunction with a Primary or Secondary Game

In the above described embodiments of the present invention, the gaming machines do not provide any apparent reasons to the players for obtaining the primary or secondary bonus awards. In alternative embodiments, the bonus awards can be triggered by an event in or based specifically on a play of a primary game or a play of a secondary game of the gaming machines selected to provide the primary or secondary bonus award.

In one alternative embodiment, the bonus awards are accounted for as part of the average payouts instead of being accounted for based on the accumulated wager pool. In this embodiment, the accumulated wager pool is still employed to determine when the bonus event is triggered and which gaming machines will be selected to provide the bonus award(s). However, the accumulated wager pool is not employed to determine the amount of the bonus award and particularly not the amount of a bonus modifier or multiplier component. In this embodiment, there is no need for a minimum threshold level for determining if the bonus event determination can be made. In other words, the central server can immediately start checking at the interval of the sampling rate whether to provide a bonus event. In this alternative embodiment, the gaming system does not have to employ a minimum threshold to trigger the bonus event because the bonus award is accounted for directly in the paytables of the gaming machines of the gaming system instead of by the accumulated wager pool. It should also be appreciated that the bonus awards could be fixed or predetermined amounts.

In another embodiment, a bonus award may be based, at least in part, on the occurrence of one or more events at one gaming machine and also, at least in part, on a determination by a central controller based on a plurality of gaming machines in a gaming system. In certain such embodiments, upon a secondary or bonus game triggering event, a secondary or bonus game is triggered. In this embodiment, the secondary or bonus game proceeds and a secondary game award or bonus game award is determined based on the play of the secondary or bonus game. Additionally, the play of the secondary or bonus game determines which of any of a plurality of bonus awards may be provided to the player, wherein, as described above, the plurality of bonus awards are determined, at least in part, by the amounts wagered at a plurality of gaming machines in the gaming system. Accordingly, the total award provided to the player is based on: (i) any determined secondary game award or bonus game award determined during the play of the secondary or bonus game; and (ii) one of a plurality of bonus awards which is selected based on the play of the secondary or bonus game, wherein the amounts of the plurality of bonus awards are determined, at least in part, by a central controller.

For example, if the secondary or bonus game is a free game or free activation game, the player may be provided a designated number of free games, such as free spins. During each free game, the gaming device determines any free game awards associated with any generated winning symbol combinations and the gaming device may or may not accumulate any designated symbols. After each of the designated number of free games are provided to the player, the gaming machine determines, based on the accumulated number of designated symbols, which of any of a plurality of bonus awards, such as which of any of a plurality of progressive awards, to provide to the player. That is, designated symbols (or points associated with designated symbols) accumulate during the free games and a progressive award level is determined based on the number of accumulated designated symbols (or accumulated points). The determined bonus award and any determined free game awards are combined to be provided to the player as one overall award. It should be appreciated that as the plurality of bonus awards are determined by the central controller, which of those bonus awards the player may be provided is determined, at least in part, based on one or more events at one of the gaming machines in the gaming system and any determined free game awards are determined based on one or more events at one of the gaming machines in the gaming system, in this embodiment, the overall award is determined, at least partially based on a determination at a central controller (i.e., the progressive award) and at least partially based on a determination during a free game sequence at a gaming machine (i.e., the free game sequence award).

In another embodiment wherein the symbols generated by the gaming device function in determining both the free game awards and which of a plurality of progressive awards to provide to the player, one, more or each of the reels include locking symbols. In this embodiment, when a locking symbol is generated on a reel, the reel which generated the locking symbols is locked for the remainder of the free game. When each of the provided free games have been played, in addition to any determined free game awards, one of a plurality of bonus awards (i.e., one of a plurality of progressive awards) is provided to the player based on the number of locked reels. In another embodiment with locking symbols, each of the reels is associated with a different bonus award/progressive award. In this embodiment, when a locking symbol is generated on a reel, in addition to any determined free game awards, the bonus award/progressive award associated with the reel which generated the locking symbol is provided to the player. It should be appreciated that any suitable manner of determining an award may be implemented, wherein part of the award is determined by a central controller and part of the award is determined by an individual gaming device.

Progressive Award Embodiment

In one embodiment, the bonus event includes a progressive award. In one embodiment, the bonus awards include a plurality of progressive awards. The progressive awards are associated with the system gaming machines which each contribute portions of the progressive awards. The multiple gaming machines may be in the same bank of machines, in the same casino or gaming establishment such as through LAN or in two or more different casinos or gaming establishments such as through a WAN. It should thus be appreciated that in one or more embodiments, the controller may also function as a progressive controller.

In one embodiment, the progressive awards start at different levels such as $10, $100, $1000 and $10,000. This is directly funded in a conventional manner. The progressive awards accumulate based on a small percentage (such as 0.1%) of coin-in or wagered amounts in a conventional manner. In one embodiment, the percentage that goes to each progressive award is equal (such as 0.1% to each of four progressive awards). In other embodiments, two or more of the progressive awards may be funded by different percentages.

In one embodiment, when the bonus event occurs, the central server determines one of the active gaming machines to provide one of the progressive awards in the same manner as described above. The central server determines which active gaming machine to give the progressive award to based on the weighted average of the wagers placed for the active gaming machines as in the above embodiment. Alternatively, the gaming system could employ a suitable alternative method for selecting which gaming machine will provide the progressive award. In one embodiment, the gaming system includes a symbol driven progressive jackpot award for the gaming machines. In another embodiment, one of the progressive awards is provided to one of the gaming machines in the system as part of a bonus game triggered in a subsequent play of the primary game. In other words, after the central server determines that a bonus event will occur, the bonus event is provided to the selected active gaming machine as a bonus event or as part of a bonus event triggered from a subsequently played primary game.

Figure 18:
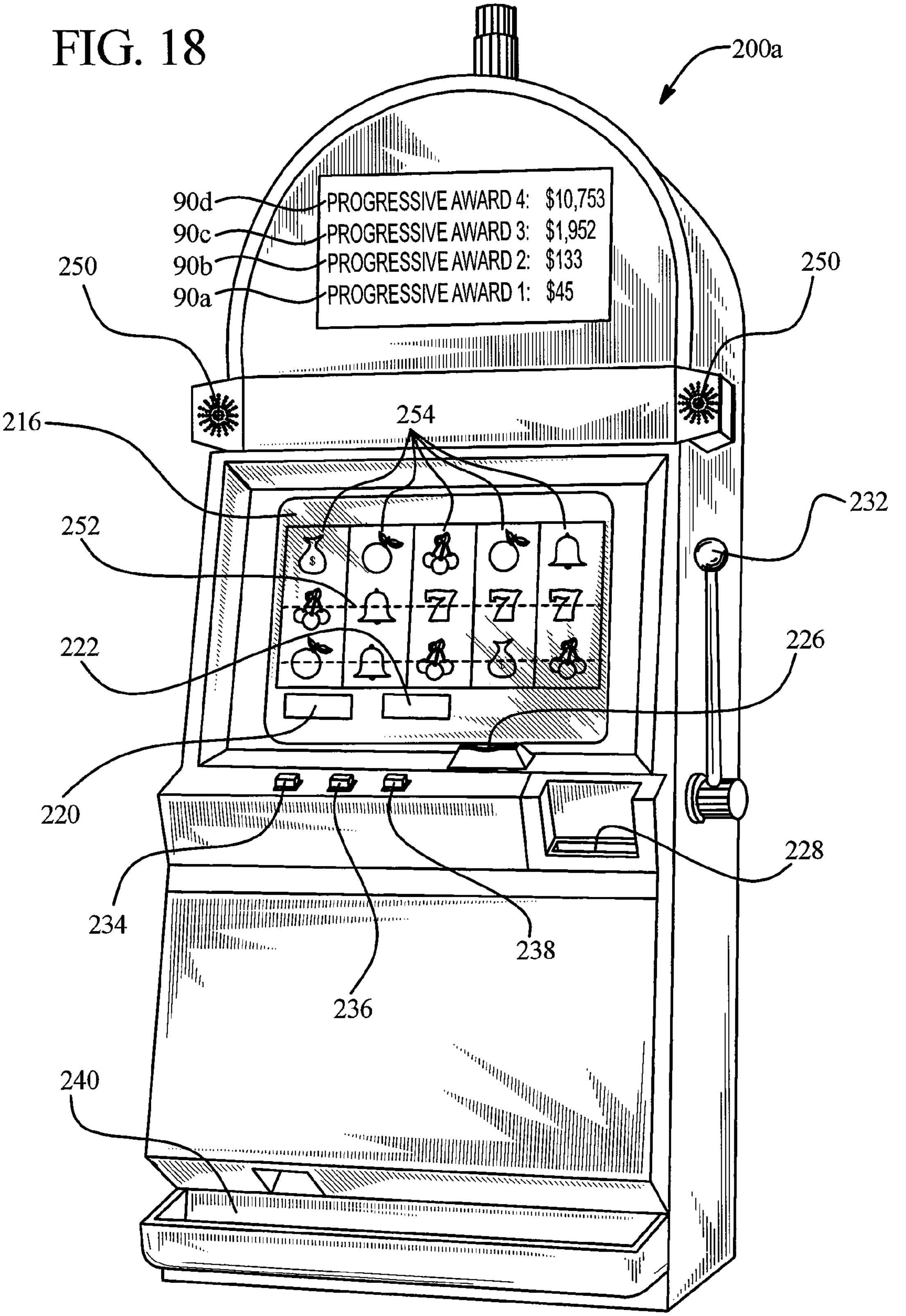
FIG. 18 is a perspective view of a gaming machine having a display which displays a plurality of progressive awards of one embodiment of the present invention.

As generally illustrated in FIG. 18, in one embodiment of the present invention which includes progressive awards, the bonus outcome or how well a player does in the bonus game will determine which progressive award is provided to the player from the plurality of progressive awards 90*a*, 90*b*, 90*c* and 90*d*. In one embodiment, if the bonus outcome is at a first level, the first progressive award 90*a* is provided to the player, if the bonus outcome is at a second level, the second progressive award 90*b* is provided to the player, if the bonus outcome is at a third level, the third progressive award 90*c* is provided to the player and if the bonus outcome is at a fourth level, the fourth progressive award 90*d* is provided to the player. In one embodiment, each level from level 1 to level 4 is harder for the player to obtain or is less likely to occur. The progressive award at each respective level is larger or at least initially funded in at a greater denomination. It should be appreciated that any suitable bonus game including free games, such as free spins, may be implemented to determine which level and accordingly, which progressive award is provided to the player.

In one embodiment, the central server continues to increase the progressive levels until the progressive award is actually won by a player. It should be appreciated that in one embodiment, the progressive meters continue to increment because the central server does not determine which award to provide to the selected gaming machine but as described above, which progressive award is provided to the selected gaming machine is determined based on the play of a subsequent bonus game. In this embodiment, because the progressive awards continue to increase until they are actually won by the player, a player may wait to allow the progressive awards to increase after the player triggers the bonus game. To encourage a player to finish or complete the bonus game and obtain one of the progressive awards, a suitable encouragement mechanism may be employed in accordance with the present invention. One way to encourage the player to play the bonus game quickly after it is triggered (and obtain one of the progressive awards) is to provide that another gaming machine in the system can be awarded another or subsequent bonus event by the central server and win one of the progressive awards. Therefore, the second player can win one of the higher progressive awards. After the second player wins one of the progressive awards, that progressive award would be reset to the minimum amount for that progressive award level. Therefore, the first player would have a lower average expected award because one of the progressive awards has been reset to the starting value for that level.

For example, if based on the probability of being selected for a bonus award as described above in relation to FIGS. 16*a* and 16*b*, gaming machine 14*b* is selected to obtain one of the progressive awards, then a suitable bonus event will be triggered during a subsequently played primary game at gaming machine 14*b*. After the triggering of the bonus event, gaming machine 14*b* enables the player to play a bonus or secondary game wherein one of a plurality of different outcomes will be provided to the player in the secondary game. The secondary game includes a plurality of different outcomes wherein each different outcome is associated with a probability of being provided to the player. For example, secondary game outcome A is associated with a 40% probability of being provided to the player, secondary game outcome B is associated with a 30% probability of being provided to the player, secondary game outcome C is associated with a 20% probability of being provided to the player and secondary game outcome D is associated with a 10% probability of being provided to the player. In the secondary game, each different outcome corresponds or is associated with one of a plurality of progressive awards. For example, secondary game outcome A is associated with progressive award 1, secondary game outcome B is associated with progressive award 2, secondary game outcome C is associated with progressive award 3 and secondary game outcome D is associated with progressive award 4. As each progressive award corresponds with a secondary game outcome which is associated with a probability, each progressive award is associated with a probability of being provided to the player. It should be appreciated that in this example, the secondary game outcome with the highest probability of being selected is associated with the lowest progressive award, while the secondary game outcome with the lowest probability of being selected is associated with the highest progressive award.

In operation, the player plays the provided bonus or secondary game and based on the associated probabilities, one of the plurality of outcomes is provided to the player. The progressive award corresponding with the provided outcome is provided to the player and the secondary game ends. In this example, the player of gaming machine 14*b* obtained secondary game outcome B in the secondary game and thus the player was provided progressive award 2 which, as illustrated in FIG. 18, was at an amount of $133. It should be appreciated that after the progressive award is provided to the player, the central server resets the provided progressive award to a determined initially funded amount.

In one embodiment, the gaming system must payout at least the base or reset value of the progressive award when a bonus event is hit because at least this base progressive value is built into the paytable of the gaming system. A potential problem arises if a gaming machine is selected to provide the bonus award and the player of that gaming machine does not know that the gaming machine has been selected. For instance, the player may cash out because the player does not know the player will achieve a bonus event on the next play and thus may not play the next primary game where the player would trigger a bonus game in which the bonus amount would be determined. In such a case, the central server picks another gaming machine to provide the bonus event. This can be done randomly or in any other suitable manner. In one embodiment, the player with the highest accumulated number of monetary units during the bonus event accumulation period can receive the bonus event. In another embodiment, this determination can be suitably weighted. In an alternative embodiment, the first player to play one of the gaming machines in the system is awarded the bonus event. In one embodiment, the central server informs the player of the selected gaming device that the player will receive one of the progressive awards.

For example, if based on the example described above, the gaming system determines that gaming machine 14*b* will be provided one of the plurality of progressive awards during a subsequent play of the primary game. The player of gaming machine 14*b* has however cashed out of gaming machine 14*b* prior to any subsequent play of the primary game (with no other player initiating game play at gaming machine 14*b*). In this case, as the gaming system must payout at least one of the plurality of progressive awards (as required by the paytable of the gaming system), the gaming system must select another one of the gaming machines in the gaming system to provide one of the plurality of progressive awards. In this example, based on the probability of being selected for a bonus award as described above in FIGS. 16*a* and 16*b*, the central server selects gaming device 14*a* to be provided one of the plurality of progressive awards. Accordingly, on a subsequent play of a primary game at gaming machine 14*a*, the central server causes a secondary game triggering event to occur. The secondary game is played and based on the secondary game outcome obtained in the secondary game, one of the plurality of progressive awards is provided to the player as described above.

In one embodiment, a bonus event may be pending if no gaming machines in the system are active or being played. Thus, a new player of one of the gaming machines in the system can achieve the pending bonus award on that player's first play of the primary game on one of the gaming machines in the system.

In one alternative embodiment, the gaming machines require an additional wager to fund the bonus awards or progressives awards. For example, the accumulated wager pool is funded, at least partially, via a side-bet or side-wager which the player may make (and which is tracked, in one embodiment, via a side-bet meter). In one embodiment, the accumulated wager pool is funded with only side-bets or side-wagers placed. In another embodiment, the accumulated wager pool is funded based on players wagers as described above as well as any side-bets or side-wagers placed. In another embodiment, a gaming machine can only be active if such additional wager is made by the player. In this embodiment, a side-bet or side-wager must be placed (and tracked via a side-bet meter) at a gaming machine of the gaming system for that gaming machine to be classified as in the active state.

It should be appreciated that this embodiment eliminates the need for the modifier or multiplier component because fixed starting values for the progressive award are built into the paytables and the minimum amounts are guaranteed to be paid out. Therefore, monetary units do not have to be rolled back into the accumulated wager pool to increase a subsequent modifier or multiplier and no remainder needs to be calculated and added to the accumulated wager pool.

It should also be appreciated that this alternative embodiment does not need to include any secondary bonus awards. However, one or more secondary bonus awards may be employed in this embodiment in accordance with the present invention.

It should further be appreciated that the gaming system of the present invention could determine to provide one or more of the progressive bonus awards simultaneously to multiple different gaming machines in the system. This could create a competitive gaming environment where players are competing to obtain the different progressive bonus awards.

In a further embodiment, one or more additional progressive awards may be provided by the system based on certain inputs by the players or other factors. In one such embodiment, if the player which receives the bonus event has made a designated minimum wager amount, such as the maximum wager, the gaming system can provide the player a chance to receive a further progressive award, such as a fifth progressive award in the above example. This could be provided automatically or upon the occurrence of a designated event or condition. This allows for even higher awards, such as higher progressive awards of over $1,000,000.

In another embodiment including one or more additional progressive awards and as described above, if a player's wager at a specific gaming machine increments an accumulated value progressive award to a determined progressive award hit value, the central controller determines that a group event will occur and the specific gaming machine is designated as the first participant in the group event. In one such embodiment, the gaming machines of the gaming system are operable to provide one or more accumulated value progressive awards or $N^{th}$ coin progressive awards to one or more players. Such accumulated value progressive awards are driven by an amount of wagers placed or a suitable coin-in amount. In one such embodiment, each accumulated value progressive award is associated with a range of values, wherein each progressive award will be provided to a player of a gaming device in the gaming system when the progressive award increments to a progressive award hit value within the range of values associated with that progressive award. That is, when an accumulated value progressive award increases to a determined progressive award hit value, a triggering event will occur and the accumulated value progressive award will be provided to one or more players. In different embodiments, the progressive award hit value at which an accumulated value progressive award is provided to one of the players is predetermined, randomly determined, determined based on the wagers placed in the gaming system, determined based on the status of one or more players (such as determined through a player tracking system), determined based on time, or determined based on any other suitable method. In this embodiment, after the accumulated value progressive award is provided to a player, the accumulated value progressive award is reset to a default value and starts incrementing from the default progressive award level.

In operation of one such embodiment, the central server which hosts one of these accumulated value progressive awards: (1) determines a minimum amount and a maximum amount for the progressive award or prize pool, (2) provides that the progressive award or prize pool starts at the minimum, (3) determines an accumulated value progressive award hit value between the minimum amount and the maximum amount, (4) increments the progressive award or prize pool with a configured percent of coin-in, and (5) provides the progressive award or prize pool when the progressive award or prize pool equals the determined accumulated value progressive award hit value. In this embodiment, the accumulated value progressive award hit value is determined at random to maintain fairness for the players at the gaming devices in the gaming system, wherein the players are not aware of any determined accumulated value progressive award hit value.

In different embodiments, the range of values associated with an accumulated value progressive award is predetermined, randomly determined, determined based on the wagers placed in the gaming system, determined based on the status of one or more players (such as determined through a player tracking system), determined based on time, or determined based on any other suitable method. In one embodiment, a plurality of accumulated value progressive awards are associated with different value ranges. In another embodiment, each of a plurality of accumulated value progressive awards are associated with a different value range. In another embodiment, a plurality of accumulated value progressive awards are associated with the same value range. In another embodiment, the value range associated with an accumulated value progressive award a player plays for is based on a player's status (via a player tracking system). For example, a bronze level player may play for an accumulated value progressive award associated with a value range of $10 to $100, a silver player may play for an accumulated value progressive award associated with a value range of $200 to $500 and a gold player may play for an accumulated value progressive award associated with a value range of $1000 to $5000.

Additional Progressive Jackpot Award

The central server tracks the progressive increment and sends the value to a gaming machine when the central server determines that a progressive award has been won on a gaming machine. In another alternative embodiment, an additional progressive award such as a jackpot award (e.g., progressive award starting at $1,000,000 or more) may be employed in the gaming system of the present invention. In one such embodiment, this level is only available if a designated wager level was made, such as the maximum wager. In one embodiment, this additional progressive award is employed as a fifth progressive award level in the multiple progressive award level described above. It can be won through the random bonus or other suitable methods.

Information Provided to Player

As indicated above, the bonus awards can be completely mystery bonus awards provided to the players of the gaming machines with or without explanation or information provided to the player, or alternatively can be displayed to the player, such as the progressive awards in FIG. 18. In one embodiment, such as the embodiment with the progressive awards, suitable information about the bonus awards can be provided to the players through one or more displays on the gaming machines or additional information displays positioned near the gaming machines, such as above a bank of system gaming machines.

This information can be used to entertain the player or inform the player that a bonus event has occurred or will occur. Examples of such information are:

(1) that a bonus event has occurred;

(2) that a bonus event will shortly occur (i.e., foreshadowing the bonus event);

(3) that one or more bonus awards have been provided to one or more players of the system gaming machines;

(4) that one or more bonus awards will be shortly provided to one or more players of the system gaming machines;

(5) which gaming machines have won the bonus awards such as the primary award, secondary awards or progressive awards;

(6) the amount of the bonus awards won;

(7) the amount of the bonus awards that can be won such as the progressive awards; and (8) the level that an active bonus is at.

It should be appreciated that such information can be provided to the players through any suitable audio, audio-visual or visual devices.

Multiple Bonus Award Pools with Thresholds

In an alternative embodiment, rather than utilizing a multiplier component and a value component to determine a primary bonus award, the gaming system utilizes a plurality of different predefined bonus award pools to determine a primary bonus award. Each bonus award pool includes a plurality of different bonus awards which are each associated with a probability of being selected. In this embodiment, each bonus award pool is associated with a different threshold or range of wagers accumulated in the accumulated wager pool. In one embodiment, the greater the accumulated amount in the accumulated wager pool, the greater the average expected primary bonus award of the bonus pool utilized to determine the primary bonus award. The following is an example of a pool structure in accordance with one such embodiment:

| Accumulated Wager Pool | Bonus Award Pool Used |
|---|---|
| 0-300 | A |
| 301-600 | B |
| 601-900 | C |
| 1200+ | D |

Pool A Average Expected Primary Bonus Award: 100

| Prize | Probability | Contribution |
|---|---|---|
| 50 | 0.33333 | 16.666667 |
| 100 | 0.33333 | 33.333333 |
| 150 | 0.33333 | 50 |

Pool B Average Expected Primary Bonus Award: 200

| Prize | Probability | Contribution |
|---|---|---|
| 50 | 0.33333 | 16.666667 |
| 200 | 0.33333 | 66.666667 |
| 350 | 0.33333 | 116.66667 |

Pool C Average Expected Primary Bonus Award: 300

| Prize | Probability | Contribution |
|---|---|---|
| 100 | 0.33333 | 33.333333 |
| 300 | 0.33333 | 100 |
| 500 | 0.33333 | 166.66667 |

| Pool D Average Expected Primary Bonus Award: 400 | | |
|---|---|---|
| Prize | Probability | Contribution |
| 200 | 0.33333 | 66.666667 |
| 400 | 0.33333 | 133.33333 |
| 600 | 0.33333 | 200 |

In operation of this embodiment, when a bonus event is determined to occur, the central server selects one of the bonus award pools. The selected bonus award pool is based on the amount of accumulated wagers in the accumulated wager pool. For example, as illustrated above, if the accumulated wager pool is at 630, the central server selects Pool C.

In one embodiment, the central server communicates data regarding the determined bonus award pool to a selected gaming device. In this embodiment, the selected gaming device then selects one of the primary bonus awards based on the probabilities associated with each primary bonus award in the communicated bonus award pool and provides the selected primary bonus award to the player. For example, the central server communicates data regarding Pool C and the selected gaming device selects, based on the probabilities of the primary bonus awards in Pool C, a primary bonus award of 500 to provide to the player of the selected gaming device. In another embodiment, the central server selects one of the primary bonus awards from the determined bonus award pool and communicates the selected primary bonus award to the selected gaming device to provide to the player of the selected gaming device. In these embodiment, while the primary bonus award is based on awards selected from predefined bonus award pools, the determination of which predefined bonus award pool to utilize is based on the accumulated wager pool and thus the primary bonus award is determined, at least in part, on the wagers accumulated in the accumulated wager pool.

Group Gaming

In another embodiment, the gaming system disclosed herein is operable to provide at least one bonus award to at least one player in a group gaming or multi-player environment. In one embodiment, the gaming system enables a plurality of players to play one or more linked games at one or more multi-player gaming stations (such as a gaming table), wherein one or more players are provided at least one bonus award as described above. In one such embodiment, the gaming system enables a plurality of players to play one or more games at one or more competitive tables games, wherein one or more players are provided at least one bonus award. It should be appreciated that any suitable group gaming or multi-player game may be implemented in accordance with the gaming system disclosed herein.

Figure 21A:
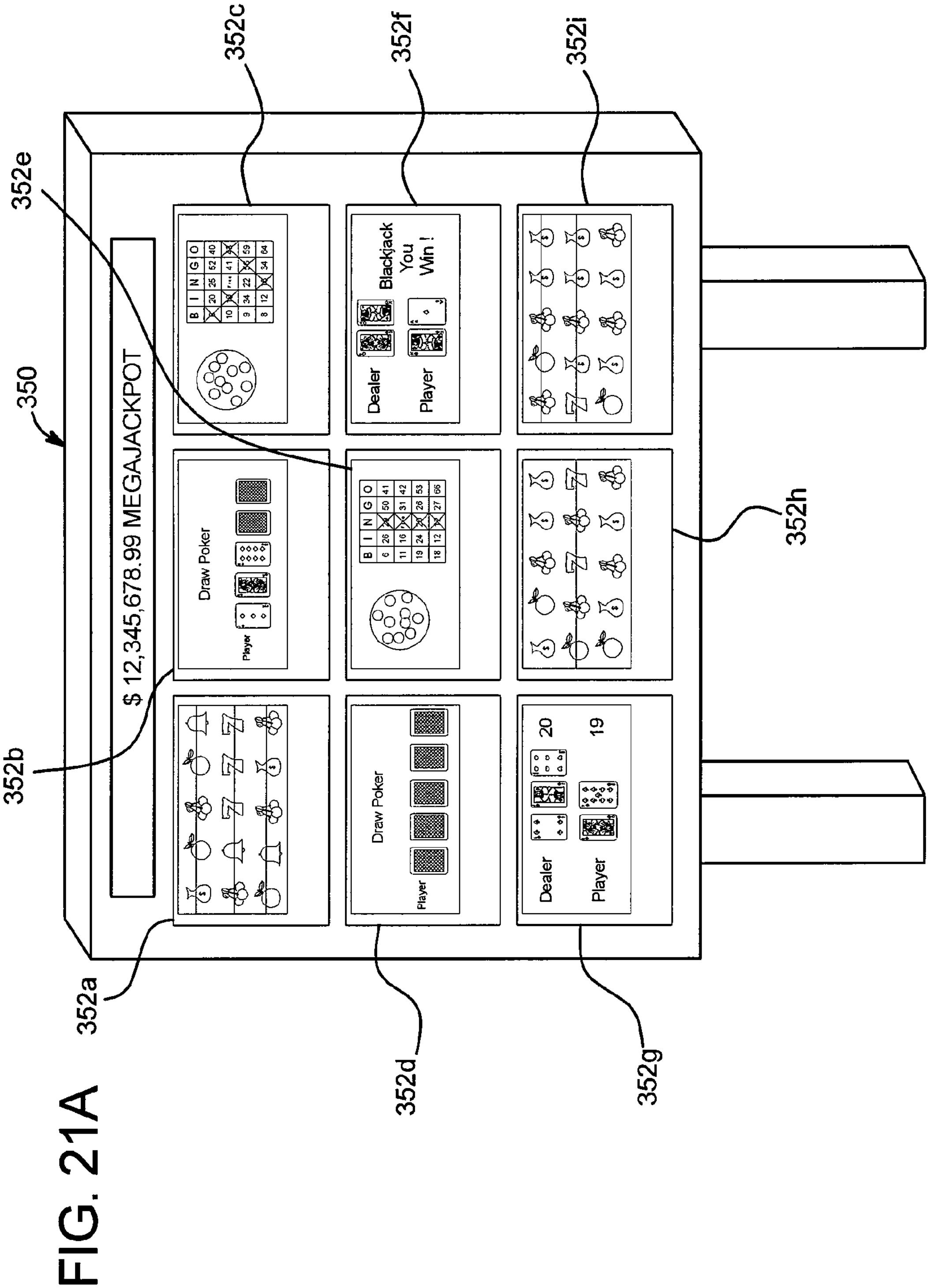
FIGS. 21A and 21B are perspective views of one embodiment of the gaming system disclosed herein illustrating a central display and a plurality of playing stations.
Figure 21B:
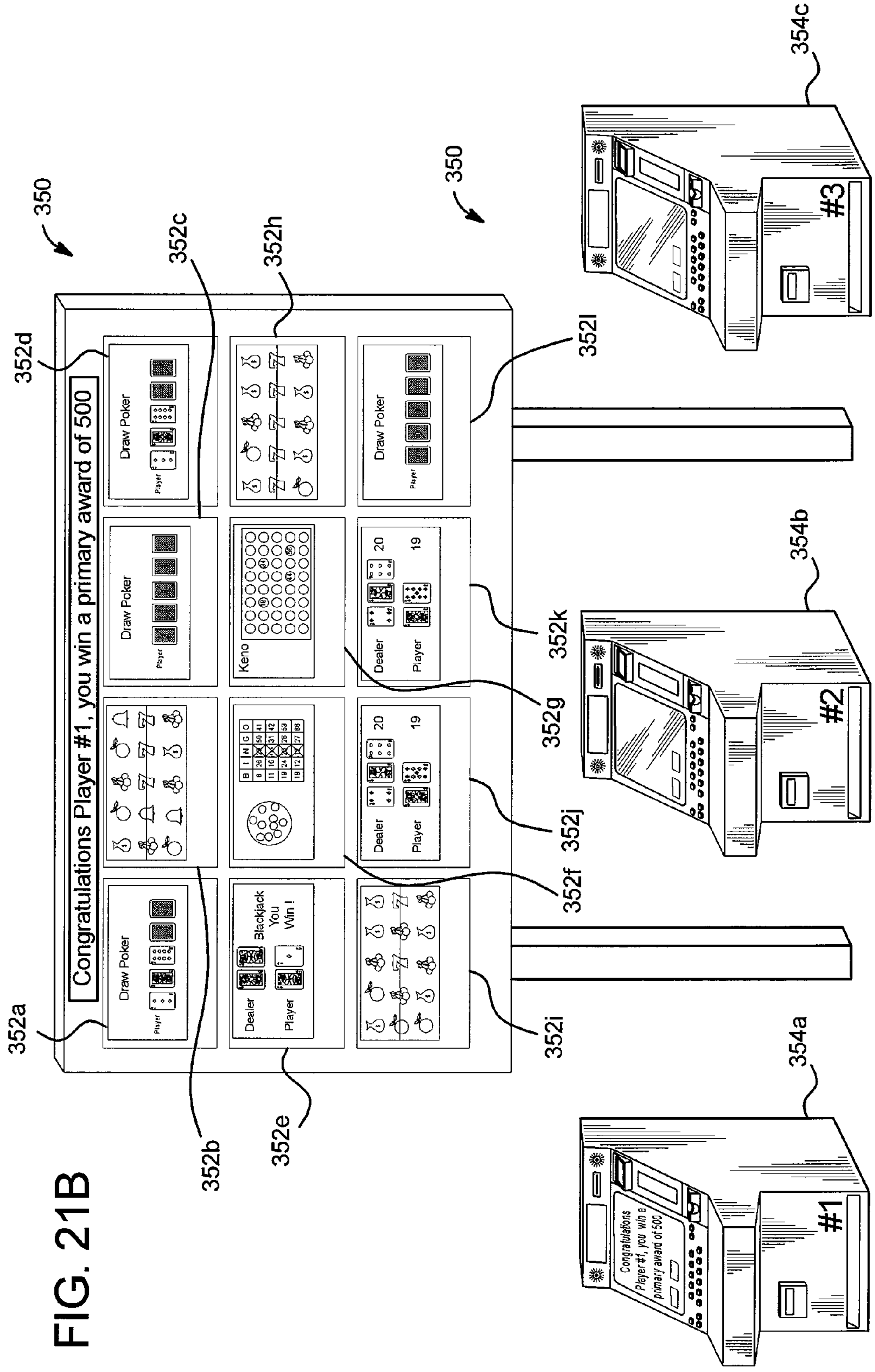

In one embodiment, the gaming system disclosed herein enables a plurality of players to play the same game, wherein at least one of the players is provided a bonus award. In one such embodiment, as illustrated in FIGS. 21A and 21B, the gaming system includes a central display 350 which includes a plurality of display segments 352 and one or a plurality of player stations 354. The display segments are configured to each separately display one of a plurality of games, to co-act to display a plurality of games, or to co-act to display one game. Each player station is configured to enable a player to simultaneously play one or more of the games displayed by the display segments. The player stations are thus configured to enable a plurality of players to simultaneously play the same displayed games. In one such embodiment, the player stations specifically enable multiple players to participate in a same play of one of the games displayed by the central display and to enable multiple players to simultaneously play individual games displayed by the display segments. In another such embodiment, the gaming system enables multiple players to simultaneously play a same game as a group. In this embodiment, upon an initial wager by one of the players for a play of the group game, the gaming system enables other players to join in or participate in the play of the group game. After the participation period ends, one or more of the display segments displays the play of the group game and the gaming system provides a same group outcome for the players who joined or participated in the play of the group game. Such games may be interactive games, such as a draw poker game, or may be non-interactive games, such as a slot game.

In one embodiment wherein the gaming system enables each of a plurality of players to simultaneously play one or more of a plurality of games, the gaming system tracks wagers placed on all of the games and provides a bonus award to one or more of the players playing one or more of the games. In one embodiment, if the gaming system determines to provide a bonus award, the central server picks one of the plurality of simultaneously played games and then picks a player playing the picked game to provide the bonus award. For example, as seen in FIG. 21B, the central server picks the game currently displayed in display segment 352*e* and picks one of the players simultaneously playing that displayed game to provide a bonus award. In this example, appropriate messages such as "CONGRATULATIONS PLAYER #1, YOU WIN A PRIMARY BONUS AWARD OF 500" are provided on the central display, one or more display segments and/or one or more player stations visually, or through suitable audio or audiovisual displays.

In another embodiment, if the gaming system determines to provide a bonus award, the central server picks one of the plurality of simultaneously played games and provides the bonus award to a plurality of or each of the players playing the picked game. In one such embodiment, a plurality of or each of player's playing the picked game are provided an equal portion of the determined bonus award. In another such embodiment, different players playing the picked game are provided different portions of the determined bonus award. In different embodiments, each player's relative portion of the determined bonus award is predetermined, randomly determined, determined based on a player's status (such as determined through a player tracking system), determined based on a generated symbol or symbol combination, determined based on a random determination by the central controller, determined based on a random determination by a gaming device, determined based on one or more side wagers placed, determined based on the player's primary game wager, determined based on time (such as the time of day), determined based on the amount of coin-in accumulated in one or more pools, or determined based on any other suitable method or criteria.

In another embodiment, if the gaming system determines to provide at least one bonus award, the central server picks one of the plurality of simultaneously played games and provides a separate bonus award to a plurality of or each of the players playing the picked game. In one such embodiment, one player is provided a primary bonus award and the other players playing the picked game are each provided a secondary bonus award. It should be appreciated that in these embodiments, the possibility of winning a bonus award and the amount of any bonus award influences which games a player chooses to play. For instance, games with more players simultaneously playing are more likely to be picked by the central server, but because there are more players playing the game, each player is less likely to be selected as the winner of a bonus award (or if all players are selected to win part, but not all of the bonus award, the player has to split the bonus award with more people). Alternatively, games with less players playing are less likely to be picked by the central server, but because there are fewer players playing the game, each player is more likely to be selected as the winner of a bonus award (or if all players are selected to win part, but not all of the bonus award, the player is provided a larger portion of the bonus award because they have to split the bonus award with less people).

In another embodiment, the gaming system enables one or more players to input or otherwise communicate to the gaming system a list of other players. In one such embodiment, whenever at least one player is selected to win at least one bonus award, one, more or each of the other players included in the selected player's list are provided at least part, but not all of the determined bonus award. In another such embodiment, whenever at least one player is selected to win at least one bonus award, one, more or each of the other players included in the selected player's list are provided a separate bonus award. In this embodiment, the selected player is provided a primary bonus award and one, more or each of the other players are each provided a secondary bonus award.

In one embodiment, if a player inputs a list of other players, that player is reciprocally added to the player list of each of the other players included on the player's list. In one such embodiment, if a first player adds a second player to their list of players, then (1) whenever the first player is selected to win at least one bonus award, the second player is provided at least part, but not all of the determined bonus award, and (2) whenever the second player is selected to win at least one bonus award, the first player is provided at least part, but not all of the determined bonus award. In another such embodiment, if a first player adds a second player to their list of players, then (1) whenever the first player is selected to win a primary bonus award, the second player is provided a secondary bonus award, and (2) whenever the second player is selected to win a primary bonus award, the first player is provided a secondary bonus award.

In one embodiment, the selected player and each of the players on the selected player's list are provided an equal portion of a determined bonus award. In another such embodiment, each of the players on the selected player's list are provided an equal portion of a determined bonus award and the selected player is provided a greater portion of the determined bonus award. In another such embodiment, the selected player and/or different players on the selected player's list are provided different portions of a determined bonus award. In different embodiments, each player's relative portion of the determined bonus award is predetermined, randomly determined, determined based on a player's status (such as determined through a player tracking system), determined based on a generated symbol or symbol combination, determined based on a random determination by the central controller, determined based on a random determination by a gaming device, determined based on one or more side wagers placed, determined based on the player's primary game wager, determined based on time (such as the time of day), determined based on the amount of coin-in accumulated in one or more pools, or determined based on any other suitable method or criteria.

It should be appreciated that enabling player's to input a list of other players and sharing at least part of any determined bonus award with such other players provides a dynamic that the more players on a designated player's list, the more likely that the designated player is provided a bonus award, but it is more likely to be a lower bonus award since it has to be shared with more players. Alternatively, the less players on a designated player's list, the less likely the designated player is provided a bonus award, but the more likely that when the designated player is provided a bonus award, it will have a higher value.

In another embodiment, the gaming establishment or casino creates one or more lists of players for bonus award determination purposes. In another embodiment, the central server creates one or more lists of players for bonus award determination purposes. In another embodiment, the gaming system creates one or more lists of players for bonus award determination purposes based on different player's player tracking levels determined through a player tracking system. In another embodiment, the gaming system creates one or more lists of players for bonus award determination purposes based on any suitable player characteristic which is categorized in one or more databases. It should be appreciated that any suitable method of creating one or more player lists may be implemented in accordance with the gaming system disclosed herein.

In one embodiment, if the gaming system determines to provide at least one bonus award, the central server picks one of the player lists and provides a separate bonus award to a plurality of or each of the players included on the selected player list. In one such embodiment, one player is provided a primary bonus award and one or more of the other players on the selected player list are each provided a secondary bonus award. In another embodiment, one player list is selected for a primary bonus award and one or more different player lists are each selected for one or more secondary bonus awards. In one such embodiment, each of the players on each selected list are provided an equal portion of a determined bonus award for that selected player list. In another such embodiment, each of the players on each selected list are provided different portions of a determined bonus award for that selected player list. In different embodiments, each player's relative portion of the determined bonus award is predetermined, randomly determined, determined based on a player's status (such as determined through a player tracking system), determined based on a generated symbol or symbol combination, determined based on a random determination by the central controller, determined based on a random determination by a gaming device, determined based on one or more side wagers placed, determined based on the player's primary game wager, determined based on time (such as the time of day), determined based on the amount of coin-in accumulated in one or more pools, or determined based on any other suitable method or criteria.

Networked Bonus Awards

As indicated above and as illustrated in FIG. 1, two or more of the gaming machines of the present invention are connected through a data network or a remote communication link. The processor of each gaming machine is designed to facilitate transmission of signals between the individual gaming machine and the central server or controller.

The plurality of the gaming machines of the present invention are capable of being linked through a data network. In one embodiment, the data network is a local area network (LAN), in which one or more of the gaming machines are substantially proximate to each other and an on-site central server or controller as in, for example, a gaming establishment or a portion of a gaming establishment. In another embodiment, the data network is a wide area network (WAN) in which one or more of the gaming machines are in communication with at least one off-site central server or controller. In this embodiment, the plurality of gaming machines may be located in a different part of the gaming establishment or within a different gaming establishment than the off-site central server or controller. Thus, the WAN may include an off-site central server or controller and an off-site gaming machine located within gaming establishments in the same geographic area, such as a city or state. The WAN gaming system of the present invention may be substantially identical to the LAN gaming system described above, although the number of gaming machines in each system may vary relative to each other.

In another embodiment, the data network is an internet or intranet. In this embodiment, the operation of the gaming machine can be viewed at the gaming machine with at least one internet browser. In this embodiment, operation of the gaming machine and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an Internet game page from any location where an internet connection and computer, or other internet facilitator are available.

In one such embodiment, a player logs onto a dedicated gaming site. At this gaming site, the central server (i.e., the internet/intranet server) enables the player to wager on and participate in one or more online games. Based, at least in part, on the player's participation in these online games, the central server determines if the player is eligible or ineligible to win one or more bonus awards as described above. In another embodiment, one or more gaming sties enable a player to play an internet simulation of a table game. In these embodiments, any contribution a player makes to the accumulated wager pool is associated with the player's account and stays with the player's account regardless of which games the player is currently playing at the gaming site.

In one such embodiment, the central server (i.e., the internet/intranet server) enables the player to place one or more bonus award side bets on any game which may be played at the dedicated gaming site. In this embodiment, by placing a bonus award side bet at the gaming site, the player is deemed eligible to win one or more bonus awards as described above. Such a configuration enables a player to wager on and play any game available at the dedicated gaming site and still be eligible to be provided one or more bonus awards as described above.

In one embodiment, to regulate and monitor the play of games over the internet, player's identifications are verified through credit card authentication. Through this authentication, the gaming system verifies the player, the player's age, the player's location and any other suitable information associated with the player. In one such embodiment, the gaming system utilizes the verified location information to monitor and ensure that the player in a certain location follows any applicable gaming regulations associated with that location. In another such embodiment, the gaming system utilizes the verified location information to set up different accumulated wager pools for different regions. In this embodiment, different bonus awards are allotted per region.

In another embodiment including game play over the internet, the gaming system stores information about one or more players. In this embodiment, after a player has enrolled or identified themselves with the gaming system (via the dedicated gaming site), the gaming system stores their information, such as credit card information, preferred options, player number, name, or any other information in a database. In one such embodiment, the gaming system enables the player to set and store one or more gaming options, such as jackpot betting, side wagering, and preferred games, associated with the dedicated gaming site.

In one embodiment, if a player is enrolled in (i.e., contributing wagers to) an accumulated wager pool and logs out of the dedicated gaming site before the gaming system determines if their contributed wagers win them a bonus award, the gaming system stores the player's contributed wagers for the next time the player logs on the dedicated gaming site. Such a configuration ensures that the player is provided a chance to win a bonus award based on their previous contributions, even after they have left active status at the dedicated gaming site.

It should be appreciated that the expansion in the number of computers and number and speed of internet connections in recent years increases opportunities for players to play from an ever-increasing number of remote sites. Accordingly, in one embodiment, a plurality of dedicated remote gaming sites are linked together. In this embodiment, one or more of the players wagering on and playing the online games at one or more of the remote gaming sites may be win one or more bonus awards as described above. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

Player Initiated Bonus Pools

In another embodiment, the gaming system enables one or more players to select one or more factors in the determination of which players, if any, are provided bonus awards. In one example embodiment, the gaming system enables one or more players to determine one or more characteristics of the bonus event accumulation period and/or the bonus event qualification period. In one embodiment, the gaming system enables at least one player playing at a gaming device or gaming table to select or determine one or more factors relating to one or more bonus awards. In another embodiment, the gaming system enables at least one player playing at a dedicated gaming site (or utilizing any other suitable gaming medium) to select or determine one or more factors relating to one or more bonus awards.

In different embodiments, which players are enabled to select one or more factors in the determination of one or more bonus awards is predetermined, randomly determined, determined based on a player's status (such as determined through a player tracking system), determined based on a generated symbol or symbol combination, determined based on a random determination by the central controller, determined based on a random determination by a gaming device, determined based on one or more side wagers placed, determined based on the player's primary game wager, determined based on time (such as the time of day), determined based on the amount of coin-in accumulated in one or more pools, or determined based on any other suitable method or criteria. In different embodiments, which factors such players are enabled to select or determine is predetermined, randomly determined, determined based on a player's status (such as determined through a player tracking system), determined based on a generated symbol or symbol combination, determined based on a random determination by the central controller, determined based on a random determination by a gaming device, determined based on one or more side wagers placed, determined based on the player's primary game wager, determined based on time (such as the time of day), determined based on the amount of coin-in accumulated in one or more pools, or determined based on any other suitable method or criteria.

In one embodiment, the gaming system enables one or more players to input or otherwise communicate to the gaming system a list of other players. From this list of players, the gaming system enables a designated player to form a group of players, wherein the group of players is associated with a separate accumulated wager pool. In this embodiment, each member of the group contributes to the separate accumulated wager pool based on their play as described above. When the gaming system determines to provide at least one bonus award associated with the separate accumulated wager pool, only the active players on the list of players are eligible to win a bonus award.

In another embodiment, the gaming system enables a plurality of players to participate in one or more player initiated gaming tournaments. In one such embodiment, as the player's play wagering games in the tournament, a portion of each player's wager is tracked and accumulated in an accumulated wager pool associated with the tournament. In another such embodiment, a portion of each player's enrollment fee to play in the tournament is accumulated in an accumulated wager pool associated with the tournament. In these embodiments, when the gaming system determines to provide at least one bonus award associated with the tournament accumulated wager pool, only the players participating in the tournament are eligible to win a bonus award. In one such embodiment, the gaming system selects a plurality of players to participate in a tournament to play for a primary bonus award. In another embodiment, the gaming system selects a plurality of players to participate in a tournament to play for a primary bonus award and selects one or more pluralities of players to participate in one or more tournaments to each play for a secondary bonus award.

Equating Different Gaming Devices

In a server based gaming establishment environment, it is expected that a server will download different game programs to the gaming devices on the floor of the gaming establishment. These game programs are each configured to be executed to provide different games having different parameters or characteristics, such as different paytables or different average expected payback percentages. The disclosure set forth below accounts for these different parameters or characteristics, such as different paytables or different average expected payback percentages, in determining the amounts each gaming device contributes to a bonus pool and/or determining each gaming device's relative probability of winning at least part of the bonus pool. It should be appreciated that the central server is operable to account for different gaming devices in the gaming system having different parameters or characteristics, such as different paytables or different average expected payback percentages, in performing or executing any appropriate determination in any embodiment disclosed herein.

In one such embodiment, to account for the many different types of gaming devices in the gaming system providing different games with different parameters or characteristics, the gaming system utilizes one or more equations or algorithms to determine the amount accumulated in the wager meter for each active gaming device. In one such embodiment, the controller or central server is programmed to accumulate a bonus award pool, wherein the accumulation is based on any amounts wagered on any games played at the gaming devices and an average expected payback percentage for each wagered on game. In this embodiment, at least two of the gaming devices have different average expected payback percentages such that a same amount wagered at two of the different gaming devices having different average expected payback percentages results in a different amount accumulated in the bonus award pool. In this embodiment, as described above, the controller is programmed display a bonus award based on the accumulated pool, and provide the displayed bonus award to at least one player.

In one embodiment wherein the central server accounts for different gaming devices in the gaming system having different parameters or characteristics, for each gaming device, the amount accumulated in that gaming device's associated wager meter is based on the specific wagering activity at that gaming device and the specific paytable of that gaming device. That is, as a player may be playing at and thus utilizing any suitable paytable of any suitable gaming device in the gaming system, in determining the amount accumulated in the wager meter for each gaming machine, the gaming system accounts for at least the paytable of the specific game associated with each gaming device, including the average expected payout or average expected payback percentage of such games. Such considerations enable the gaming system disclosed herein to equate the amounts accumulated in the wager meters for different gaming devices to provide equality to players playing different games at such different gaming devices.

In one such embodiment, the central server monitors the parameters of the games currently played at each gaming device in the gaming system and based on these monitored parameters, the central server adjusts the amounts accumulated in each gaming device's wager meter to compensate for the differences in payback percentages. In one embodiment, the player's currently played gaming device communicates information or data to the central server regarding the current parameters or characteristics of that gaming device and the central server determines an amount accumulated in the gaming device's wager meter based on this communicated information or data. In another embodiment, when the central server communicates or downloads information or data relating to the currently played game program to the gaming device, the central server logs in and/or stores the appropriate information. In another such embodiment, the central server periodically checks which games are being played on one or more gaming devices and stores information or data resulting from these checks. In these embodiments, when determining an amount accumulated in the gaming device's wager meter, the central server accesses this logged in and/or stored information or data. In these embodiments, when the parameters or characteristics of one or more games played at one or more gaming devices in the gaming system changes, the central server accounts for such changes in determining the amount accumulated in such gaming device's wager meters.

In one such embodiment, the central server determines that different gaming devices are associated with different accumulated wager meter amounts for the same or substantially the same amount of coin-in placed at these different gaming devices. In one example embodiment, if a player has wagered a first quantity of monetary units at a first gaming device on a first game having a first paytable, the amount accumulated in the wager meter of the first gaming device is a first amount of monetary units (i.e., based on the first quantity of monetary units wagered and the paytable of the first game). In this example embodiment, if the player has wagered the first quantity of monetary units at a second, different gaming device on a second, different game having a second, different paytable, the amount accumulated in the wager meter of the second gaming device is a second amount of monetary units (i.e., based on the first quantity of monetary units wagered and the paytable of the second game). For example, if a first game at a first gaming device has an average expected payback percentage of 85% and a second game at a second gaming device has an average expected payback percentage of 95%, then to equate the amounts accumulated in the wager meters associated with each of these gaming devices based on the different game payback percentages, for the same amount of coin-in, the first gaming device is determined to have an accumulated wager meter amount more than the accumulated wager meter amount for the second gaming device. Such a configuration provides that in determining the accumulated amount for each gaming device's wager meter, the gaming system at least considers each gaming device's specific parameters or characteristics, such as each gaming device's associated paytable, as well as the quantity of monetary units wagered at each gaming device.

In another embodiment, to account for the many different types of gaming devices in the gaming system providing different games with different parameters or characteristics, the gaming system utilizes one or more equations or algorithms to determine each gaming device's relative probability for being selected to provide a primary bonus award and/or a secondary bonus award. In one such embodiment, the controller or central server is programmed to determine if a bonus event will occur as described above. In this embodiment, if the controller determines that the bonus event will occur, the controller is programmed to determine each gaming device's relative probability of providing a bonus award, wherein the determination is based on any amounts wagered on any games played at the gaming devices and an average expected payback percentage for each wagered on game. In this embodiment, at least two of the gaming devices have different average expected payback percentages such that a same amount wagered at two of the different gaming devices having different average expected payback percentages results in different probabilities of providing the bonus award. In this embodiment, as described above, the central server is programmed to select one of the gaming devices to provide the bonus award, wherein the selection is based, at least in part, on the determined relative probabilities, and cause the bonus award to be displayed and provided to a player of the selected gaming device.

In one embodiment wherein the central server accounts for different gaming devices in the gaming system having different parameters or characteristics, each gaming device's relative probability for being selected to provide a bonus award is based on the specific wagering activity at that gaming device and the specific paytable of that gaming device. That is, as a player may be playing at and thus utilizing any suitable paytable of any suitable gaming device in the gaming system, in determining a probability for each gaming device to be selected to provide a bonus award, the gaming system accounts for at least the paytable of the specific game associated with each gaming device, including the average expected payout or average expected payback percentage of such games. Such considerations enable the gaming system disclosed herein to equate the probabilities of being selected to provide a bonus award for different gaming devices to provide equality to players playing different games at such different gaming devices.

In one such embodiment, the central server monitors the parameters of the games currently played at each gaming device in the gaming system and based on these monitored parameters, the central server adjusts one or more gaming device's relative probability for being selected to provide a bonus award to compensate for the differences in payback percentages. In one embodiment, the player's currently played gaming device communicates information or data to the central server regarding the current parameters or characteristics of that gaming device and the central server determines one or more gaming device's relative probability for being selected to provide a bonus award based on this communicated information or data. In another embodiment, when the central server communicates or downloads information or data relating to the currently played game program to the gaming device, the central server logs in and/or stores the appropriate information. In another such embodiment, the central server periodically checks which games are being played on one or more gaming devices and stores information or data resulting from these checks. In these embodiments, when determining one or more gaming device's relative probability for being selected to provide a bonus award, the central server accesses this logged in and/or stored information or data. In these embodiments, when the parameters or characteristics of one or more games played at one or more gaming devices in the gaming system changes, the central server accounts for such changes in determining one or more gaming device's relative probability for being selected to provide a bonus award.

In one such embodiment, the central server determines that different gaming devices which contributed the same or substantially the same amount of coin-in to an accumulated wager pool are associated with different relative probabilities of being provided a bonus award. In one example embodiment, if the accumulated amount in the wager meter for a first gaming device on a first game having a first paytable is a first quantity of monetary units, the gaming system determines a first probability of the first gaming device being selected to provide a bonus award (i.e., based on the first quantity of monetary units and the paytable of the first game). In this example embodiment, if the accumulated amount in the wager meter for a second, different gaming device on a second, different game having a second, different paytable is the first quantity of monetary units, the gaming system determines a second probability of the second gaming device being selected to provide a bonus award (i.e., based on the first quantity of monetary units and the paytable of the second game). For example, if a first game at a first gaming device has an average expected payback percentage of 85% and a second game at a second gaming device has an average expected payback percentage of 95%, then to compensate for the first game of the first gaming device having a lower average expected payback percentage, for the same amount of coin-in, the first gaming device is determined to have a greater relative probability of being selected to provide a bonus award than the second gaming device. That is, in this example, the first gaming device is associated with a first probability of being selected to provide a bonus award and the second gaming device is associated with a lower probability of being selected to provide a bonus award. Such a configuration provides that in determining the probabilities of winning a bonus award, the gaming system at least considers each gaming device's specific parameters or characteristics, such as each gaming device's associated paytable, as well as an amount that the gaming device contributed to the accumulated wager pool during the bonus event accumulation period.

In these gaming devices, the different parameters or characteristics of each gaming device which may factor into determining the amount accumulated in the wager meter for that gaming device and/or determining each gaming device's relative probability for being selected to provide a bonus award include, but are not limited to: a primary game type, a secondary game type, a denomination utilized, a maximum wager amount, a minimum wager amount, a primary game average expected payback percentage, a secondary game average expected payout, a paytable, one or more available side bets, one or more available awards, one or more symbols or symbol combinations, one or more game play features and any combination thereof. In different embodiments, the algorithms utilized to determine the amount accumulated in the wager meter for that gaming device and/or to determine each gaming device's relative probability for being selected to provide a bonus award may be based on one or more of: a player's denomination, a player's bet level, an amount of a player's coin-in, one or more symbols or symbol combinations generated, a number or quantity of games played by one or more players, one or more designated thresholds reached, an amount of one or more gaming device's coin-out, one or more game parameters, a player's status (such as determined through a player tracking system), a determination by the central controller, a determination by a gaming device, any combination thereof or any other suitable factor.

Tokens

In another embodiment, the gaming system disclosed herein incorporates one or more tokens in a collection game. In one such embodiment, the gaming system is configured to provide more frequent, smaller valued bonus awards. In this embodiment, each time a bonus award is provided to a player, the gaming system also provides a token to the player. If a player collects a designated number of tokens, such as three tokens, the gaming system provides the player an additional award, such as any accumulated remainder. It should be appreciated that in this embodiment, the odds are altered to provide that payouts of bonus awards are kept in line with the payouts of bonus awards described above. For example, if the gaming system (without the use of tokens) described above provides a bonus award 1:50,000 times and each award is, on average, 1000 monetary units, then the gaming system which utilizes tokens provides a bonus award 1:10,000 times and each award includes a token and is, on average, 200 monetary units. It should be further appreciated that these odds factor in the likelihood of a player collecting the designed number of tokens and any additional award provided upon the occurrence of such an event.

General—Gaming Machines and Electronics of Gaming System

As mentioned above, the present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player. In one embodiment wherein the bonus awards or bonus games as disclosed herein are downloaded from a central server to at least one gaming device, one or more central servers each perform different functions of the bonus award determination. In one such embodiment, the central server includes different modules or partitions, including at least one which relates to bonus game and bonus award functions and at least one which relates to non-bonus game and non-bonus award functions. In another such embodiment, the gaming system includes at least two central servers, including at least one which relates to bonus game and bonus award functions and at least one which relates to non-bonus game and non-bonus award functions.

In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 19A:
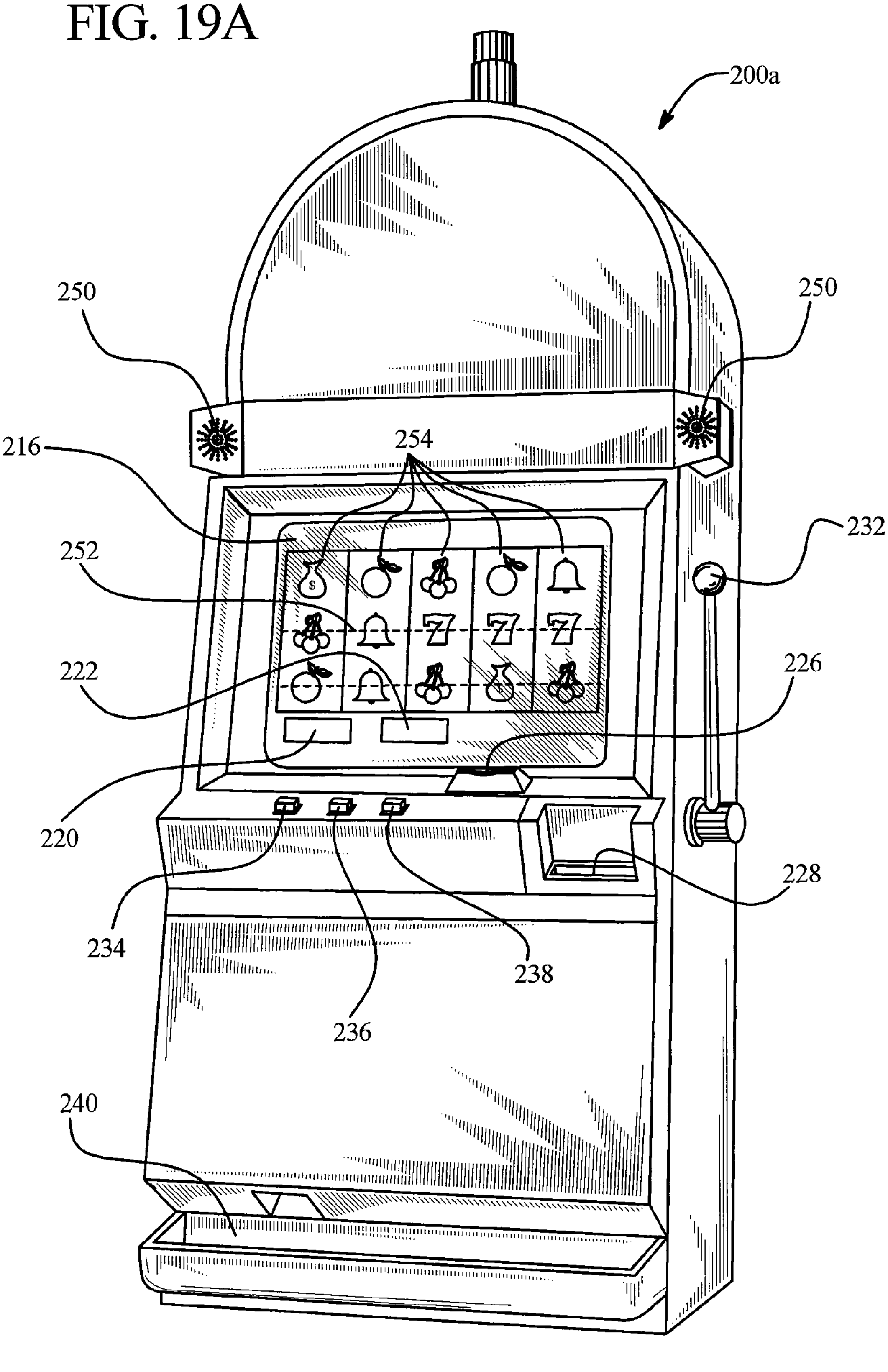
FIGS. 19A and 19B are front perspective views of alternative embodiments of gaming machines of one embodiment of the present invention.
Figure 19B:
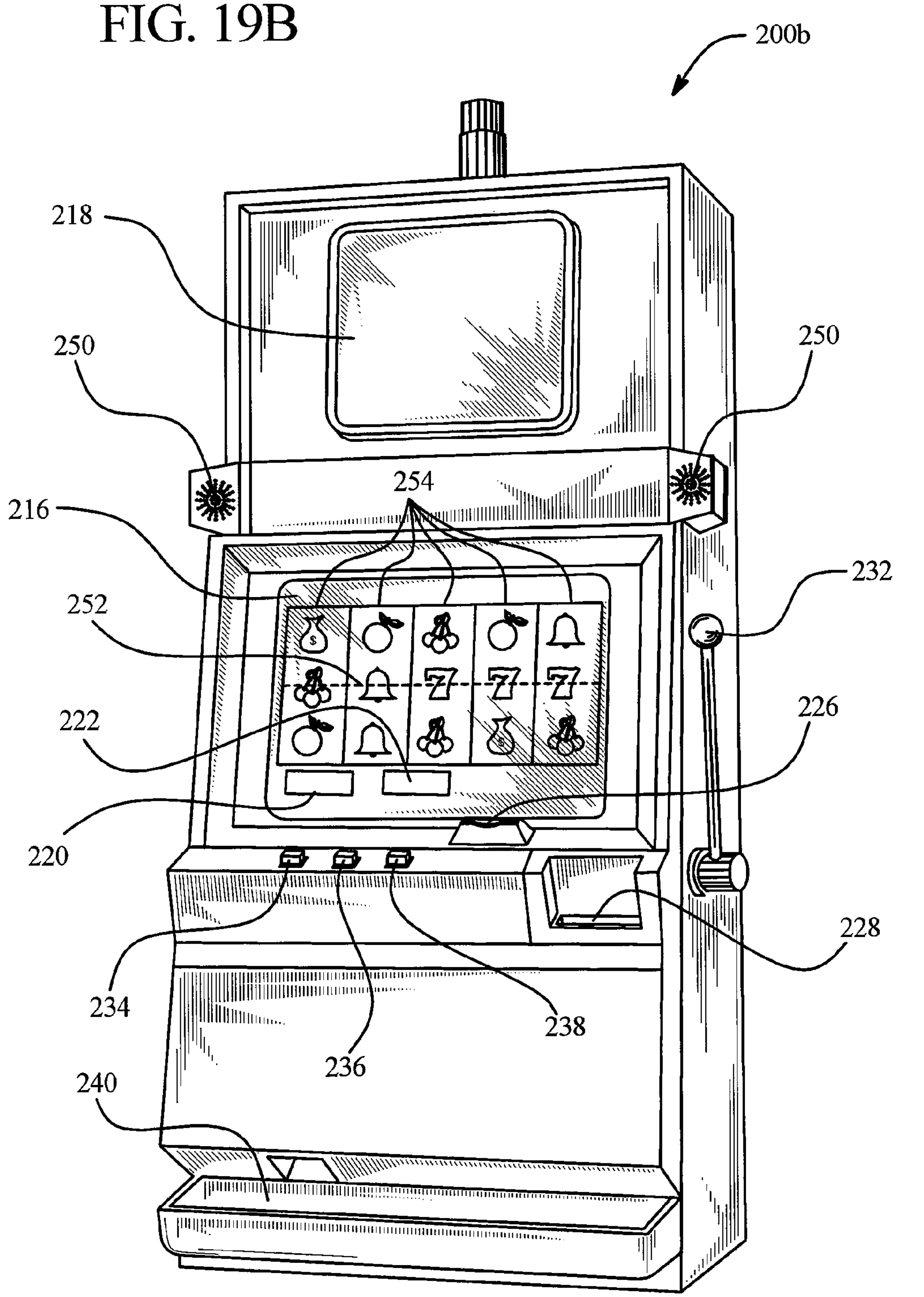

Two alternative embodiments of the gaming machines of the present invention are generally illustrated in FIGS. 19A and 19B as gaming machine 200*a* and gaming machine 200*b*, respectively. Gaming machine 200*a* and/or gaming machine 200*b* are generally referred to herein as gaming machine 200.

In one embodiment, as illustrated in FIGS. 19A and 19B, each gaming machine 200 has a support structure, housing or cabinet which provides support for a plurality of displays, inputs, controls and other features of a conventional gaming machine. It is configured so that a player can operate it while standing or sitting. The gaming machine may be positioned on a base or stand or can be configured as a pub-style table-top game (not shown) which a player can operate preferably while sitting. As illustrated by the different configurations shown in FIGS. 19A and 19B, the gaming machine can be constructed with varying cabinet and display configurations.

Figure 20:
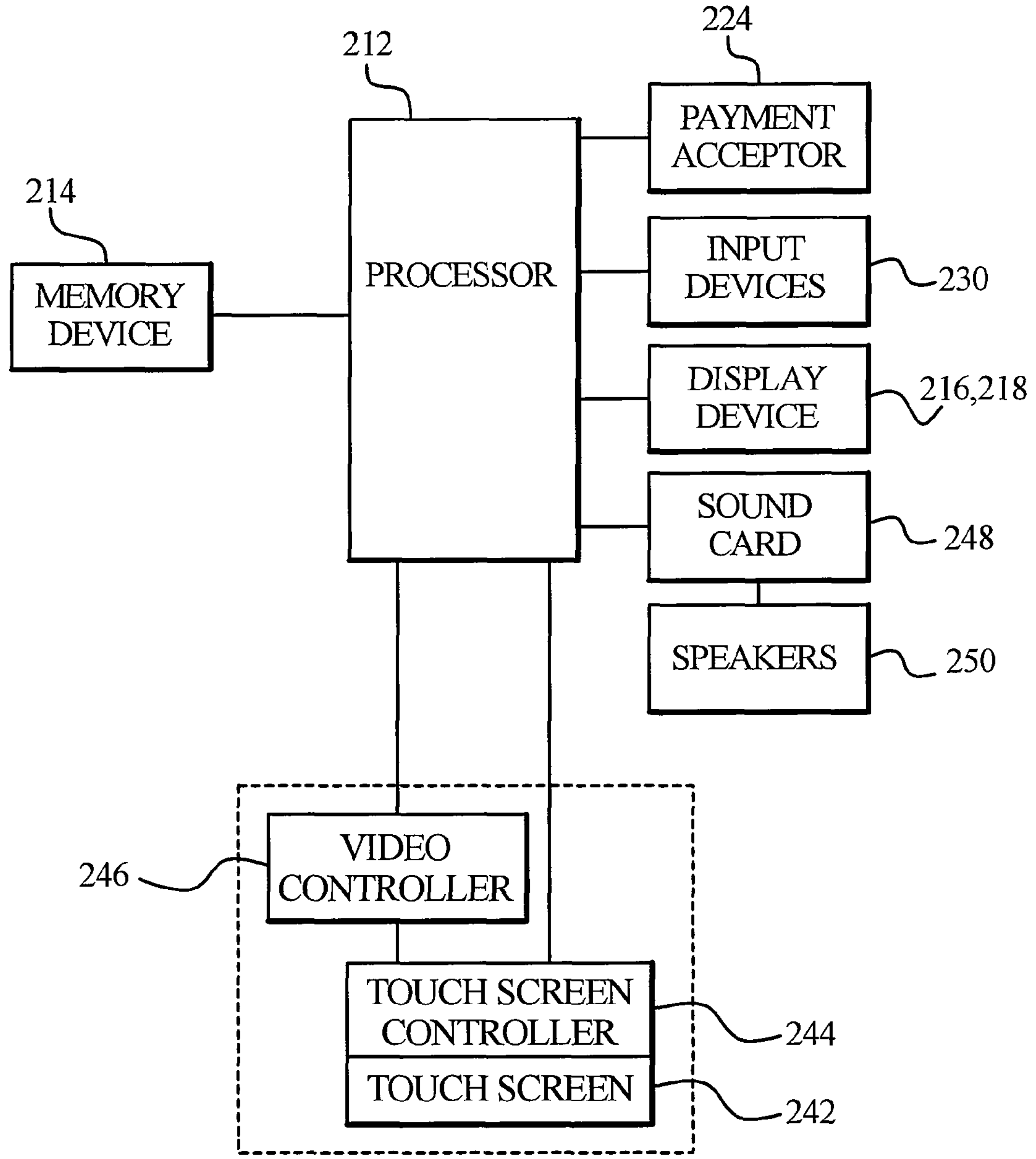
FIG. 20 is a schematic block diagram of the electronic configuration of one embodiment of a gaming machine of the present invention.

In one embodiment, as illustrated in FIG. 20, each gaming machine preferably includes at least one processor 212, such as a microprocessor, a microcontroller-based platform, a suitable integrated circuit or one or more application-specific integrated circuits (ASIC's). The processor is in communication with or operable to access or to exchange signals with at least one data storage or memory device 214. In one embodiment, the processor and the memory device reside within the cabinet of the gaming machine. The memory device stores program code and instructions, executable by the processor, to control the gaming machine. The memory device also stores other data such as image data, event data, player input data, random or pseudo-random number generators, paytable data or information and applicable game rules that relate to the play of the gaming machine. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming machine of the present invention.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network. In one embodiment, a player can use such a removable memory device in a desktop, a laptop personal computer, a personal digital assistant (PDA) or other computerized platform to implement the present disclosure.

In one embodiment, the gaming device or gaming machine disclosed herein is operable over a wireless network, such as part of a wireless gaming system to communicate with the central server. In one such embodiment, the gaming machine may be a hand held device, such as a cell phone, a smart phone or a PDA, a mobile device or any other suitable wireless device that enables a player to play any suitable game at a variety of different locations. In one embodiment, the hand held device enables a player to purchase a set number of games, wherein the purchased games are loaded, such as downloaded, onto the hand held device. In another such embodiment, the hand held device enables a player to purchase each game individually in real-time based on a connection to the central server. In these embodiments, as each game is played, an outcome is generated and one or more bonus awards may be provided to the player. That is, with each game purchased and played, a contribution is made to the accumulated bonus pool and the player is provided a chance to win a bonus award as described above.

In another embodiment, one or more handheld devices are associated with one or more of the gaming tables as described below. Such hand held devices enable a player to play one or more games remote from the gaming table and remain eligible to win one or more bonus awards. In another embodiment, such hand held devices are operable to sync with one or more of the gaming tables. This embodiment provides that more players may participate at games at the gaming table (via the synced hand held devices) than the number of playing stations/seats physically located at the gaming table.

In another embodiment, one or more bonus awards are provided to players currently operating non-dedicated gaming terminals, such as an ATM, airport kiosk, digital video recorder, home computer, or home gaming console. In one embodiment, the non-dedicated gaming terminal enables a player to purchase a set number of games, wherein the purchased games are loaded, such as downloaded, onto the non-dedicated gaming terminal. In another embodiment, the non-dedicated gaming terminal enables a player to purchase each game individually in real-time based on a connection to the central server. In another embodiment, any non-dedicated gaming terminals which are hooked into a network enable one or more games run and maintained on a casino server to be played outside the casino. In another embodiment, any non-dedicated gaming terminals which enable a plurality of players to play against each other over a network are coupled with one or more gaming sites (as described herein) and the central server to enable each player to download (or play streaming in real-time) a game.

In these embodiments, as each game is played, an outcome is generated and one or more bonus awards may be provided to the player. That is, as the non-dedicated gaming terminal runs each game, a contribution is made to the accumulated bonus pool and the player is provided a chance to win a bonus award as described above. It should be appreciated that in such embodiments, funds for purchasing any games played on the hand held device and funds provided to players for any generated awards are handled via any suitable manner disclosed herein.

It should be further appreciated that a gaming device or gaming machine as disclosed herein may be a device that has obtained approval from a regulatory gaming commission or a device that has not obtained approval from a regulatory gaming commission.

In one embodiment, as discussed in more detail below, the gaming machine randomly generates awards and/or other game outcomes for the primary game based on probability data. In one such embodiment, this random determination is provided through utilization of a random number generator (RNG), such as a true random number generator, a pseudo random number generator or other suitable randomization process. In one embodiment, each award or other game outcome for the primary game is associated with a probability and the gaming machine generates the award or other game outcome to be provided to the player based on the associated probabilities. In this embodiment, since the gaming machine generates outcomes randomly or based upon one or more probability calculations, there is no certainty that the gaming machine will ever provide the player with any specific award or other game outcome.

In another embodiment, the gaming machine employs a predetermined or finite set or pool of awards or other game outcomes. In this embodiment, as each award or other game outcome is provided to the player, the gaming machine removes the provided award or other game outcome from the predetermined set or pool. Once removed from the set or pool, the specific provided award or other game outcome cannot be provided to the player again. This type of gaming machine provides players with all of the available awards or other game outcomes over the course of the play cycle and guarantees the amount of actual wins and losses.

It should be appreciated that the present invention may be employed in a central determination system where a central controller picks the outcome from a pool of outcomes. In one such embodiment, after the central server determines an outcome for a gaming machine, the gaming system will store such outcome until that gaming machine is selected to receive the bonus event and the selected gaming machine makes a request for an outcome.

In another embodiment, the gaming system enables the player to pre-pay for one or more games which the player utilizes at their leisure (i.e., utilizing any appropriate gaming medium described above). In one such embodiment, any purchased, but not yet played games are stored in association with a player tracking system. In one embodiment, the gaming system enables the player of such pre-paid games to win one or more bonus awards as described above. In one such embodiment, if the central server determines to provide at least one bonus award, the central server associates a bonus award with at least one pre-paid game and the player whom purchases such pre-paid game is provided the bonus award.

In one embodiment, at least one purchased game (and its respective game result or outcome) is randomly generated at the central server at purchase. In another embodiment, at least one purchased game (and its respective game result or outcome) is part of a finite set or pool of games. In this embodiment, each set or pool of games are separated into a set number of game (wherein the number is determined by the designer to adhere to appropriate odds). Within each set or pool, one or more of the games are associated with at least one bonus award, such that players who purchase more games are more likely to receive a bonus award.

In one embodiment, as illustrated in FIG. 19A, the gaming machine 200*a* includes one or more display devices controlled by the processor. The display devices are preferably connected to or mounted to the cabinet of the gaming machine. The embodiment shown in FIG. 19A includes a central display device 216 which displays a primary game. This display device may also display any suitable secondary game associated with the primary game as well as information relating to the primary or secondary game. The alternative embodiment shown in FIG. 19B includes a central display device 216 and an upper display device 218. The upper display device may display the primary game, any suitable secondary game associated with or not associated with the primary game and/or information relating to the primary or secondary game. These display devices may also serve as digital glass operable to advertise games or other aspects of the gaming establishment. In another embodiment, at least one display device may be a mobile display device, such as a PDA or tablet PC, that enables play of at least a portion of the primary or secondary game at a location remote from the gaming device.

As seen in FIGS. 19A and 19B, in one embodiment, the gaming machines includes a credit display 220 which displays a player's current number of credits, cash, account balance or the equivalent. In one embodiment, the gaming machine includes a bet display 222 which displays a player's amount wagered.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable configuration, such as a square, rectangle, elongated rectangle.

The display devices of the gaming machine are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 20, in one embodiment, the gaming machine includes at least one payment acceptor 224 in communication with the processor. As seen in FIGS. 19A and 19B, the payment acceptor may include a coin slot 226 and a payment, note or bill acceptor 228, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming machine. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming machine through electronic funds transfer. When a player funds the gaming machine, the processor determines the amount of funds entered and the corresponding amount is shown on the credit or other suitable display as described above.

As seen in FIGS. 19A, 19B and 20, in one embodiment the gaming machine includes at least one and preferably a plurality of input devices 230 in communication with the processor. The input devices can include any suitable device which enables the player to produce an input signal which is read by the processor. In one embodiment, after appropriate funding of the gaming machine, the input device is a game activation device, such as a pull arm 232 or a play button 234 which is used by the player to start any primary game or sequence of events in the gaming machine. The play button can be any suitable play activator such as a bet one button, a max bet button or a repeat the bet button. In one embodiment, upon appropriate funding, the gaming machine begins the game play automatically. In another embodiment, upon the player engaging one of the play buttons, the gaming machine automatically activates game play.

In one embodiment, as shown in FIGS. 19A and 19B, one input device is a bet one button 236. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming machine.

In one embodiment, one input device is a cash out button 238. The player may push the cash out button and cash out to receive a cash payment or other suitable form of payment corresponding to the number of remaining credits. In one embodiment, when the player cashes out, the player receives the coins or tokens in a coin payout tray 240. In one embodiment, when the player cashes out, the player may receive other payout mechanisms such as tickets or credit slips redeemable by a cashier (or other suitable redemption system) or funding to the player's electronically recordable identification card.

In one embodiment, as mentioned above and seen in FIG. 20, one input device is a touch-screen 242 coupled with a touch-screen controller 244, or some other touch-sensitive display overlay to allow for player interaction with the images on the display. The touch-screen and the touch-screen controller are connected to a video controller 246. A player can make decisions and input signals into the gaming machine by touching touch-screen at the appropriate places. One such input device is a touch-screen button panel.

The gaming machine may further includes a plurality of communication ports for enabling communication of the processor with external peripherals, such as external video sources, expansion buses, game or other displays, an SCSI port or a key pad.

In one embodiment, as seen in FIG. 20, the gaming machine includes a sound generating device controlled by one or more sounds cards 248 which function in conjunction with the processor. In one embodiment, the sound generating device includes at least one and preferably a plurality of speakers 250 or other sound generating hardware and/or software for generating sounds, such as playing music for the primary and/or secondary game or for other modes of the gaming machine, such as an attract mode. In one embodiment, the gaming machine provides dynamic sounds coupled with attractive multimedia images displayed on one or more of the display devices to provide an audio-visual representation or to otherwise display full-motion video with sound to attract players to the gaming machine. During idle periods, the gaming machine may display a sequence of audio and/or visual attraction messages to attract potential players to the gaming machine. The videos may also be customized for or to provide any appropriate information.

In one embodiment, the gaming machine may include a sensor, such as a camera, in communication with the processor (and possibly controlled by the processor) that is selectively positioned to acquire an image of a player actively using the gaming machine and/or the surrounding area of the gaming machine. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

In another embodiment, a plurality of gaming machines at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming machines distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming machine hardware and software and the host site computer.

In one embodiment, as illustrated in FIGS. 19A and 19B, a base or primary game may be a slot game with one or more paylines 252. The paylines may be horizontal, vertical, circular, diagonal, angled or any combination thereof. In this embodiment, the gaming device displays at least one and preferably a plurality of reels 254, such as three to five reels 254 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 254 are in video form, the plurality of simulated video reels 254 are displayed on one or more of the display devices as described above. Each reel 254 displays a plurality of indicia such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel ××1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming machine enables the player to play a conventional game of video poker and initially deals five cards all face up from a virtual deck of fifty-two card deck. Cards may be dealt as in a traditional game of cards or in the case of the gaming machine, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and replacement cards are dealt from the remaining cards in the deck. This results in a final five-card hand. The final five-card hand is compared to a payout table which utilizes conventional poker hand rankings to determine the winning hands. The player is provided with an award based on a winning hand and the credits the player wagered.

In another embodiment, the base or primary game may be a multi-hand version of video poker. In this embodiment, the player is dealt at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

It should be appreciated that the gaming system disclosed herein can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or the secondary game may be any type of suitable game, either similar to or completely different from the base or primary game. In one embodiment, the gaming machine includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 19A and 19B. In another embodiment, the triggering event or qualifying condition may be by exceeding a certain amount of game play (number of games, number of credits, amount of time), reaching a specified number of points earned during game play or as a random award.

In one embodiment, once a player has qualified for a secondary game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game; he must win or earn entry through play of the primary game and, thus, play of the primary game is encouraged. In another embodiment, qualification of the bonus or secondary game could be accomplished through a simple "buy in" by the player if, for example, the player has been unsuccessful at qualifying through other specified activities.

In one embodiment, the gaming system disclosed herein is associated with or otherwise integrated with one or more player tracking systems. In this embodiment, the gaming device and/or player tracking system tracks any players gaming activity at the gaming device. In one such embodiment, the gaming device and/or associated player tracking system timely tracks when a player inserts their playing tracking card to begin a gaming session and also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks and/or stores any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, any pre-purchased games, any determined but not yet provided bonus awards, any lists of other players inputted by the player, any stored tokens or any other suitable data.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, as mentioned above, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Gaming Tables

In another embodiment, the gaming system disclosed herein includes at least one central server, central controller or remote host in communication with or linked to a plurality of intelligent gaming tables or wagering chip tracking systems. In one embodiment, each of the gaming tables in one or more gaming establishments are linked together. In another embodiment, different gaming tables are linked together based on one or more linking criteria. For example, different gaming tables are linked together based on each tables respective average expected payback, bet or wager level, type of game played or characteristic of game played. In different embodiments, which gaming tables are linked together is predetermined, randomly determined, determined based on a player's status (such as determined through a player tracking system), determined based on a generated symbol or symbol combination, determined based on a random determination by the central controller, determined based on one or more side wagers placed, determined based on the player's primary game wager, determined based on time (such as the time of day), determined based on the amount of coin-in accumulated in one or more pools, or determined based on any other suitable method or criteria.

In one embodiment, each intelligent gaming table enables one or more players to play one or more suitable games by placing one or more wagers utilizing such wagering chips. Such game play and/or wagering information is tracked by the intelligent gaming table and provided to the central server. Based on such tracked information, similar to the manner described above in relation to gaming devices, the gaming system provides one or more of the players at such gaming tables with one or more bonus awards. In another embodiment, the central server is in communication with at least one player tracking system to identify at least one player currently placing at least one wager on at least one suitable game at least one of the intelligent gaming tables in the gaming system.

In different embodiments, upon a determination to provide at least one bonus award:

1. the gaming system selects one of the intelligent gaming tables and provides each of one or more of the players at the selected gaming table the bonus award or a portion of a bonus award;
2. the gaming system (i) selects one of the intelligent gaming tables and provides each of one or more of the players at the selected gaming table a primary bonus award or a portion of the primary bonus award, and (ii) selects each of one or more intelligent gaming tables and provides each of one or more of the players at the selected gaming table a secondary bonus award or a portion of the secondary bonus award;
3. the gaming system selects one of the intelligent gaming tables and provides one of the players at the selected gaming table a primary bonus award and provides each of zero, one or more of the players at the selected gaming table a secondary bonus award;
4. the gaming system selects one of the players at one of the intelligent gaming tables and provides the selected player a bonus award;
5. the gaming system (i) selects one of the players at one of the intelligent gaming tables and provides the selected player a primary bonus award, and (ii) selects each of one or more players at one or more of the intelligent gaming tables and provides each of the selected players a secondary bonus award; and
6. any combination thereof.

In one or more of these embodiments, upon a determination to provide a bonus award as described above, one of the players at an intelligent gaming table is provided the bonus award. In this embodiment, the gaming system determines an amount or value for the bonus award and further determines which player is provided the determined bonus award as disclosed herein. In another embodiment, upon a determination to provide a bonus award as described above, each of the players at an intelligent gaming table are provided a bonus award. In one such embodiment, each player at the gaming table is provided an equal portion of the bonus award. In another such embodiment, each player at the gaming table is provided a weighted portion of the bonus award based on that player's wagering history. In different embodiments, each player's relative portion of the bonus award is predetermined, randomly determined, determined based on a player's status (such as determined through a player tracking system), determined based on a generated symbol or symbol combination, determined based on a random determination by the central controller, determined based on one or more side wagers placed, determined based on the player's primary game wager, determined based on time (such as the time of day), determined based on the amount of coin-in accumulated in one or more pools, or determined based on any other suitable method or criteria.

In one or more of these embodiments, upon a determination to provide a bonus award as described above, one of the players at the intelligent gaming table is provided a primary bonus award and zero, one or more of the remaining players at the intelligent gaming table are each provided a secondary bonus award. In another embodiment, upon a determination to provide a bonus award as described above, one of the players at one of a plurality of intelligent gaming tables is provided a primary bonus award and zero, one or more players at one or more different intelligent gaming tables are each provided a secondary bonus award. In a different embodiment, which player at the gaming table are provided the primary bonus award and which players at the gaming table are provided secondary bonus awards is predetermined, randomly determined, determined based on a player's status (such as determined through a player tracking system), determined based on a generated symbol or symbol combination, determined based on a random determination by the central controller, determined based on one or more side wagers placed, determined based on the player's primary game wager, determined based on time (such as the time of day), determined based on the amount of coin-in accumulated in one or more pools, or determined based on any other suitable method or criteria.

In one or more of these embodiments, a determination to provide a bonus award as described above, one of a plurality of gaming tables are selected for a primary bonus award and zero, one or more of the gaming tables are selected for one or more secondary bonus awards. In one such embodiment, the central server selects one of the players at the gaming table selected for the primary bonus award and causes that selected player to be provided the primary bonus award. In another such embodiment, the primary bonus award is split or distributed amongst the players at the gaming table selected for the primary bonus award. In one such embodiment, each player at the gaming table selected for the primary bonus award is provided an equal portion of the primary bonus award. In another such embodiment, each player at the gaming table selected for the primary bonus award is provided a weighted portion of the primary bonus award based on that player's wagering history. In different embodiments, each player's relative portion of the primary bonus award is predetermined, randomly determined, determined based on a player's status (such as determined through a player tracking system), determined based on a generated symbol or symbol combination, determined based on a random determination by the central controller, determined based on one or more side wagers placed, determined based on the player's primary game wager, determined based on time (such as the time of day), determined based on the amount of coin-in accumulated in one or more pools, or determined based on any other suitable method or criteria.

In one or more of these embodiments, for each of any gaming tables selected for a secondary bonus award, the central server selects one of the players at that gaming table for the secondary bonus award and causes that selected player to be provided the secondary bonus award. In another such embodiment, for each of any gaming tables selected for a secondary bonus award, the secondary bonus award is split or distributed amongst the players at that gaming table. In one such embodiment, for each of any gaming tables selected for a secondary bonus award, each player at the gaming table is provided an equal portion of the secondary bonus award. In another such embodiment, for each of any gaming tables selected for a secondary bonus award, each player at the gaming table is provided a weighted portion of the secondary bonus award based on that player's wagering history. In different embodiments, each player's relative portion of the secondary bonus award for that selected gaming table is predetermined, randomly determined, determined based on a player's status (such as determined through a player tracking system), determined based on a generated symbol or symbol combination, determined based on a random determination by the central controller, determined based on one or more side wagers placed, determined based on the player's primary game wager, determined based on time (such as the time of day), determined based on the amount of coin-in accumulated in one or more pools, or determined based on any other suitable method or criteria.

In one embodiment, different table games in the gaming system have different hold percentages for each game played. In another embodiment, different players currently playing the same game at a gaming table experience different hold percentages for each game played. That is, as different players may play the same game at the same gaming table differently, for example based on each player's level of skill or based on each player's implemented strategy, different players may experience a different hold percentage for the games played at the gaming table. In another embodiment, the hold percentage for a player at a gaming table may vary from gaming session to gaming session for the player. That is, based on the player's skill or strategy or alternatively based on another suitable factor, such as the play of other players at the gaming table, the hold percentage of a player's games played at the gaming table over multiple gaming sessions may vary.

In one embodiment, to account for the different hold percentages, one or more weighting functions are utilized to determine which player is provided a bonus award. In another embodiment, to account for the different hold percentages, the gaming table enables each player to place a side bet or side wager with each game played to be eligible to win a bonus award. Such a side bet or side wager equalizes the different hold percentages among different games and provides that a player is selected to win a bonus award without any weighting.

In one embodiment, the gaming tables utilized in the gaming system are conventional gaming tables wherein the chip identification devices are not directly integrated or situated in or on the gaming tables. In this embodiment, one or more chip identification devices are utilized to track each player's wagered chips. In one such embodiment, chip identification devices are located at, above or below the table. In another such embodiment, the chip identification devices are attached to the gaming table or adjacent to the gaming table. In another such embodiment, the chip identification devices are included in the gaming table. In these embodiments, gaming establishments do not have to purchase new gaming tables. Rather, gaming establishments may continue using the same gaming tables and install the intelligent table technology around one or more gaming tables.

Figure 22:
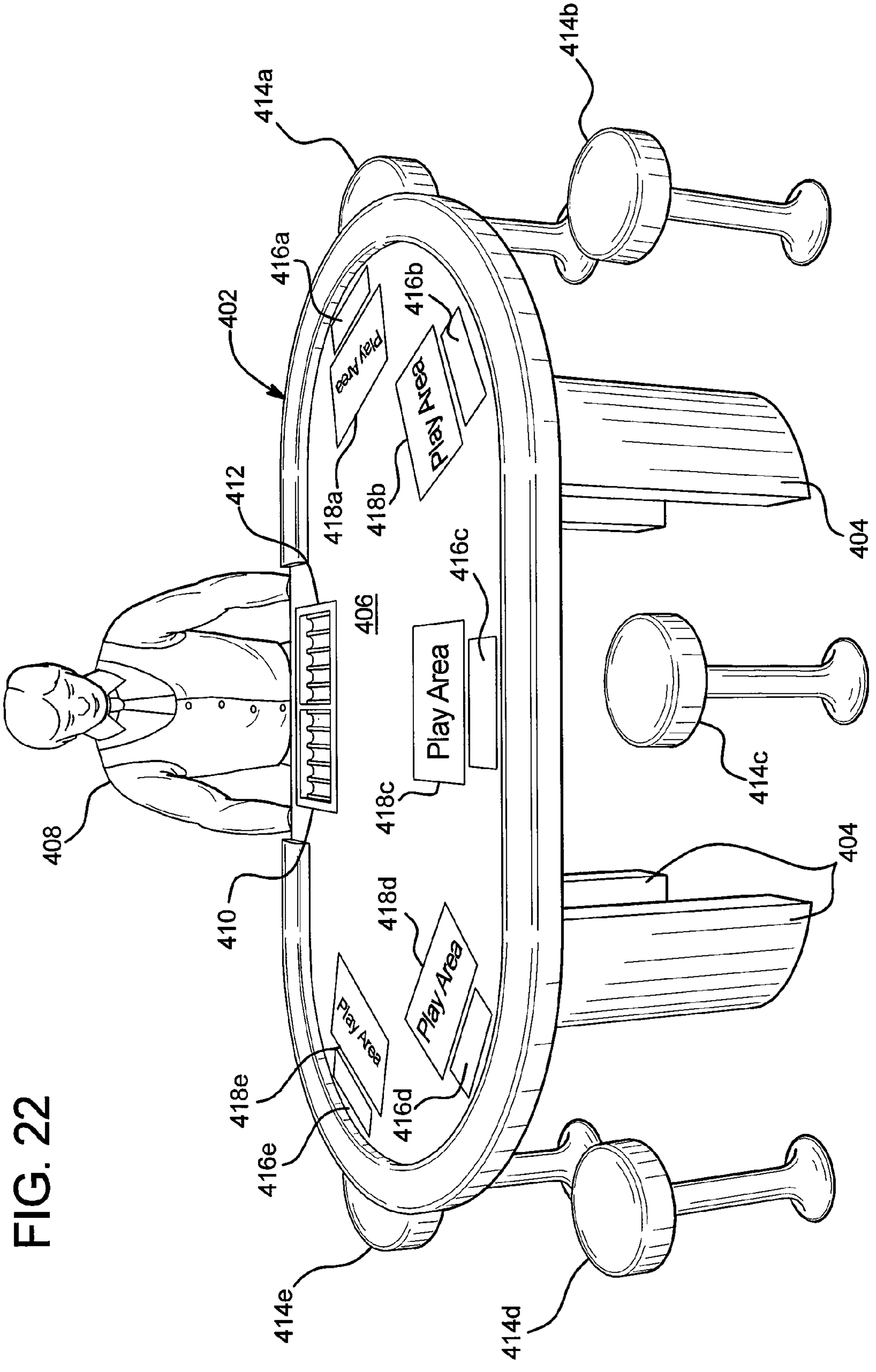
FIG. 22 is a perspective view of one embodiment of a gaming table of the present disclosure.

In one embodiment, as illustrated in FIG. 22, a gaming table 402 includes a suitable support structure 404, such as one or more legs, a playing surface 406 and a dealer position 408. In one embodiment, the dealer position includes two different chip trays 410 and 412 for holding several stacks of the dealer's chips. The dealer may use the chip trays to collect and store wagering chips, or to make change for a player. The gaming table includes a plurality of player stations or seats 414*a*, 414*b*, 414*c*, 414*d* and 414*e*. In this example, there are five player stations or seats. It should be appreciated that the gaming table may accommodate any suitable number of player positions and players so as not to interfere with game play. In one embodiment, the gaming table includes a plurality of chip holding areas 416*a*, 416*b*, 416*c*, 416*d* and 416*e* where the players hold their chips. In certain embodiment, the gaming tables include wagering areas (not illustrated) where players place their bets. It should be appreciated that the gaming table may also include a community wagering area (not illustrated) where each of the players place their wagers. In one embodiment, the gaming table also includes a plurality of playing areas 418*a*, 418*b*, 418*c*, 418*d* and 418*e* associated with each of the player stations.

In one embodiment, cards are dealt by the dealer substantially within the respective playing areas, such that cards dealt to a first player position are not confused with cards dealt to a second different player position. It should be appreciated that games played at the gaming tables may include any suitable card game or any suitable non-card game, such as roulette and craps. The gaming tables are operable to include any suitable apparatuses or components of the games. It should be appreciated that different gaming tables in the gaming system may include the same game components or different game components.

In one embodiment, one or more gaming tables in the gaming system each include at least one processor, such as a microprocessor, a microcontroller-based platform, a suitable integrated circuit or one or more application-specific integrated circuits (ASIC's). In one embodiment, the processor is in communication with the central server and/or the player tracking system. In one embodiment, the processor is in communication with or operable to access or to exchange signals with at least one local data storage or local memory device.

In one embodiment, the local memory device stores information about the player's gaming activity and/or one or more bonus awards. The local memory may also store, at least in part, other data such as image data, event data, player input data, or information and applicable game rules that relate to the play of the gaming table. In one embodiment, the local memory device includes random access memory (RAM). In one embodiment, the local memory device includes read only memory (ROM). In one embodiment, the local memory device includes flash memory and/or EEPROM (electrically erasable programmable read only memory).

Figure 23:
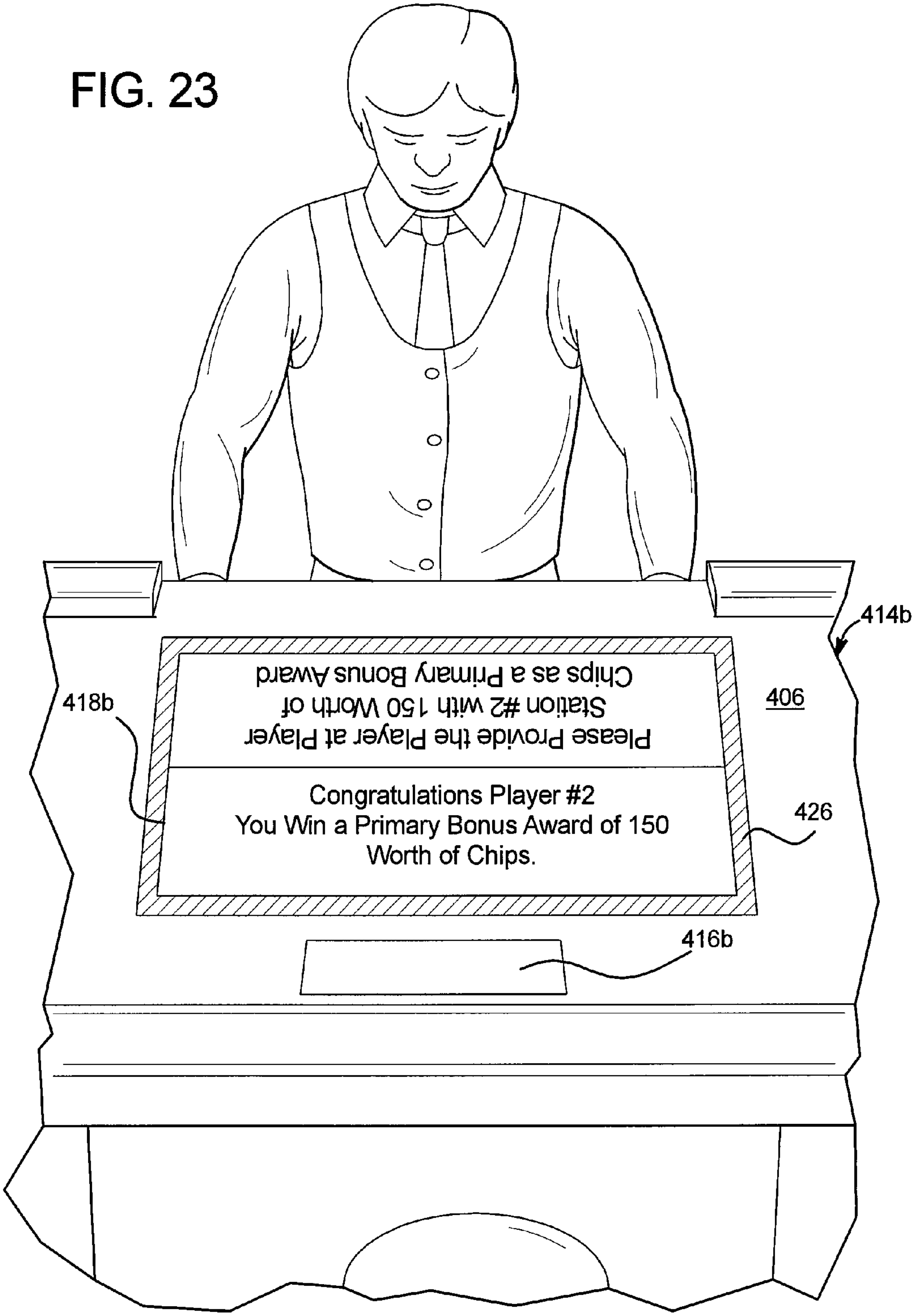
FIG. 23 is front side view of one embodiment of the gaming system disclosed herein illustrating a primary bonus award provided to a player at a gaming table.

In one embodiment, after determining to provide a bonus award, such as a primary bonus award, a secondary bonus award or one or more plays of a bonus game, to a player at the gaming table, the central server communicates data or information relating to the determined bonus award to the gaming table and/or dealer currently stationed at the gaming table. In one embodiment, a message controller or message module associated with the central server sends one or more messages to be displayed on one or more display devices at the player's gaming table to inform the player that a bonus award has been won. In another embodiment, the message controller or message module associated with the central server sends one or more messages to be displayed on one or more display devices at the gaming table to inform the dealer or host stationed at the gaming table that a bonus award has been won and any suitable instructions for providing the bonus award to the player. In another embodiment, the message controller or message module associated with the central server sends one or more messages to be displayed on one or more display devices at the gaming table to inform the player and the dealer or host stationed at or near the gaming table that a bonus award has been won. For example, as seen in FIG. 23, after the central server has determined to provide the player at playing station 414*b* with a primary bonus award (as described above), the central controller causes the play area 418*b* to display information to the player and the dealer or host regarding the determined primary bonus award. In this example embodiment, the play area associated with the player provided the primary bonus award illuminates (via an LED border 426) or otherwise indicates to the player and dealer or host the occurrence of the primary bonus award. Appropriate messages such as "CONGRATULATIONS PLAYER #2, YOU WIN A PRIMARY BONUS AWARD OF 150 WORTH OF CHIPS" are provided to the player and appropriate messages such as "PLEASE PROVIDE THE PLAYER AT PLAYING STATION #2 WITH 150 WORTH OF CHIPS AS A PRIMARY BONUS AWARD" are provided to the dealer visually, or through suitable audio or audiovisual displays.

Figure 24:
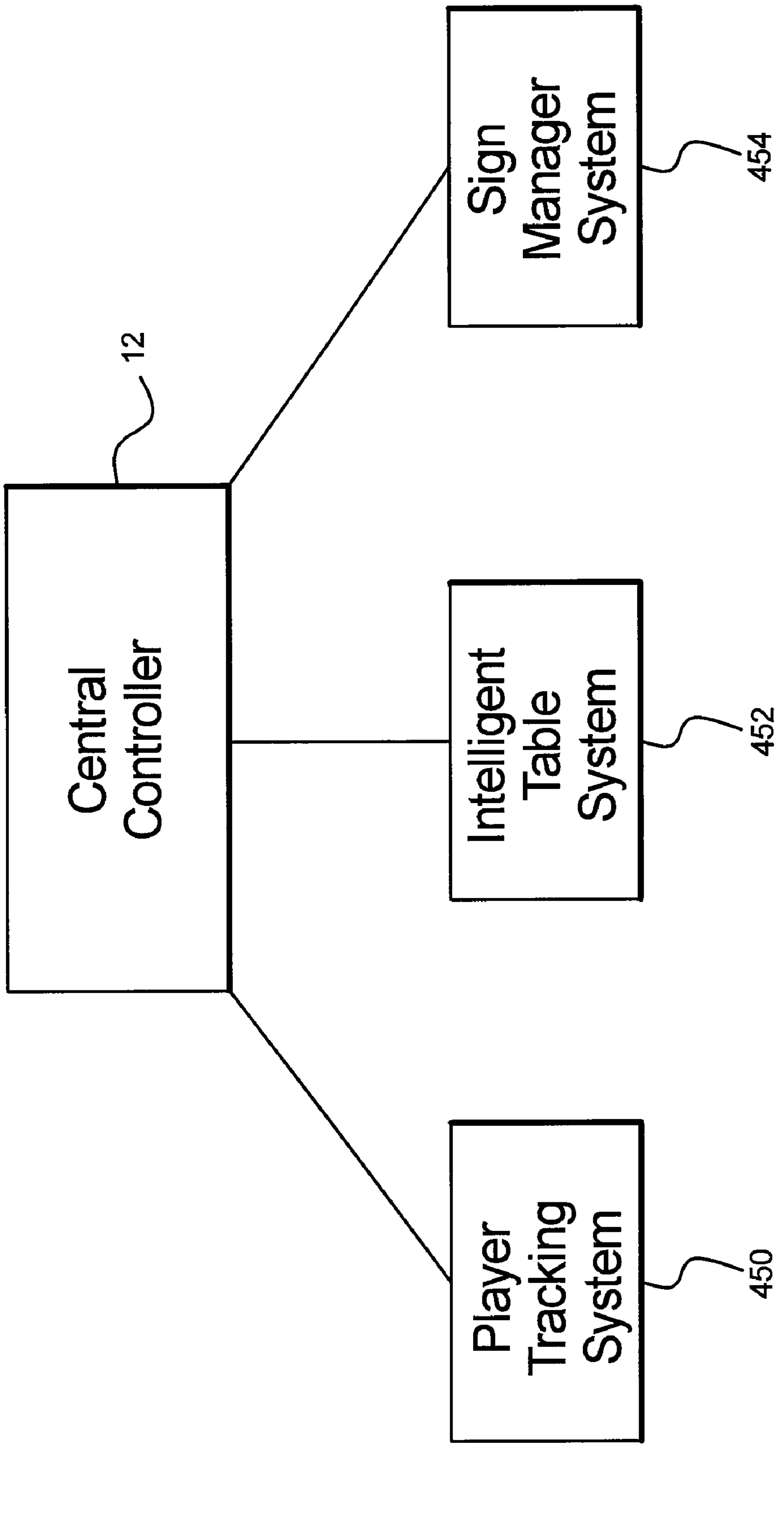
FIG. 24 is a schematic block diagram of an electronic configuration of one embodiment of the gaming system disclosed herein.

In another embodiment, as illustrated in FIG. 24, the central controller includes, is in communication with or is integrated with a plurality of different gaming servers or systems. It should be appreciated that the central controller may include each of these gaming systems or perform one, a plurality or all of the functions of each of these gaming systems. In one embodiment, the central controller 12 is integrated with a player tracking system 450, an intelligent table system 452 and a sign manager system 454.

In one embodiment, the gaming system of gaming tables is integrated with one or more player tracking systems. In this embodiment, the gaming system and/or player tracking system is operable to track any participating player's gaming activity at each gaming table of the gaming system. In one such embodiment, the gaming system and/or the associated player tracking system timely tracks when a player inserts their playing tracking card to begin a gaming session and also timely tracks when a player removes their player tracking card, stops playing at the gaming table or cashes out when concluding play for that gaming session. That is, in one embodiment, the gaming system, the individual player station at the gaming table and/or the associated player tracking system tracks card-in/card-out for each gaming session. In another embodiment, the dealer or host logs the player in and out. In one such embodiment, at the start of a gaming session, the player hands the player's tracking card to the dealer and the dealer or host logs the player in and out for a gaming session. In different embodiments, the gaming system works in accordance with the player tracking system to maintain the above-described data about players. The gaming system utilizes such tracked player information to determine, at least in part, to provide one or more bonus awards to one or more players at such gaming tables. For example, the gaming table enables a player to change games at the gaming tables wherein the player's contributions to the accumulated wager pool is associated with the player's account and thus stays with the player as they switch from gaming table to gaming table. In another example, the gaming system enables a player to change the types of different gaming mediums they are played wherein the player's contributions to the accumulated wager pool is associated with the player's account and thus stays with the player as they switch from gaming medium to gaming medium.

In other embodiments, rather than requiring a player to insert a player tracking card or enter identifying information, the gaming table utilizes one or more portable devices carried by a player, such as a cell phone, email communication device, a radio frequency identification tag or any other suitable wireless device to track when a player begins and ends a gaming session. In other embodiments, the gaming table utilizes any suitable biometric technology or ticket technology to track when a player begins and ends a gaming session. Each of the gaming tables may include any suitable number of player tracking input devices, such as card readers or key pads to enter identification numbers. In one embodiment, each player station or seat includes an individual player tracking input device. In another embodiment, a gaming table includes a single player tracking input device. In another embodiment, only a dealer has access to the player tracking input device and inputs all of each player's information.

It should be appreciated that the intelligent table system disclosed herein may include any suitable components or devices to monitor the players' gaming activity. That is, the intelligent table systems tracks how much a player wagers or how many chips a player wagers, how much a player has won or lost, how many chips the player has on the gaming table, or any other desired tracking information. In one embodiment, the intelligent table system also tracks this information for each and every game played by the player. Based on such tracked information, the gaming system provides one or more players one or more bonus awards as described above. It should be appreciated that the intelligent table system may include any suitable gaming table areas with chip identification devices, any suitable method of identifying the wagering chips, and may use any suitable chip reading technology.

In one embodiment, the intelligent gaming tables or chip tracking systems tracks, monitors and records game play occurring at one or more gaming table player stations, regardless of which player is currently playing at each gaming station. In another embodiment, the intelligent gaming tables or chip tracking systems tracks, monitors and records game play of one or more players at such gaming tables. In this embodiment, the player tracking system identifies players and records or saves the game play information provided by the intelligent tables in specific player accounts. Based on such game play information provided by the intelligent gaming tables, the gaming system disclosed herein provides players at such gaming tables with one or more bonus awards.

In another embodiment, the intelligent gaming table disclosed herein employs a virtual gaming table. The virtual gaming table provide virtual playing cards and/or virtual wagering chips which enable one or more players to play one or more games at the intelligent gaming table. In one embodiment, such virtual gaming tables can utilize one or more surface computing mechanisms, one or more cameras and one or more of a plurality of display devices to provide these games. In one such embodiment, an intelligent gaming table includes an acrylic top and employs a plurality of infrared cameras and a DLP projector with Wi-Fi and BLUETOOTH™ wireless networks to display and detect objects and movement. In this embodiment, as players move their hands or objects on the table top, the cameras translate the motions into commands. One such example of this type of table is the SURFACE™ table developed by Microsoft Corporation. SURFACE is a trademark of Microsoft Corporation and BLUETOOTH is a trademark of Bluetooth SIG, Inc.

It should be appreciated that any of the embodiments disclosed herein may be implemented in association with one or more gaming tables in the gaming system. That is, any function, task or action executed at, by or otherwise in association with a gaming device and a central server disclosed herein may also be executed at, by or otherwise in association with one or more intelligent gaming tables. Such a configuration provides that the gaming system disclosed herein is operable to provide one or more bonus awards to players at one or more intelligent gaming tables.

The gaming system disclosed herein contemplates that a plurality of different methods of identifying the player's gaming activity at one or more gaming tables may be employed. In one embodiment, the gaming system is configured such that all chips in the gaming establishment where game play is conducted include chip identification tags. In one such embodiment, all of the chips are tracked and identified, such that the gaming system tracks and identifies all of the chips in the gaming establishment.

It should be appreciated that values may be assigned to chips in any suitable manner. In one embodiment, different denominations of chips are visually different, such as having the value displayed on the chip, having different sizes and/or having different weights. In another such embodiment, each chip is associated with one of a plurality of different values. In this embodiment, the intelligent table system identifies the individual chips (such as using RFID technology described herein), determines the placement of each chip and sends the information to the player tracking system or central controller about each of the specific chips. In one embodiment, the central server associates the value of the chip with the player tracking account.

In one embodiment, each of the chips has or is associated with an identification number. The intelligent table system determines the chip identification number upon play or win of a chip or upon the evaluation of all of the chips in a player's chip identification area. The intelligent table system sends the chip information to the central server. The gaming system associates the chip number with the amount and the player. For example, a first player's chip identification area includes chip number 876543 which is associated with the value of $1, chip number 876545 which is associated with the value of $5 and chip number 876547 which is associated with the value of $10. In one embodiment, the intelligent table system determines which chips are in which identification area and sends the information to the central server. The gaming system associates the chip numbers with their value and uses the information to determine one or more aspects of game play. It should be appreciated that the chips may be identified in any suitable manner, wherein such identified chips are utilized, at least in part, by the central server to determine one or more bonus awards to provide to one or more players.

The intelligent table system disclosed herein is operable to use a variety of types of technology to track player activity. More specifically, in one embodiment, the intelligent table system is operable to include one or more chip identifying devices. In one embodiment, the intelligent table system uses Infra-red signals received from table game chips to track activity. In another embodiment, the intelligent table system employs radio frequency identification (RFID) to track chip activity. The RFID is a system that uses a small electronic device that includes a small chip and an antenna. The chips are scanned at the gaming table to retrieve the identifying information. In another embodiment, the gaming system uses optical technology. The gaming system may use any suitable other chip identification devices, which may use any suitable chip identification technology, to determine player gaming table wagering activities. The chips are tracked for total chip movement or wins and losses. When each chip is placed in a chip identification area, such as a betting circle or in a player's betting or wagering area, chip identification devices recognizes the chip and relays this data to the intelligent table system.

The gaming system disclosed herein contemplates a plurality of different methods that the chips may be used and/or identified during game play to determine whether to provide one or more players one or more bonus awards as disclosed herein. In one embodiment, a chip identification area is a chip holding area. In one embodiment, intelligent table system identifies all of the chips in a player's chip holding area. For example, during game play, a player is required to have all chips in that player's possession in a chip holding area which each include one or more chip identification devices. Upon a game play checkpoint, such as at a designated time interval, upon a triggering event, at the end of a play of a game or at the end of a gaming session, the intelligent table system surveys each of the player's chip holding areas to identify the players' chips. Such tracked information is sent to the central server and the gaming system utilizes such information to potentially provide a bonus award to a player currently playing at the gaming table.

In one embodiment, the chip identification area is a wagering area. In one embodiment, the gaming system includes chip identification devices in each player's wagering area. The gaming system identifies either the specific chips wagered and won or loss by that player or the number of chips wagered and won or loss by the player. For example, a player logs into the player tracking system via a card slot at the player's player station at a gaming table. When a player places a chip in the wagering area associated with that player station, the intelligent table system identifies that chip. When a dealer or host provides a chip to a player for a win, the intelligent table system identifies the chip. Such tracked information is used by the gaming system to determine, at least in part, if a bonus award will be provided to the player.

In another embodiment, both the chip holding area and the wagering area include chip identification devices. That is, the gaming system is operable to identify chips in both the chip holding area and the wagering area. Therefore, the gaming system double checks or verifies each player's gaming activity.

In one embodiment, the gaming system associates the gaming activity directly with players via player accounts. For example, at the start of play, the player logs into the player tracking system, such as by inserting a player tracking card into a card reader associated with their player station on the gaming table. In this embodiment, the intelligent table system associates any tracked data with the player's specific account. Thus, in certain embodiments, tracking player activity at the gaming table is similar in accuracy and thoroughness to the tracking done at slot machines.

Alternatively, the gaming system determines the chip count at each player station to determine any bonus awards and does not associate the information directly with players. That is, the gaming system enables players to play anonymously and be associated with their current place at the table. For example, a player does not have to log in for one or more plays of a game but rather remains at a same player station for such plays of the game. The gaming system associates the chips with the player stations and determines to provide one or more bonus awards without requiring personal information from the player.

In certain embodiments, the intelligent table system includes one or more card readers or a card reading system to determine, at least in part, whether one or more players will be provided one or more bonus awards as disclosed herein. The card reading system knows what card comes out of the shoe and is dealt to what player. In one embodiment, the card reading system is a part of the intelligent table system. In another embodiment, the card reading system is separate from the intelligent table system and in association with the intelligent table system detects betting patterns and decisions to provide to the player tracking system. Such betting patterns and decisions may qualify the player to win one or more bonus awards. The card reading system can also reduce dealer error and or possible corruption by making sure that the players are paid properly for each and every hand. In certain embodiments, the intelligent table system knows the player cards, the dealer cards, and the bet, the intelligent table system is enabled to determine correct payouts for each and every player at the gaming table. In certain embodiments, the gaming system employs safeguards to make sure the correct payout is made. For example, the gaming system can send a halt play signal if an error is detected. It should be appreciated that in different embodiments the card reading system and the intelligent table system are integrated with or included in one or more tracking systems or player tracking systems.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

a plurality of different gaming mediums, each gaming medium controlled by at least one gaming medium processor and configured to enable a play of a wagering game, wherein each wagering game is configured to operate upon a placement of a wager by a player and the plurality of gaming mediums are configured to be played by the plurality of players at a plurality of different rates during a bonus event accumulation period; and a controller configured to communicate with each of the plurality of different gaming mediums, the controller programmed to:

(a) maintain an accumulated wager pool including at least the wagers placed on the wagering games played during the bonus event accumulation period, (b) randomly determine to provide at least one of a plurality of bonus awards to at least one of the plurality of players of the wagering games, wherein said determination is based at least in part on the accumulated wager pool and is independent of any event in any play of any of the wagering games played on the different gaming mediums, and (c) determine which gaming medium playing one of the wagering games will provide the bonus award based at least in part on the wagers placed on the wagering games, wherein the gaming medium processor for the selected gaming medium determines at least part, but not all, of the bonus award to be displayed and provided by said gaming medium selected by the controller and said determination of the bonus award to be displayed is independent of any wagering game outcomes determined in association with any of the plays of any of the wagering games of any of the gaming mediums.

2. The gaming system of claim 1, wherein the plurality of different gaming mediums include at least a first type of gaming medium and a second, different type of gaming medium.

3. The gaming system of claim 1, wherein the plurality of wagering games played on the plurality of different gaming mediums are selected from the group consisting of: wagering games played over a network setup, wagering games played utilizing a hand-held device, wagering games played at non-dedicated gaming terminals, wagering games played at a multi-player gaming station and wagering games played at a gaming machine.

4. The gaming system of claim 1, wherein the controller is programmed to:

(a) for each gaming medium, maintain a total of the wagers placed on the wagering games of said gaming mediums during the bonus event accumulation period;

(b) maintain the accumulated wager pool including a total of the wagers placed on the wagering games of all of gaming mediums during the bonus event accumulation period;

(c) determine at designated intervals during the bonus event accumulation period if a bonus event will occur; and (d) if the bonus event is determined to occur:

(i) determine which of the gaming mediums were in an active state during a bonus event qualification period for said bonus event, and (ii) select at least one of the gaming mediums in the active state to be the gaming medium which will display and provide the bonus award.

5. The gaming system of claim 4, wherein the controller is programmed to select at least one of the gaming mediums in the active state based on the total wagers placed during the bonus event accumulation period for each gaming medium in the active state relative to a total of the wagers placed for all of said gaming mediums in the active state during the bonus event accumulation period.

6. The gaming system of claim 4, wherein the designated intervals are time based.

7. The gaming system of claim 4, wherein the designated intervals are based on the accumulated wager pool.

8. The gaming system of claim 4, wherein the controller is programmed to determine which of the gaming mediums were in the active state during the bonus event qualification period by determining for each gaming medium if a wager was placed on the wagering game of that gaming medium during the bonus event qualification period.

9. The gaming system of claim 4, wherein the controller is programmed to determine which of the gaming mediums were in the active state during the bonus event qualification period by determining for each gaming medium if a designated wager level was placed on the wagering game of that gaming medium during the bonus event qualification period.

10. The gaming system of claim 4, wherein the controller is programmed to determine which of the gaming mediums were in the active state during the bonus event qualification period by determining for each gaming medium if a designated number of wagers were placed on the wagering game of that gaming medium during the bonus event qualification period.

11. The gaming system of claim 4, wherein if at least two of the gaming mediums are each in the active state active, the controller is programmed to select at least one of the gaming mediums in the active state to provide a secondary bonus award, wherein said selection excludes the gaming medium selected to provide the bonus award.

12. The gaming system of claim 4, wherein if at least two gaming mediums are each in the active state, the controller is programmed to determine a number of gaming mediums in the active state which will each provide a secondary bonus award.

13. The gaming system of claim 1, wherein the controller is programmed to determine part of the bonus award.

14. The gaming system of claim 1, wherein the controller is programmed to maintain the plurality of bonus awards and the gaming medium processor for the selected gaming medium selects one of said bonus awards to display and provide.

15. The gaming system of claim 1, wherein the gaming medium processor for the selected gaming medium determines at least part of an amount of the bonus award.

16. The gaming system of claim 1, wherein the gaming medium processor of one of the gaming mediums functions as the controller.

17. The gaming system of claim 1, wherein the bonus award includes a value component.

18. The gaming system of claim 17, wherein the value component is determined by the gaming medium processor for the selected gaming medium.

19. The gaming system of claim 17, wherein the value component is determined in a non-wagering secondary game played on the selected gaming medium.

20. The gaming system of claim 1, wherein at least two of said wagering games of at least two of the plurality of gaming mediums are different.

21. The gaming system of claim 1, wherein the bonus award is a progressive award.

* * * * *

UNITED STATES PATENT AND TRADEMARK OFFICE

CERTIFICATE OF CORRECTION

PATENT NO. : 8,021,230 B2
APPLICATION NO. : 11/830635
DATED : September 20, 2011
INVENTOR(S) : Anthony J. Baerlocher et al.

It is certified that error appears in the above-identified patent and that said Letters Patent is hereby corrected as shown below:

IN THE CLAIMS:

In Claim 2, column 90, line 62, replace “include” with --includes--.

In Claim 3, column 90, line 65, delete “plurality of”.

In Claim 4, column 91, line 13, before “gaming” add --the--.

In Claim 5, column 91, line 27, before “total”, replace “the” with --a--.

In Claim 5, column 91, line 27, after “total” add --of the--.

In Claim 11, column 92, line 9, after “state” delete “active”.

Signed and Sealed this
First Day of May, 2012

David J. Kappos

David J. Kappos
*Director of the United States Patent and Trademark Office*

UNITED STATES PATENT AND TRADEMARK OFFICE

CERTIFICATE OF CORRECTION

PATENT NO. : 8,021,230 B2
APPLICATION NO. : 11/830635
DATED : September 20, 2011
INVENTOR(S) : Anthony J. Baerlocher et al.

It is certified that error appears in the above-identified patent and that said Letters Patent is hereby corrected as shown below:

In Claim 4, column 91, line 9, replace “games” with --game--.
In Claim 4, column 91, line 9, replace “mediums” with --medium--.

Signed and Sealed this
Eighteenth Day of December, 2012

David J. Kappos
*Director of the United States Patent and Trademark Office*